United States Patent
Sadov

(10) Patent No.: US 12,175,888 B2
(45) Date of Patent: Dec. 24, 2024

(54) COMPUTERIZED METHOD AND APPARATUS FOR DETERMINING ACCURACY OF WRITTEN CHARACTERS AND STROKE ORDER AND COMPLIANCE WITH RULES AND PROVIDING VISUAL AND AUDIO FEEDBACK

(71) Applicant: Holistic Language Solutions LLC, Setauket, NY (US)

(72) Inventor: Elena Sadov, Setauket, NY (US)

(73) Assignee: Holistic Language Solutions LLC, Setauket, NY (US)

( * ) Notice: Subject to any disclaimer, the term of this patent is extended or adjusted under 35 U.S.C. 154(b) by 127 days.

(21) Appl. No.: 17/075,386

(22) Filed: Oct. 20, 2020

(65) Prior Publication Data

US 2022/0122477 A1  Apr. 21, 2022

(51) Int. Cl.
*G09B 5/06* (2006.01)
*G06F 3/04883* (2022.01)
(Continued)

(52) U.S. Cl.
CPC ......... *G09B 5/065* (2013.01); *G06F 3/04883* (2013.01); *G06F 3/167* (2013.01); *G09B 11/10* (2013.01); *G09B 19/06* (2013.01)

(58) Field of Classification Search
None
See application file for complete search history.

(56) References Cited

U.S. PATENT DOCUMENTS 6,215,901 B1 * 4/2001 Schwartz ........... G06V 30/1423
382/187
6,304,667 B1 * 10/2001 Reitano ................ G06K 9/6255
382/187
(Continued)

FOREIGN PATENT DOCUMENTS

CN     1249831 A    4/2000
CN   102981743 A    3/2013
(Continued)

OTHER PUBLICATIONS

Stroke-based modeling and haptic skill display for Chinese calligraphy simulation system, By Daniel Wang, Yuru Zhang and Chong Yao—Virtual Reality, vol. 9, pp. 118-132 (2006), Published: Jan. 11, 2006—DOI 10.1007/s10055-005-0012-4 (https://doi.org/10.1007/s10055-005-0012-4) (Year: 2006).*

(Continued)

*Primary Examiner* — Tamara T Kyle
*Assistant Examiner* — Koorosh Nehchiri
(74) *Attorney, Agent, or Firm* — DLA Piper LLP (US)

(57) ABSTRACT

A computerized method and apparatus are disclosed for determining the accuracy of written characters input by a user and whether the characters were formed with the correct strokes and complied with applicable rules and providing visual and audio feedback to the user. A computing device comprises a character comparison engine, rules engine, stroke engine, art rendering engine music engine, and vocalization engine and has access to a character library, rules library, stroke library, art library, and audio library. The computing device shows the user the appropriate way to write a character, allows the user to then write the character, assesses the quality of the character, and provides audio and/or visual feedback to the user in response to the quality of the user's work to provide positive feedback. The visual feedback can include step-by-step instruction on how to (Continued)

paint using the traditional Chinese outline or no-outline painting techniques.

16 Claims, 63 Drawing Sheets
(54 of 63 Drawing Sheet(s) Filed in Color)

(51) Int. Cl.
*G06F 3/16* (2006.01)
*G09B 11/10* (2006.01)
*G09B 19/06* (2006.01)

(56) References Cited

U.S. PATENT DOCUMENTS

| | | | | |
|---|---|---|---|---|
| 6,802,717 | B2* | 10/2004 | Castro | G09B 11/00 345/173 |
| 7,302,099 | B2* | 11/2007 | Zhang | G06V 30/1423 382/187 |
| 7,809,550 | B1* | 10/2010 | Barrows | G06F 40/129 704/4 |
| 8,102,397 | B2* | 1/2012 | Perry | G09G 5/28 345/611 |
| 9,013,485 | B2* | 4/2015 | DiVerdi | G09G 5/00 382/189 |
| 9,495,620 | B2* | 11/2016 | Dolfing | G06V 30/246 |
| 11,288,499 | B2* | 3/2022 | Du | G06T 11/203 |
| 2005/0027534 | A1* | 2/2005 | Meurs | G10L 15/187 704/E15.02 |
| 2005/0106538 | A1 | 5/2005 | Freeman | |
| 2006/0007123 | A1* | 1/2006 | Wilson | G06F 3/0425 345/156 |
| 2007/0218430 | A1* | 9/2007 | Chang | G09B 11/10 434/155 |
| 2007/0298387 | A1* | 12/2007 | McIlvain | G09B 5/02 434/163 |
| 2008/0048991 | A1* | 2/2008 | Freeman | G09B 5/02 345/173 |
| 2008/0131852 | A1* | 6/2008 | Van Hofwegen | G09B 11/04 434/165 |
| 2008/0240569 | A1* | 10/2008 | Tonouchi | G06V 30/32 382/186 |
| 2011/0190053 | A1* | 8/2011 | Kawamoto | A63F 13/26 463/31 |
| 2014/0361983 | A1* | 12/2014 | Dolfing | G06V 30/32 345/156 |
| 2016/0317908 | A1* | 11/2016 | Hughes | A63F 13/20 |
| 2018/0349016 | A1* | 12/2018 | Gao | G06V 30/1423 |
| 2021/0174703 | A1* | 6/2021 | Williams | G09B 5/065 |

FOREIGN PATENT DOCUMENTS

| | | |
|---|---|---|
| JP | 2000-222527 A | 8/2000 |
| JP | 2015-049308 A | 3/2015 |
| JP | 6083841 B1 | 2/2017 |
| JP | 2017-211441 A | 11/2017 |
| JP | 2017-211578 A | 11/2017 |
| JP | 2019-113803 A | 7/2019 |

OTHER PUBLICATIONS

AppLibrary, May 20, 2016, Non-Patent Literature Sending Letter, Patent Application No. 2021-171586, entitled "Electronic Method and Apparatus for Determining Handwriting Accuracy and Stroke Order and Compliance with Rules and for Providing Visual and Audio Feedback," X2F-1282, 000704, https://www.app-library.com/archives/33933. (Japanese translations attached).

Chinese Office Action mailed on Sep. 21, 2023 corresponding to the related Chinese Patent Application No. 202111221488.7.

Japanese Office Action mailed on Nov. 30, 2023 corresponding to the related Japanese Patent Application No. 2021-171586.

* cited by examiner

First Character Set
1200

什 (shén, what)
住 (zhù, to live)
他 (tā, he)
们 (men, plural suffix)
你 (nǐ, you)

FIGURE 12

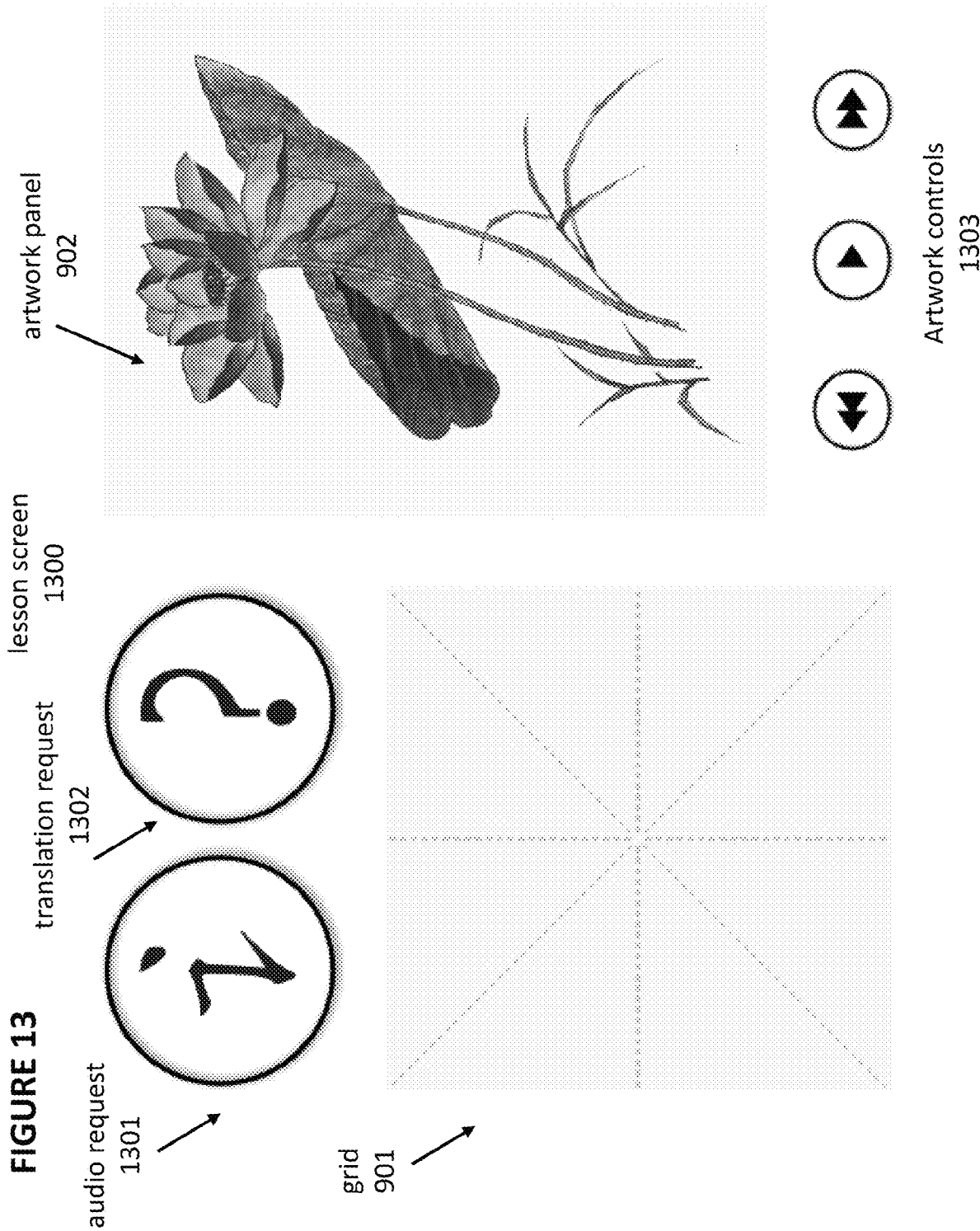

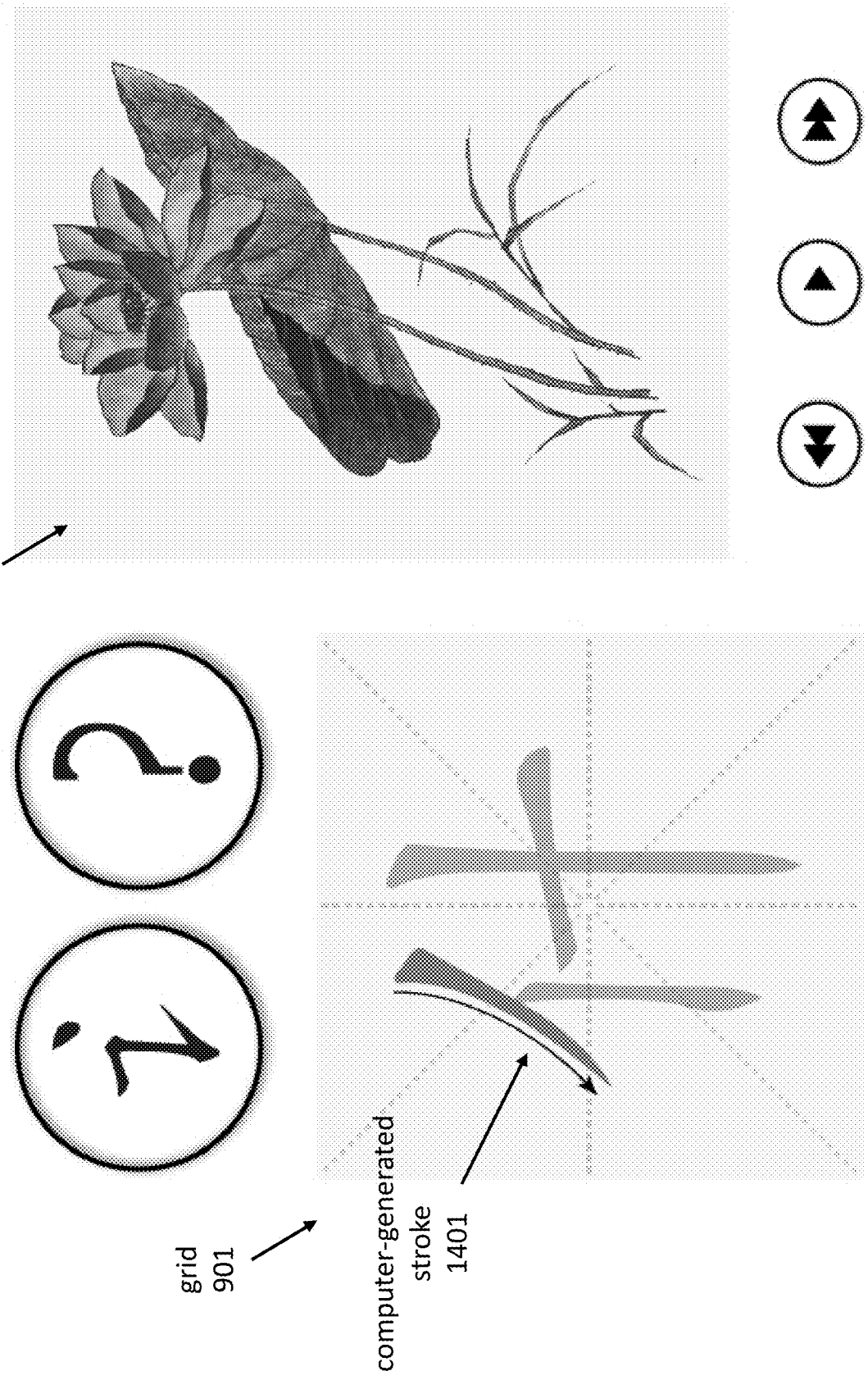

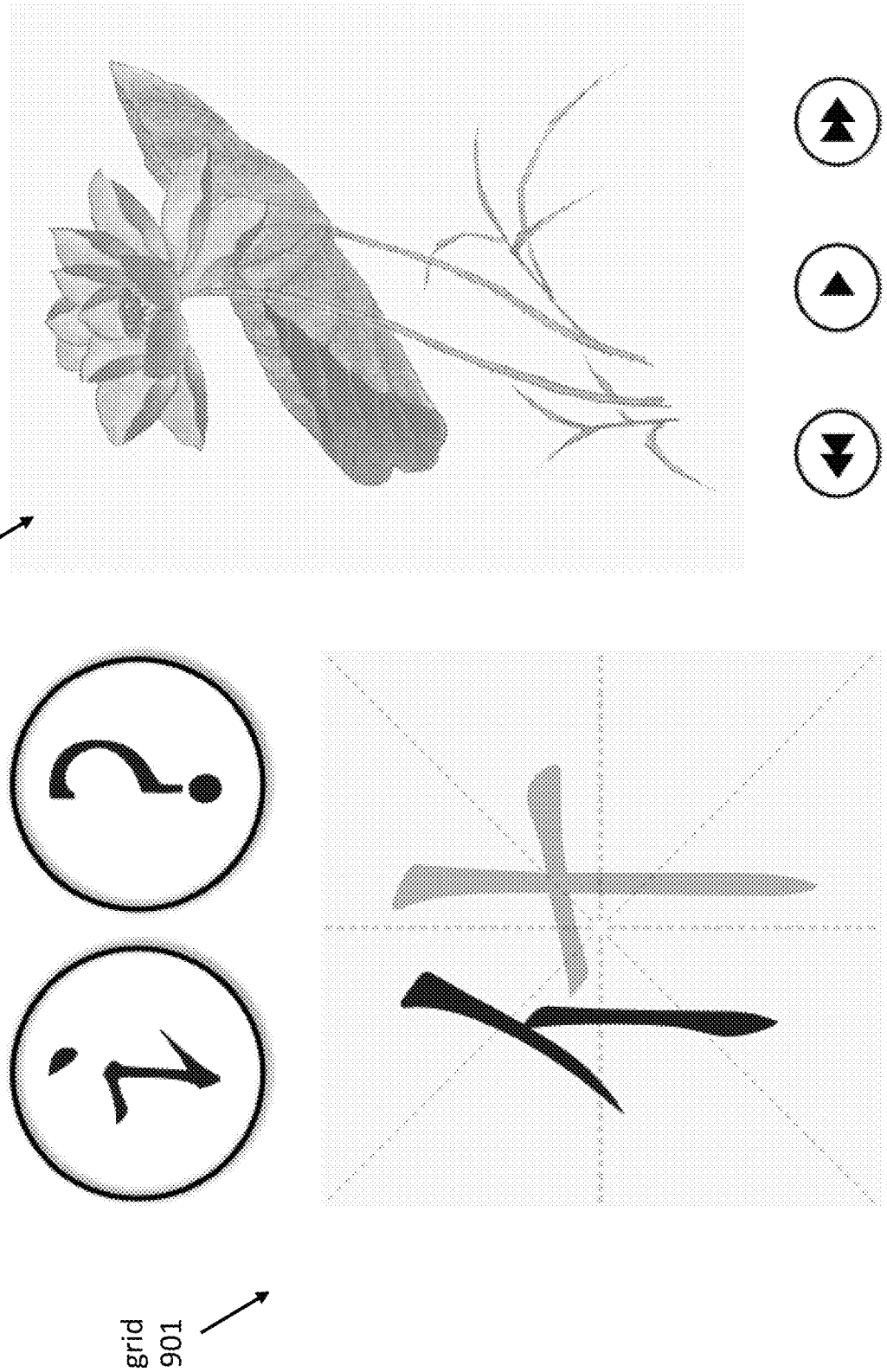

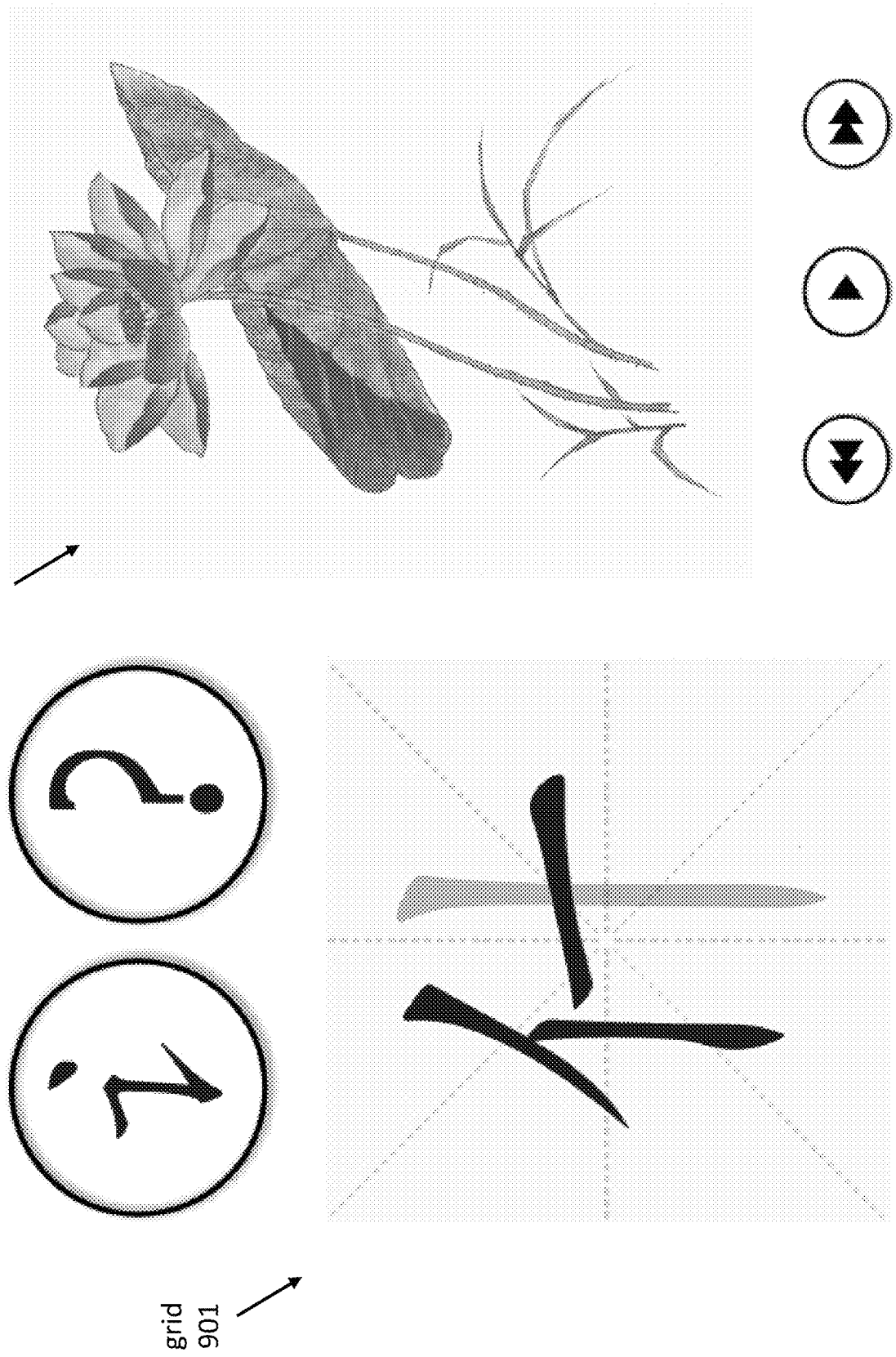

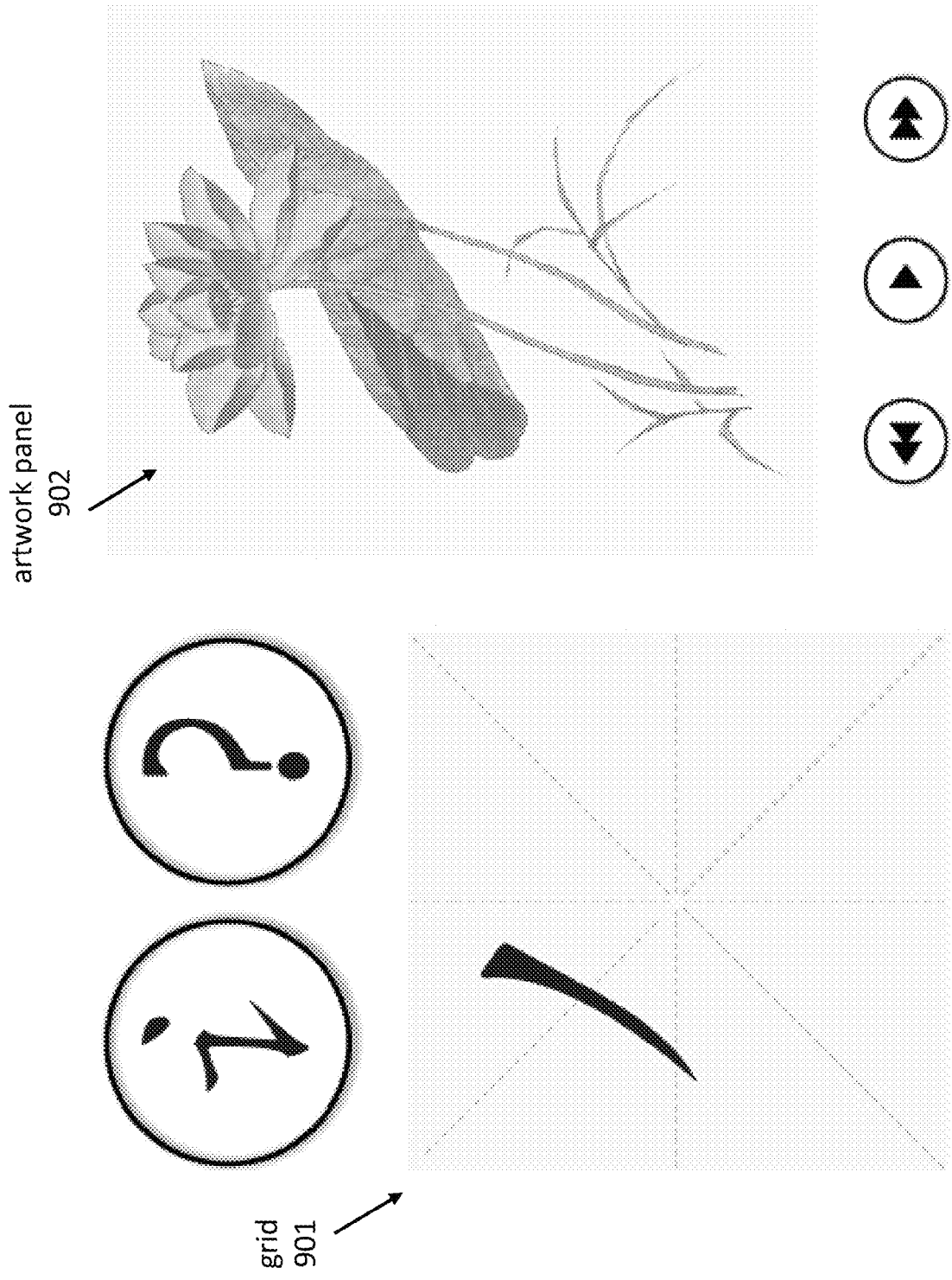

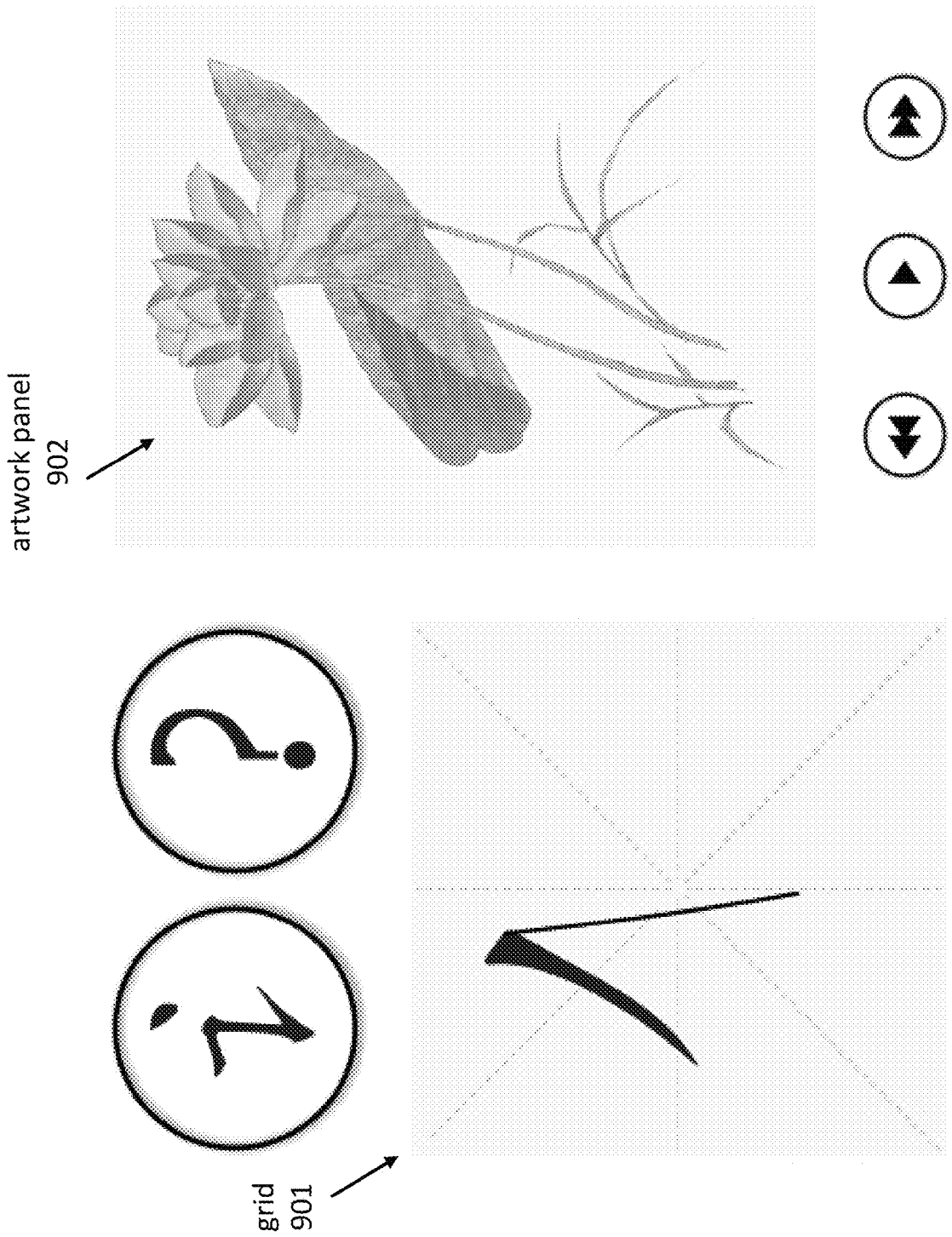

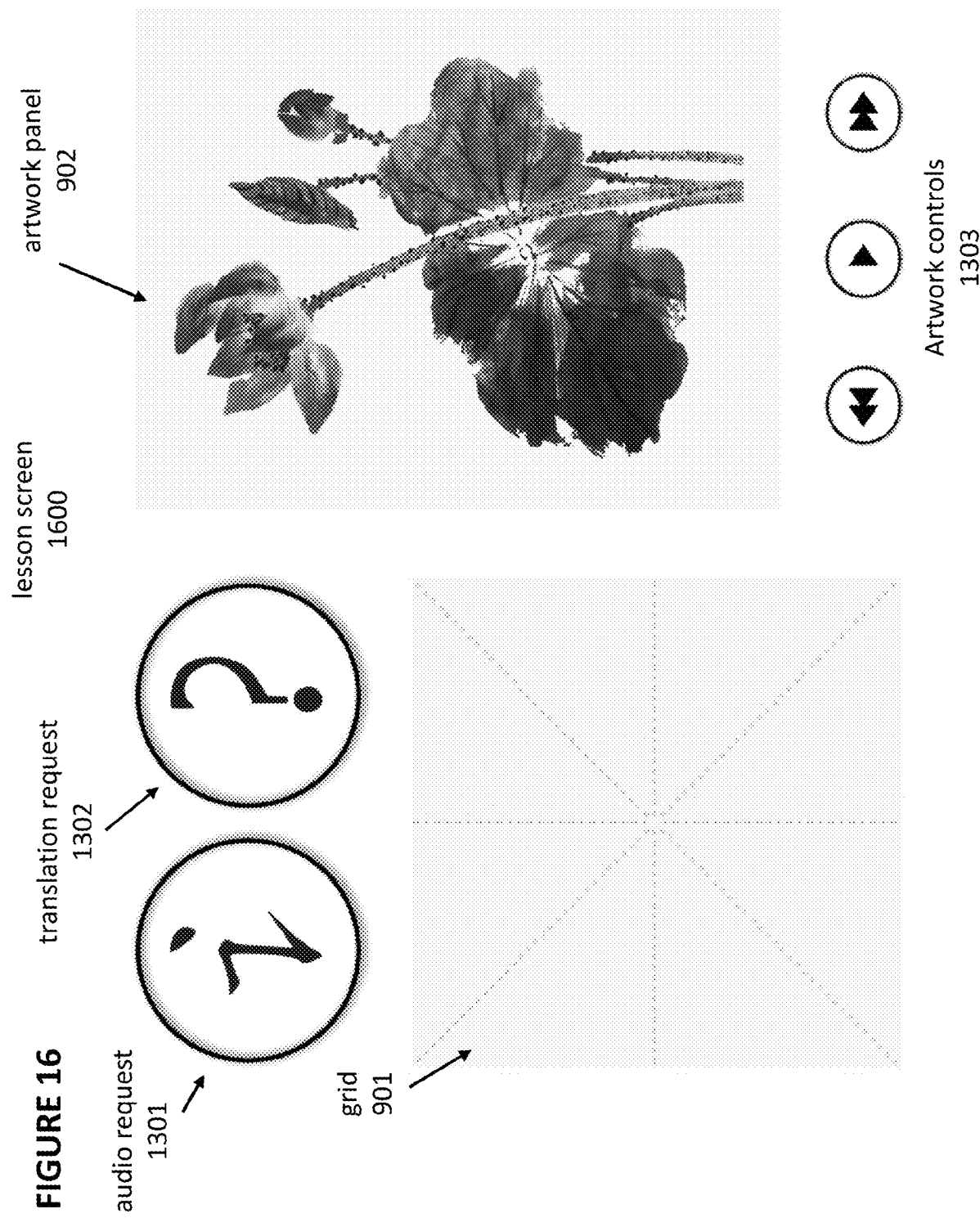

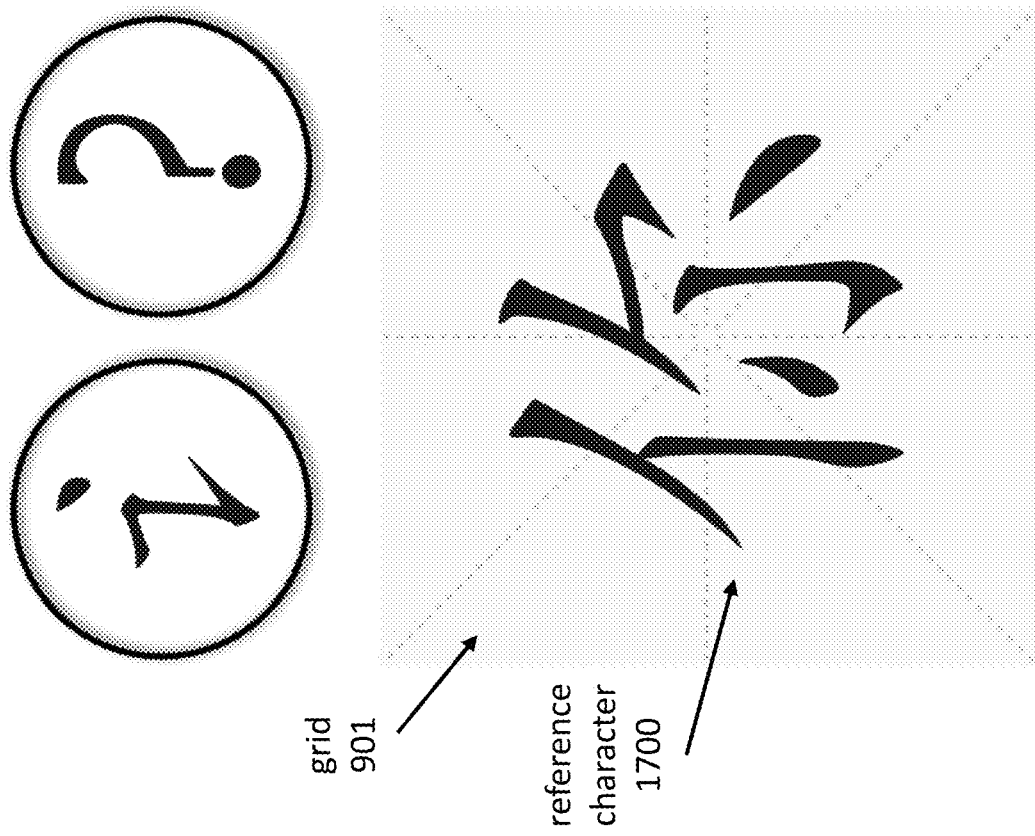
FIGURE 17A

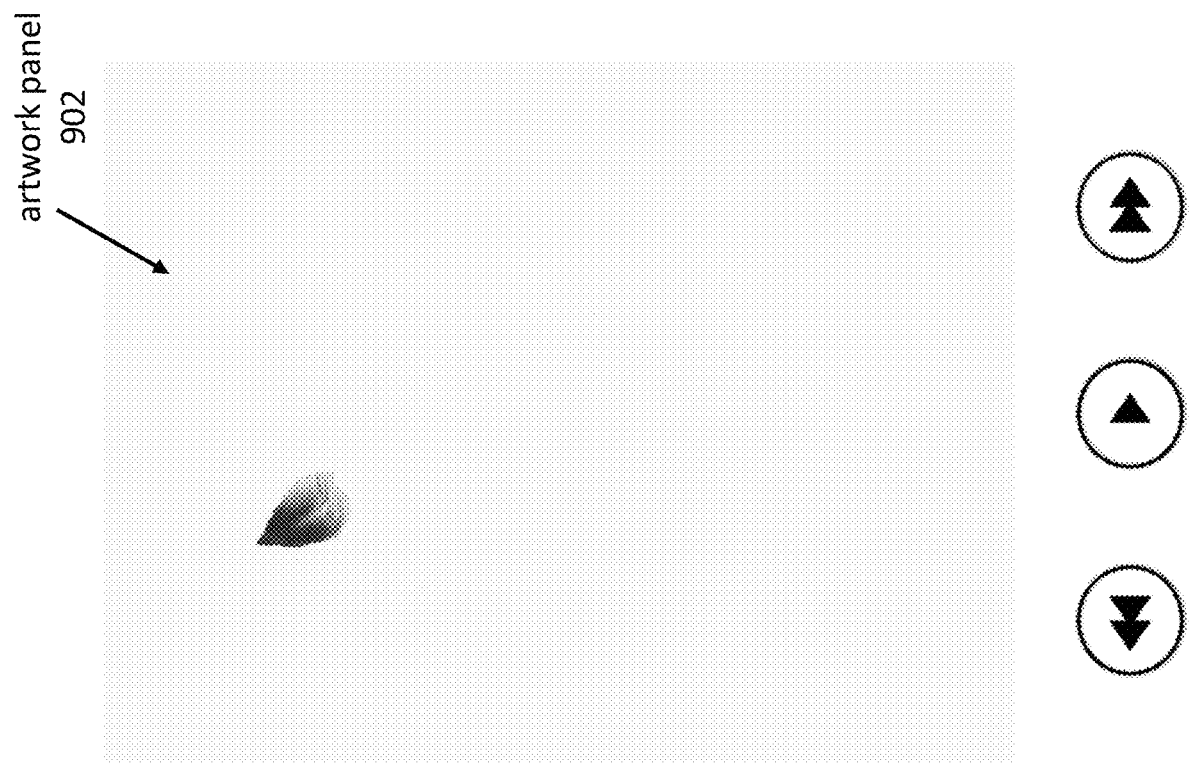
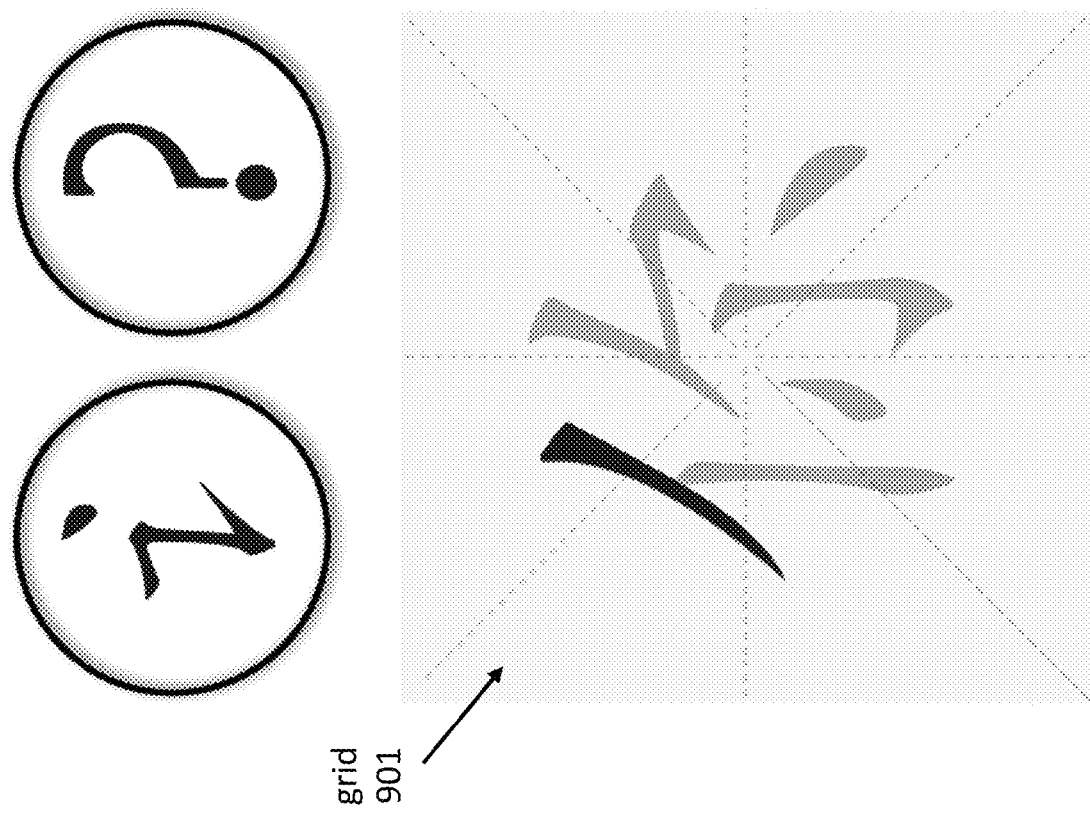
FIGURE 17C

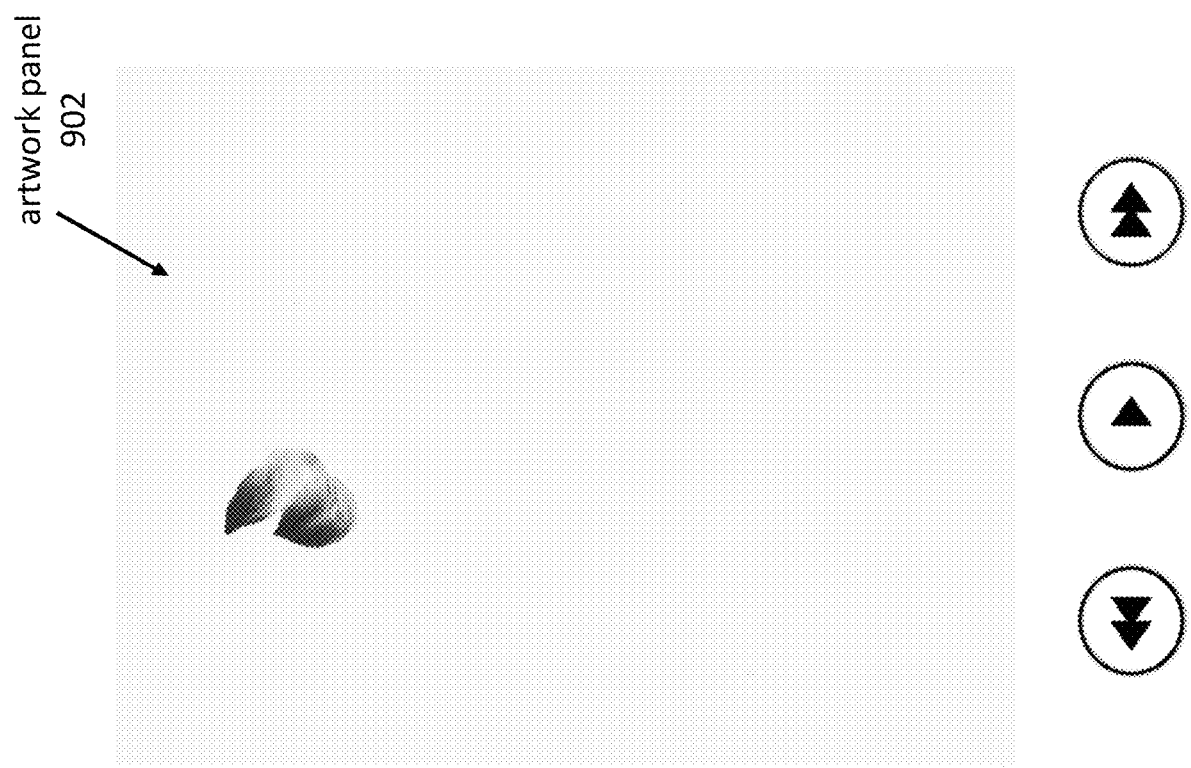
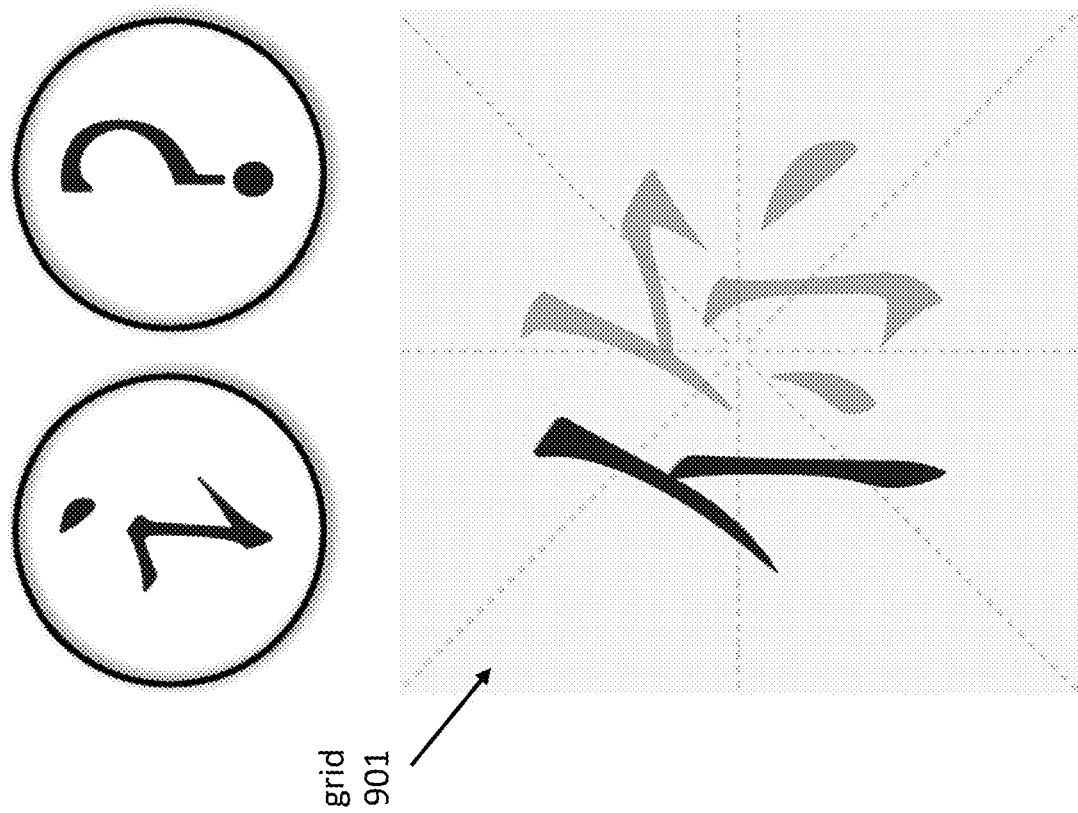
FIGURE 17D

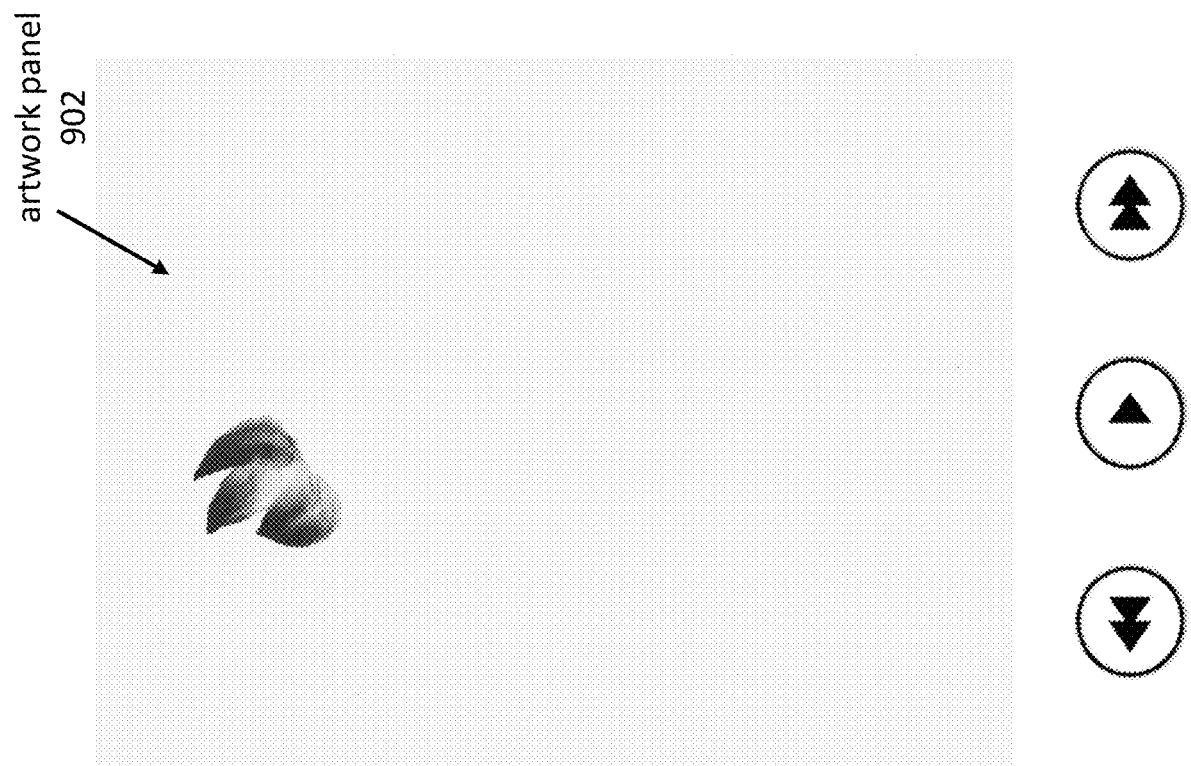
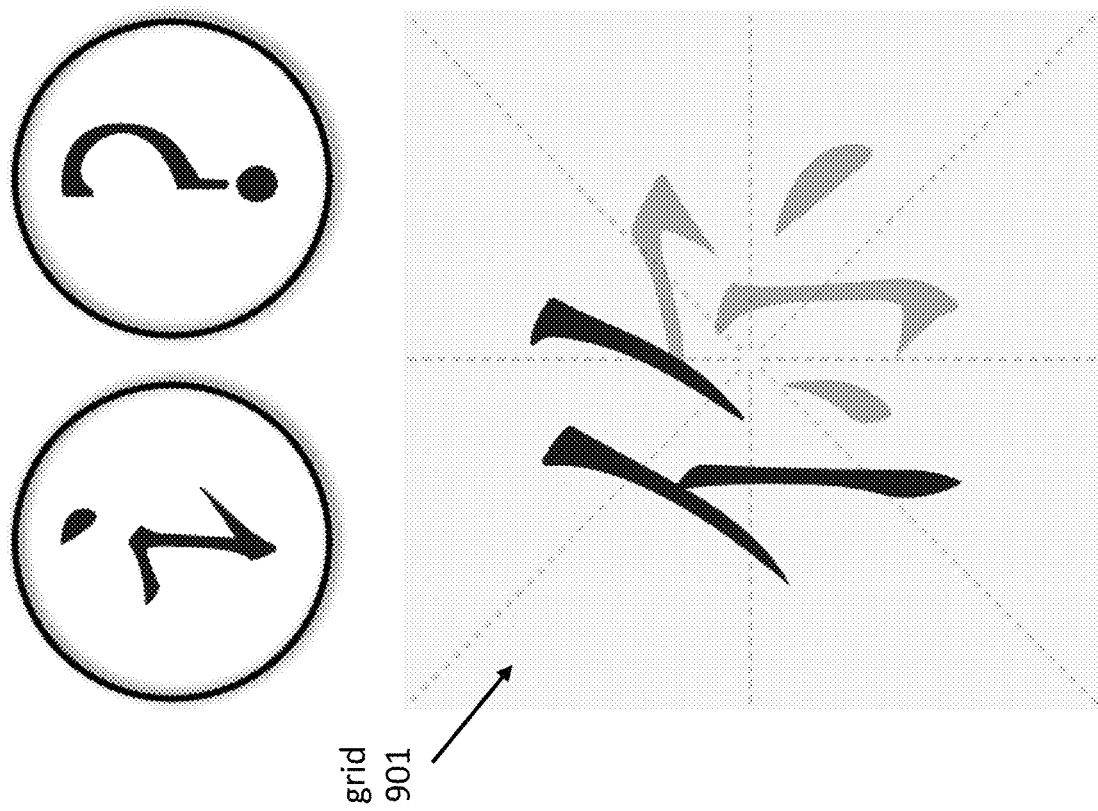
FIGURE 17E

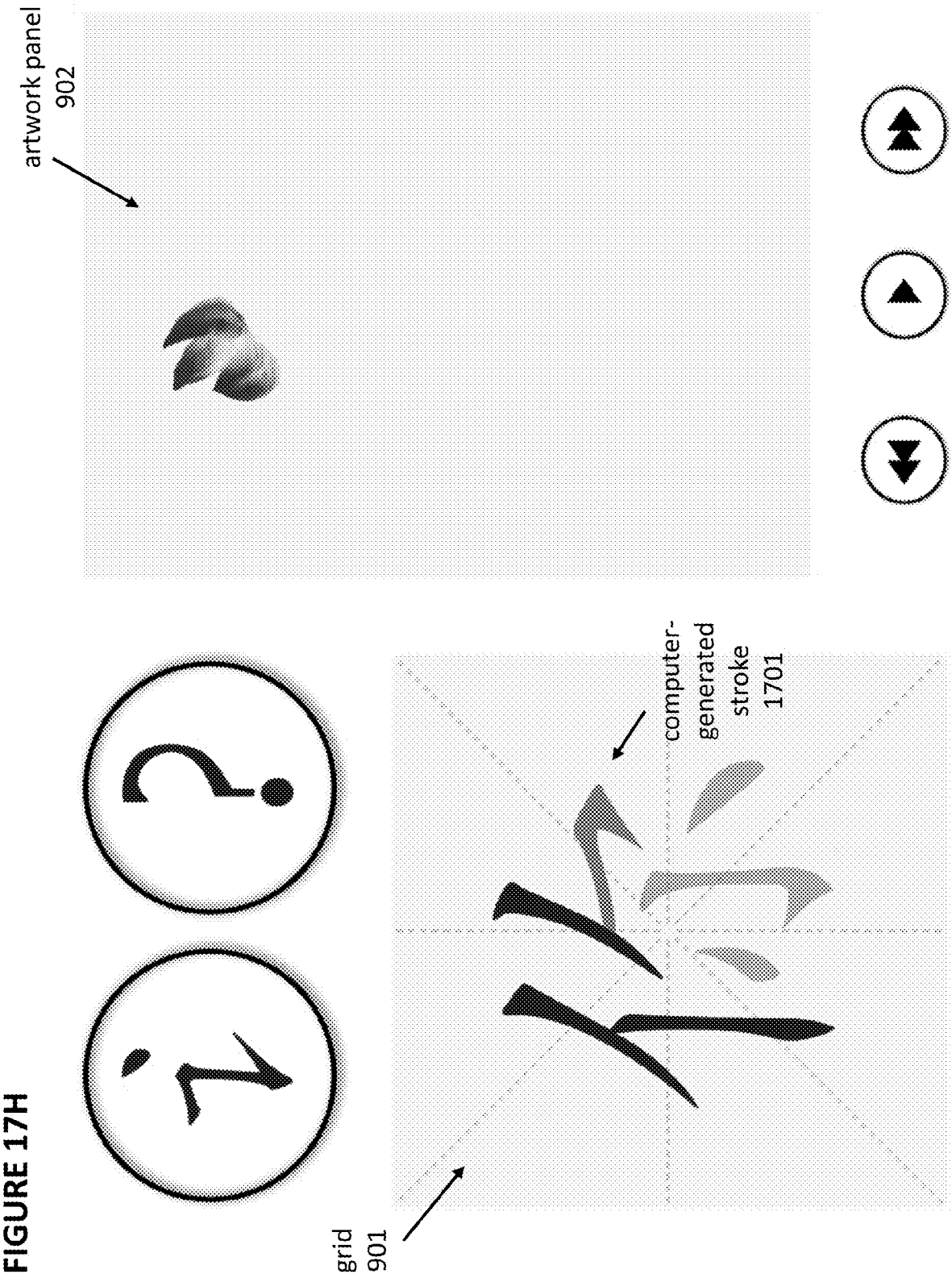

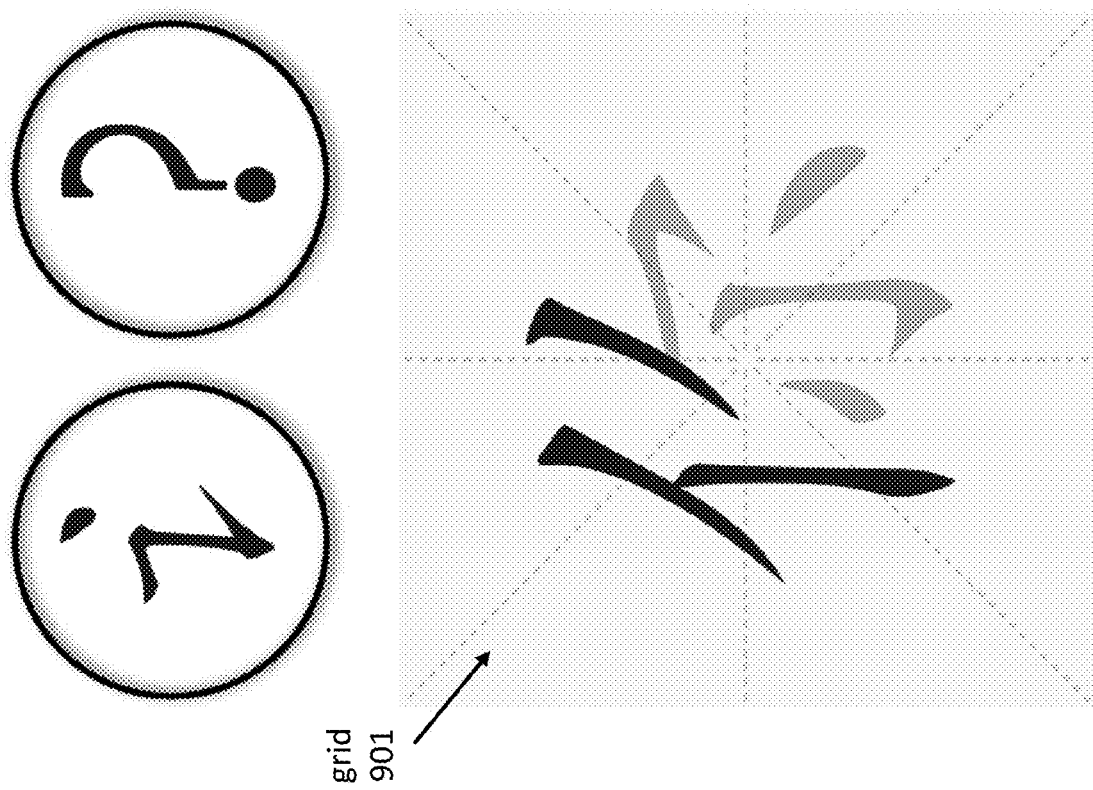
FIGURE 17I

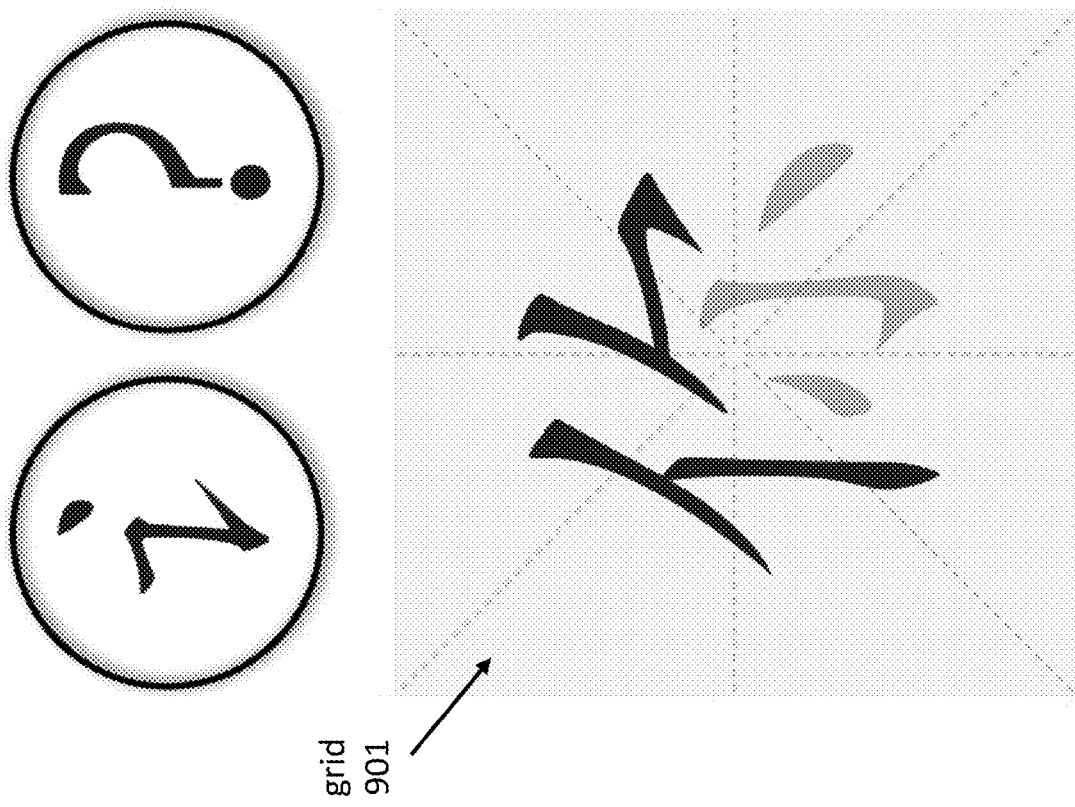
FIGURE 17J

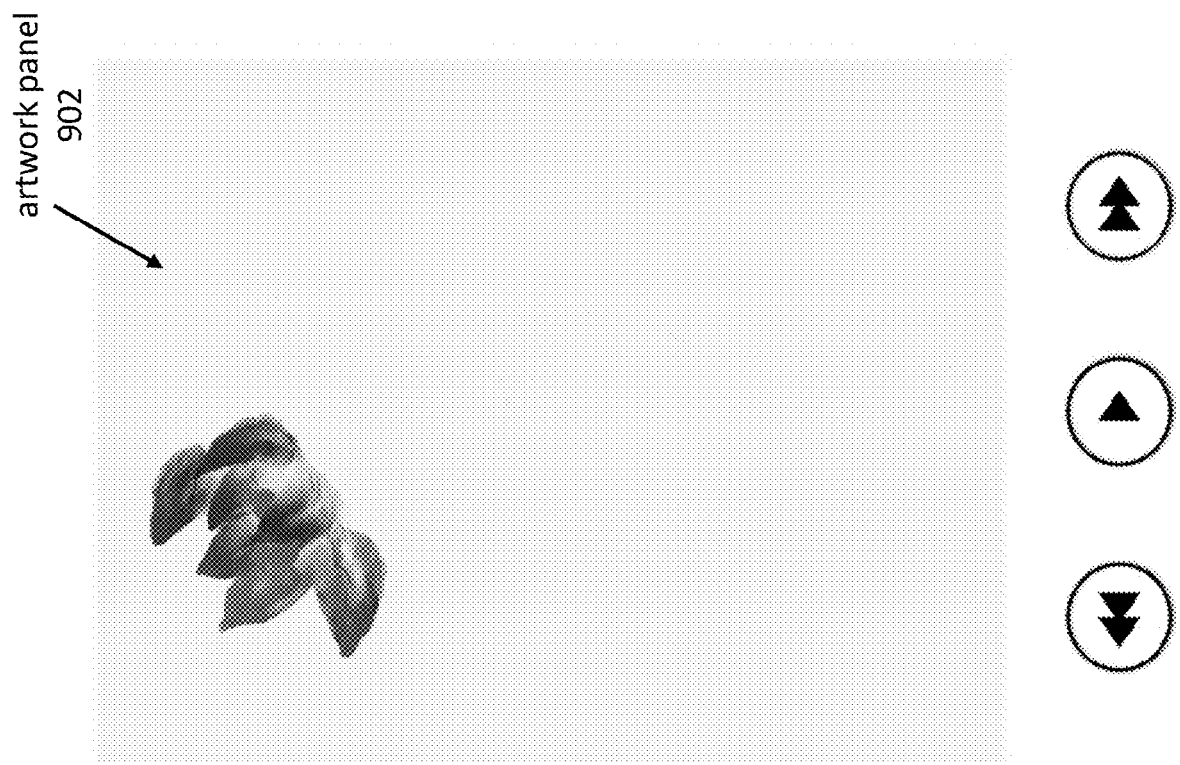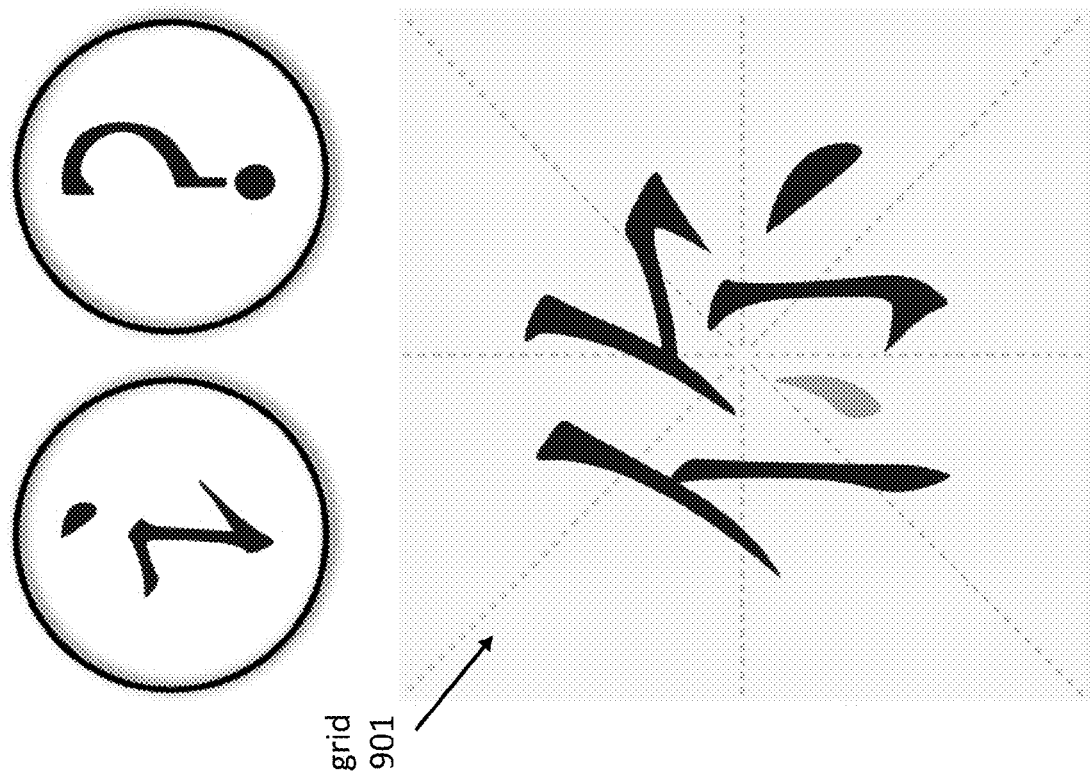
FIGURE 17L

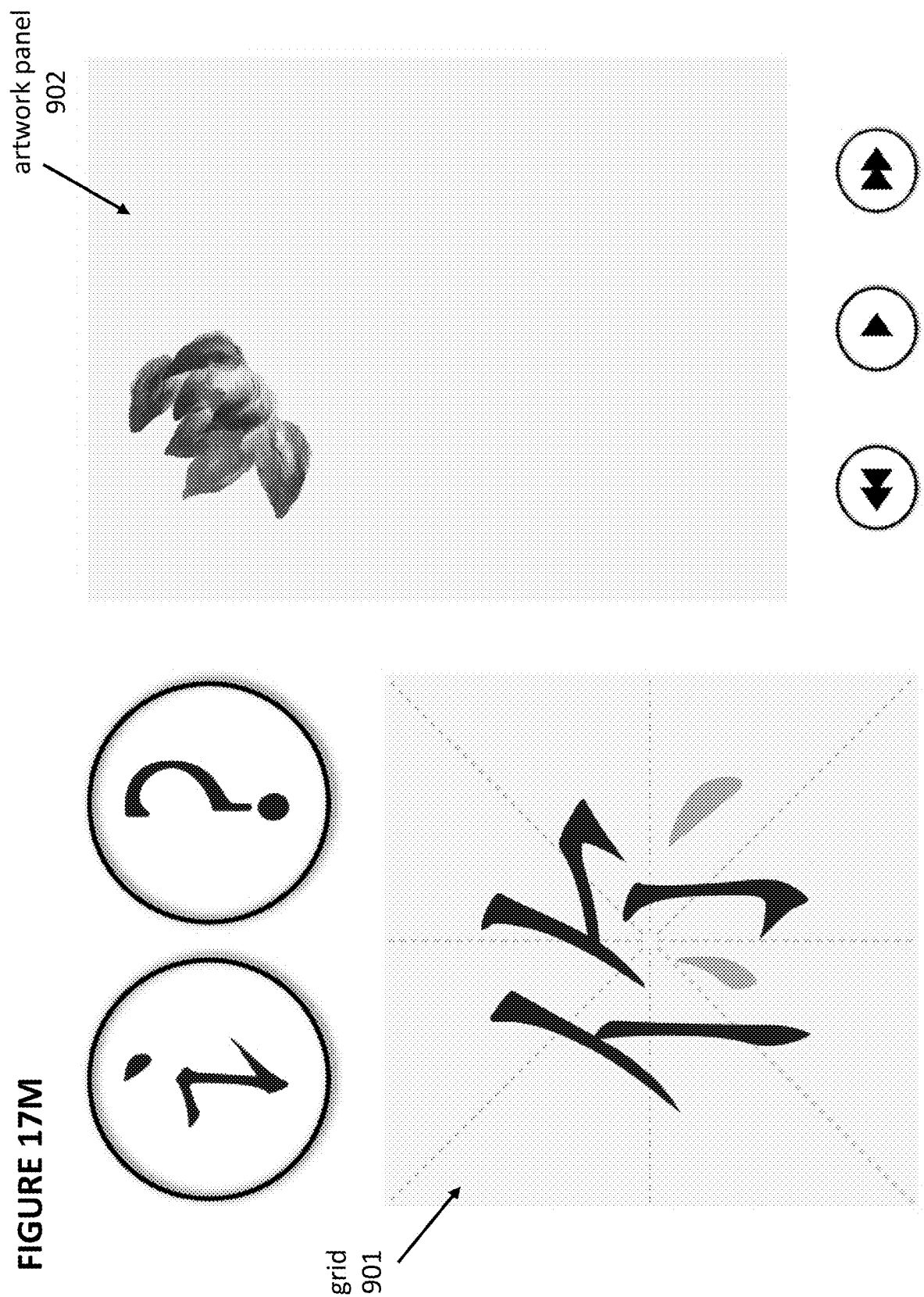

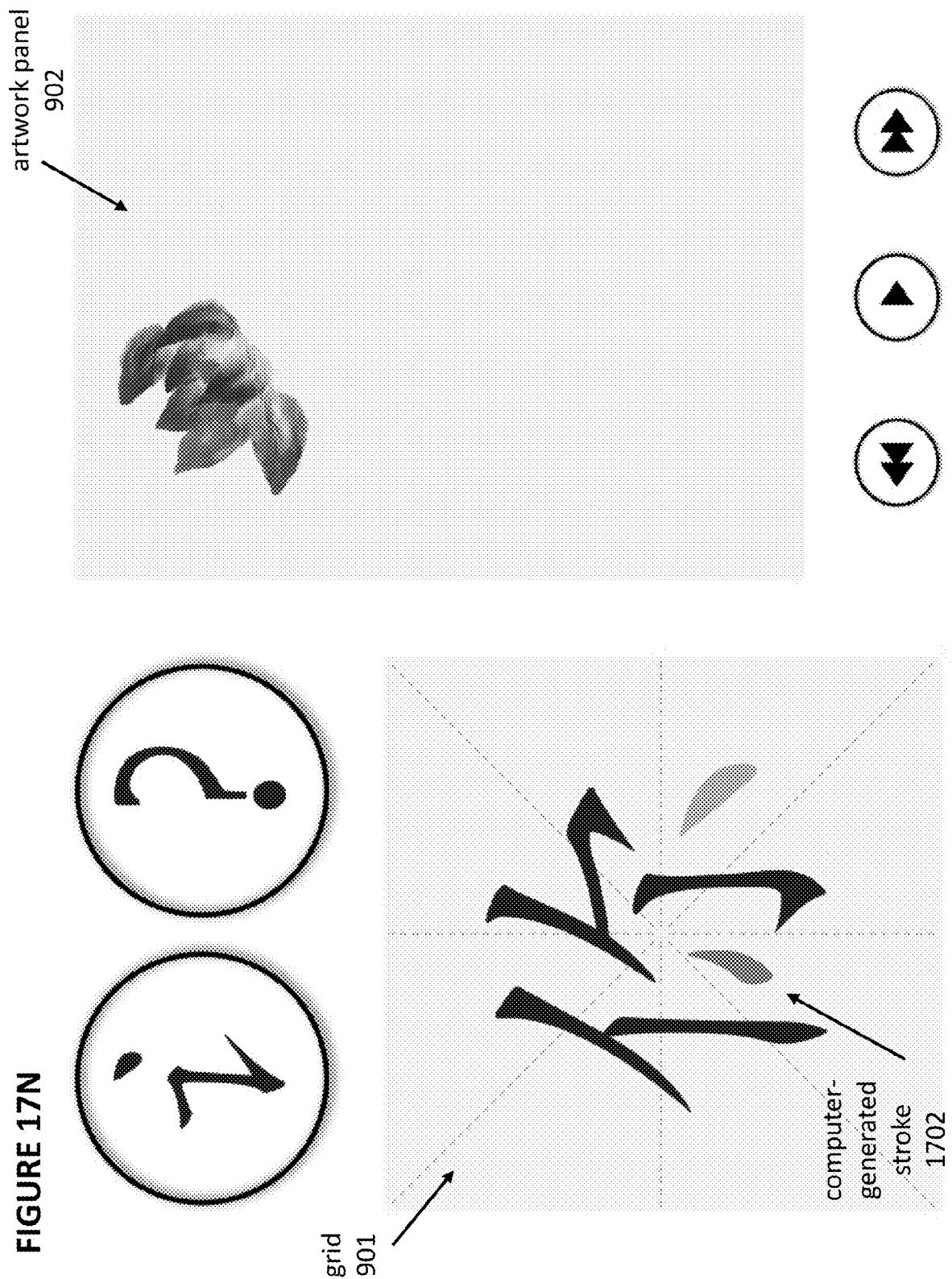

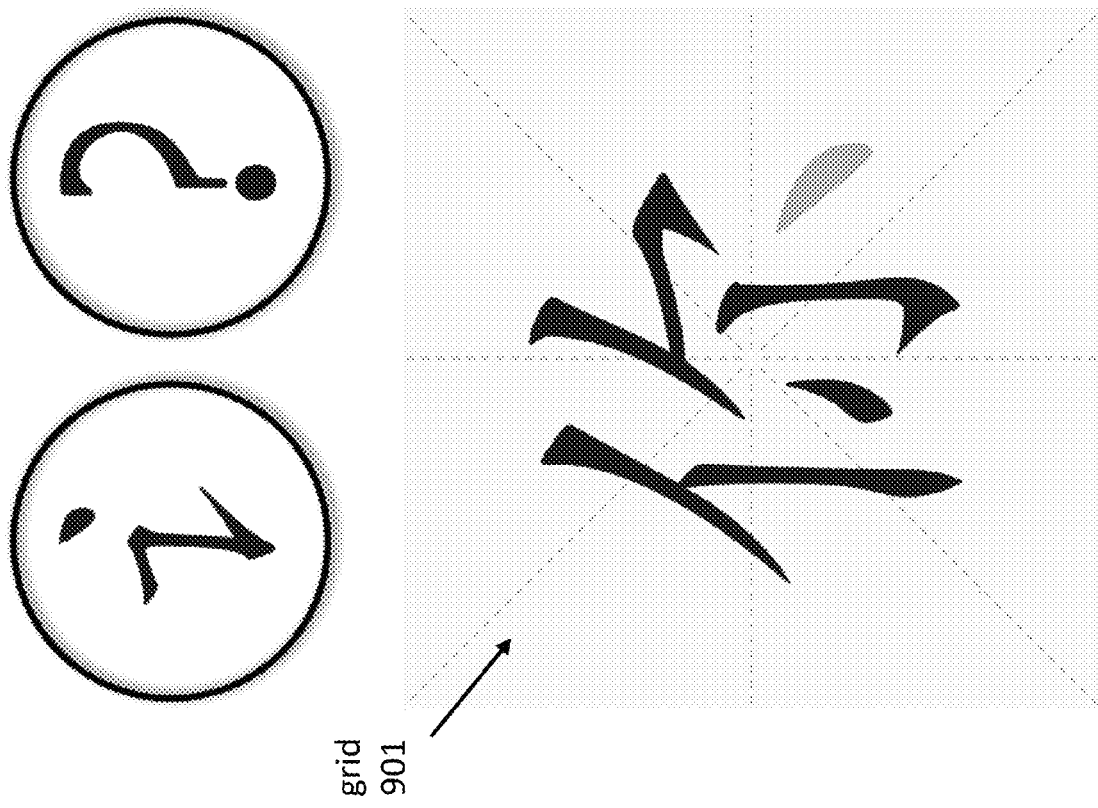
FIGURE 17P

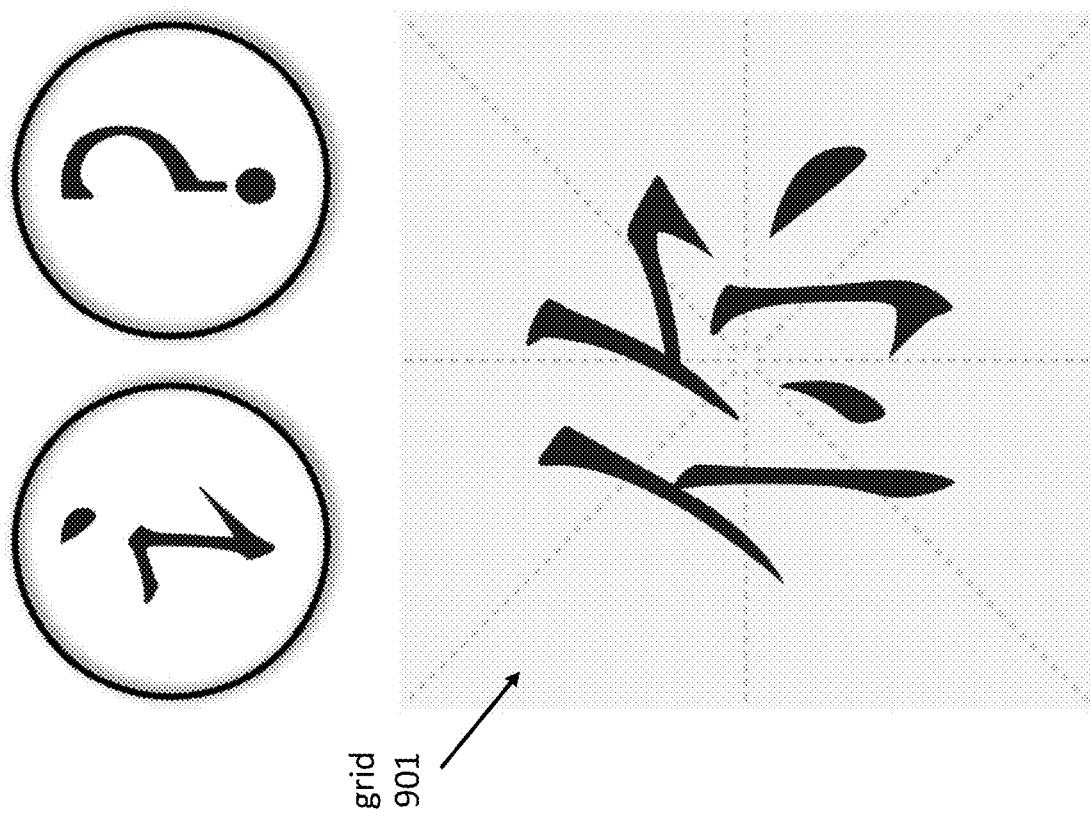
FIGURE 17Q

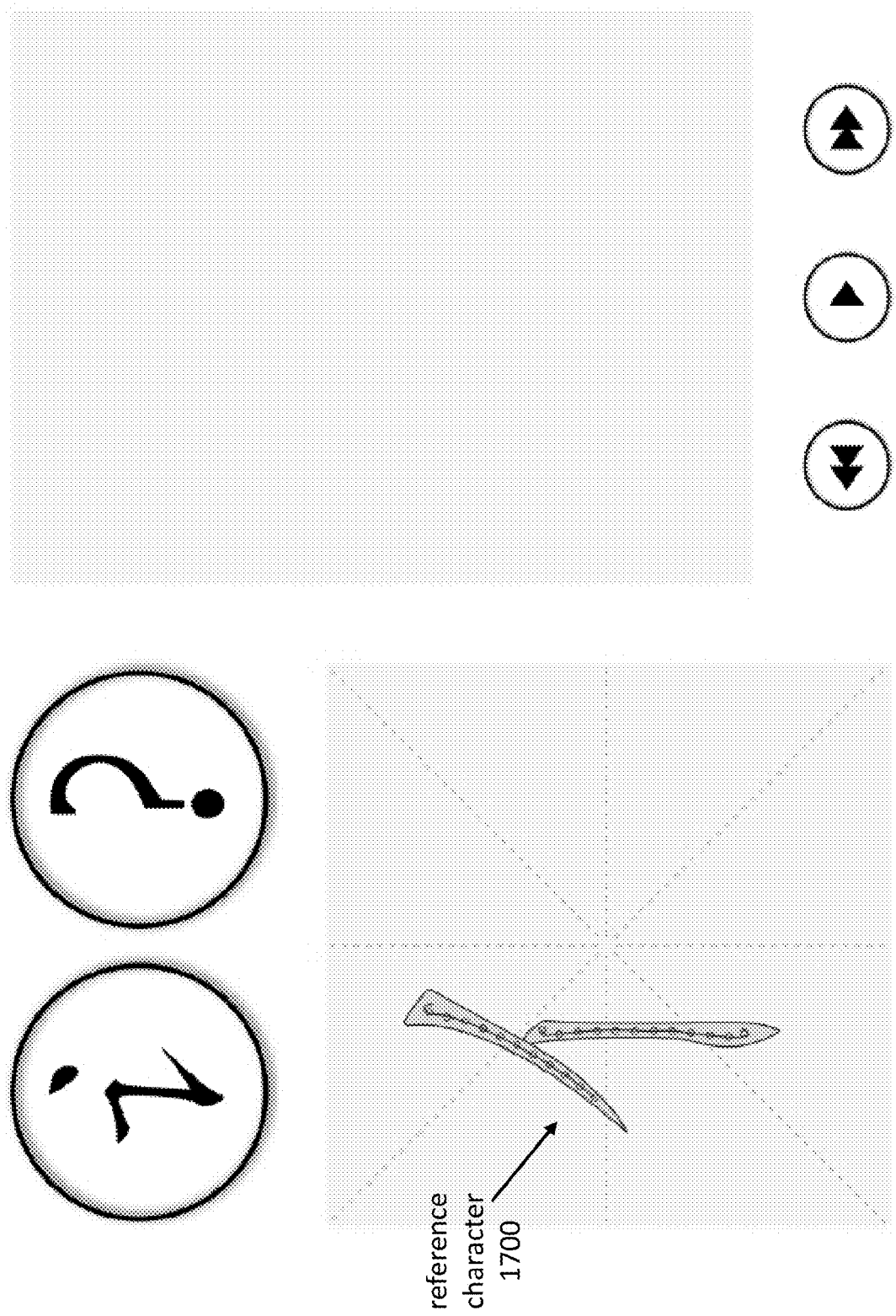

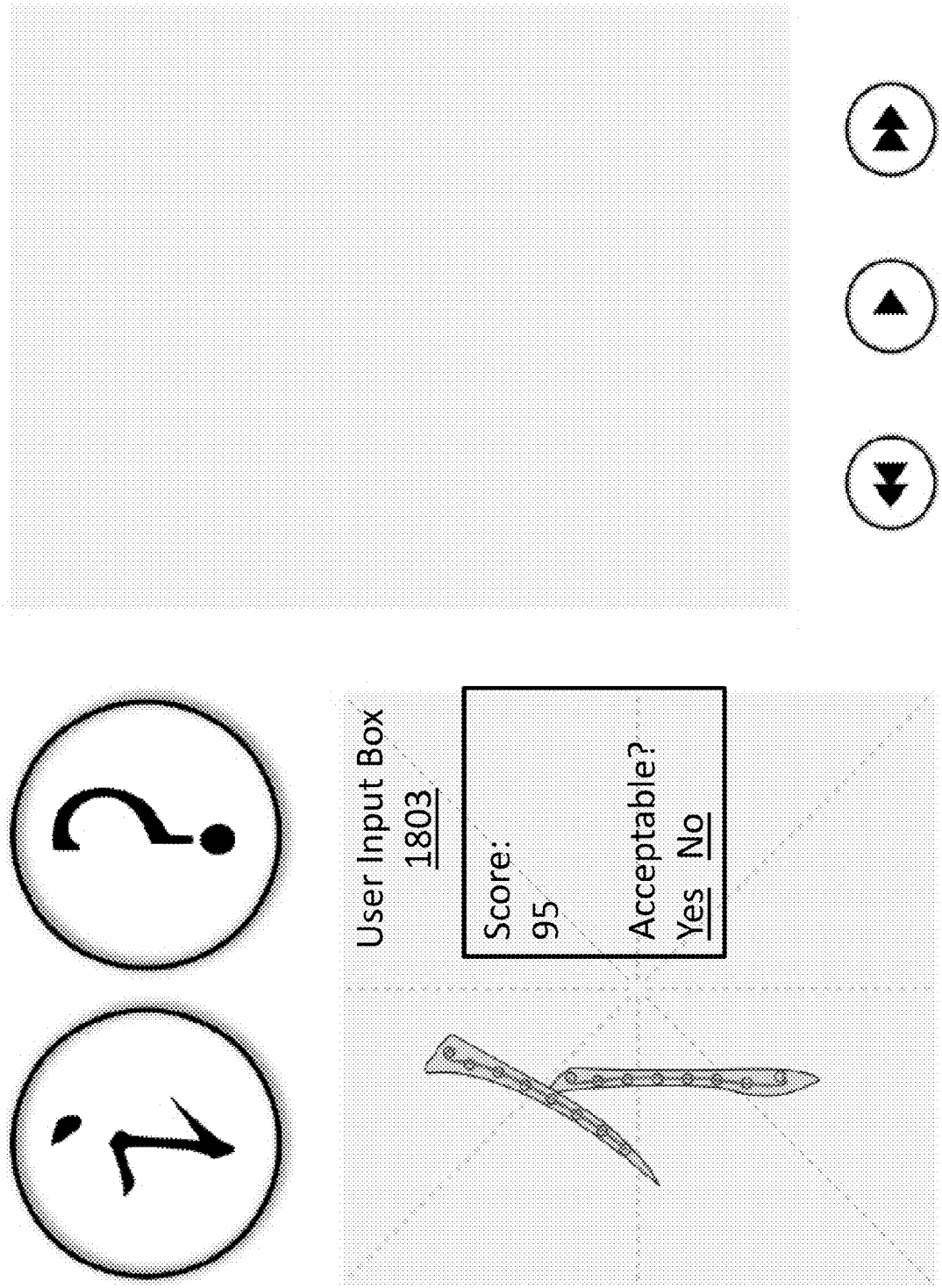

COMPUTERIZED METHOD AND APPARATUS FOR DETERMINING ACCURACY OF WRITTEN CHARACTERS AND STROKE ORDER AND COMPLIANCE WITH RULES AND PROVIDING VISUAL AND AUDIO FEEDBACK

TECHNICAL FIELD

A computerized method and apparatus are disclosed for determining the accuracy of written characters input by a user and whether the characters were formed with the correct strokes and complied with applicable rules and providing visual and audio feedback to the user.

BACKGROUND OF THE INVENTION

Learning a new language is a challenging process for any student. This is the case whether the student is learning his or her native language or a non-native language. Learning written characters can be particularly daunting. For example, native English speakers learn the 26 letters in the English alphabet during early elementary school years. If that student later wishes to learn Mandarin, he or she often is overwhelmed by the immense number of characters involved—the Mandarin written language contains over 50,000 Mandarin characters. An elementary school native speaker of Mandarin in China typically can read and write around 2,000-5,000 Mandarin characters. Thus, to obtain the proficiency of an elementary school student, a non-native speaker, or a native speaker for that matter, must aspire to learn thousands of Mandarin characters.

Traditionally, students learn languages such as Mandarin one character at a time. Often, the student views the character in a hard copy workbook and then practices writing the character over and over. Ideally, a teacher reviews the student's handwritten work and provides feedback on the practice characters. Unlike in the English language, Mandarin characters must be written with extreme precision according to a set of rules. For example, each character might consist of several strokes. Each stroke has a name and a known ideal form with a certain starting point, ending point, curvature, and thickness. In addition, these strokes must be made according to certain rules. For example, the strokes must be written in a particular order. These rules are mandated by the Chinese Department of Education. There are only a few specific characters that are written without following these rules. Those characters are identified by the Department of Education. These rules and character exceptions are contained in APPENDIX A, which is known in the prior art.

If the strokes are not formed properly or if the rules are not being followed, the resulting character will be incorrect to the trained eye and might even constitute a different character with a different meaning than the one that was intended.

FIG. 1 depicts prior art practice sheet 100, as might be found in a hard copy workbook. Practice sheet 100 often comprises dozens of grids 101. Here, grid 101 is a square box containing faint, broken lines dividing the grid into sections to help orient the student within the square. The student practices drawing hand-drawn character 102 in grid 101. It is not uncommon for a student to write each character hundreds of times, with feedback from a teacher on each instance of the character before reaching a point where the student can write the character accurately according to the rules. Over time, the student learns how to properly form each stroke, and the student learns the rules shown in APPENDIX A. The student also learns the meanings of characters and how to draw each character. Needless to say, this is a challenging and tedious process for the student, as well as the teacher.

The prior art also includes computerized educational software that provides an environment for a user to practice writing characters electronically. However, such software is limited in its ability to provide meaningful feedback to the user. Prior art software also tends to be very mechanical and repetitive. Having to complete a repetitive task decreases the effectiveness of the memorization process. When students are forced to memorize information that they find boring, the memories they form tend to be short-term, whereas for language learners it is essential to form long-term memories, accompanied by the ability of easy recall.

In another aspect of the prior art, many people also endeavor to learn traditional Chinese painting techniques. There are two main painting styles in traditional Chinese art. The first style is the "outline" style, where the image is first painted in black ink on paper or canvas, the ink has a chance to dry, and then transparent color is applied over the ink. The second style is the "no outline" style, where the artist uses a combination of ink and color brush strokes, applied directly on paper or canvas. The prior art includes videos that show students how to paint in both styles, but the prior art does not include computer software to help a student learn these painting styles.

What is needed is an improved software environment that shows the user the appropriate way to write a Mandarin character, teaches the user how to form specific strokes and the rules of Mandarin character construction, allows the user to then write the character, assesses the quality of the written character, and provides audio and/or visual feedback to the user in response to the quality of the user's work to provide positive or constructive feedback and a more engaging experience than can be found in the prior art.

What is further needed is an improved software environment that can adjust the difficulty of the lesson based on whether the student is a native speaker or non-native speaker of the language and based on the relative ease with which the student is progressing through the lessons.

What is further needed is a software environment that shows the user how to paint in the outline and no-outline styles of traditional Chinese painting.

What is further needed is a multi-disciplinary software environment that simultaneously teaches the user how to write a Mandarin character while also learning how to paint in the outline or no-outline style.

SUMMARY OF THE INVENTION

A computerized method and apparatus are disclosed for determining the accuracy of written characters input by a user and whether the characters were formed with the correct strokes and complied with applicable rules and providing visual and audio feedback to the user. A computing device comprises a character comparison engine, rules engine, stroke engine, art rendering engine, music engine, and vocalization engine and has access to a character library, rules library, stroke library, art library, and audio library. The computing device shows the user the appropriate way to write a character, allows the user to then write the character, assesses the quality of the written character, and provides audio and/or visual feedback to the user in response to the quality of the user's work to provide positive or constructive feedback. The visual feedback can include step-by-step instruction on how to paint using the traditional Chinese outline or no-outline painting techniques.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 12 depicts a first character set for a user to learn through the software environment.

FIG. 13 depicts a lesson screen.

FIGS. 14A, 14B, 14C, 14D, 14E, 14F, 14G, 14H, 14I, 14J, 14K, 14L, 14M, 14N, 14O, 14P, and 14Q depict an exemplary sequence of drawing a character with the assistance of a shadow reference character and with visual feedback comprising a lesson in the outline style of traditional Chinese painting.

FIGS. 15A, 15B, 15C, 15D, 15E, 15F, 15G, 15H, and 15I depict an exemplary sequence of drawing a character without the assistance of a shadow reference character and with visual feedback comprising a lesson in the outline style of traditional Chinese painting.

FIG. 16 depicts a lesson screen.

FIGS. 17A, 17B, 17C, 17D, 17E, 17F, 17G, 17H, 17I, 17J, 17K, 17L, 17M, 17N, 17O, 17P, and 17Q depict an exemplary sequence of drawing a character with visual feedback comprising a lesson in the no-outline style of traditional Chinese painting.

FIGS. 18A, 18B, 18C, 18D, 18E, and 18F depict a configuration method.

DETAILED DESCRIPTIONS OF THE PREFERRED EMBODIMENTS

Figure 1:
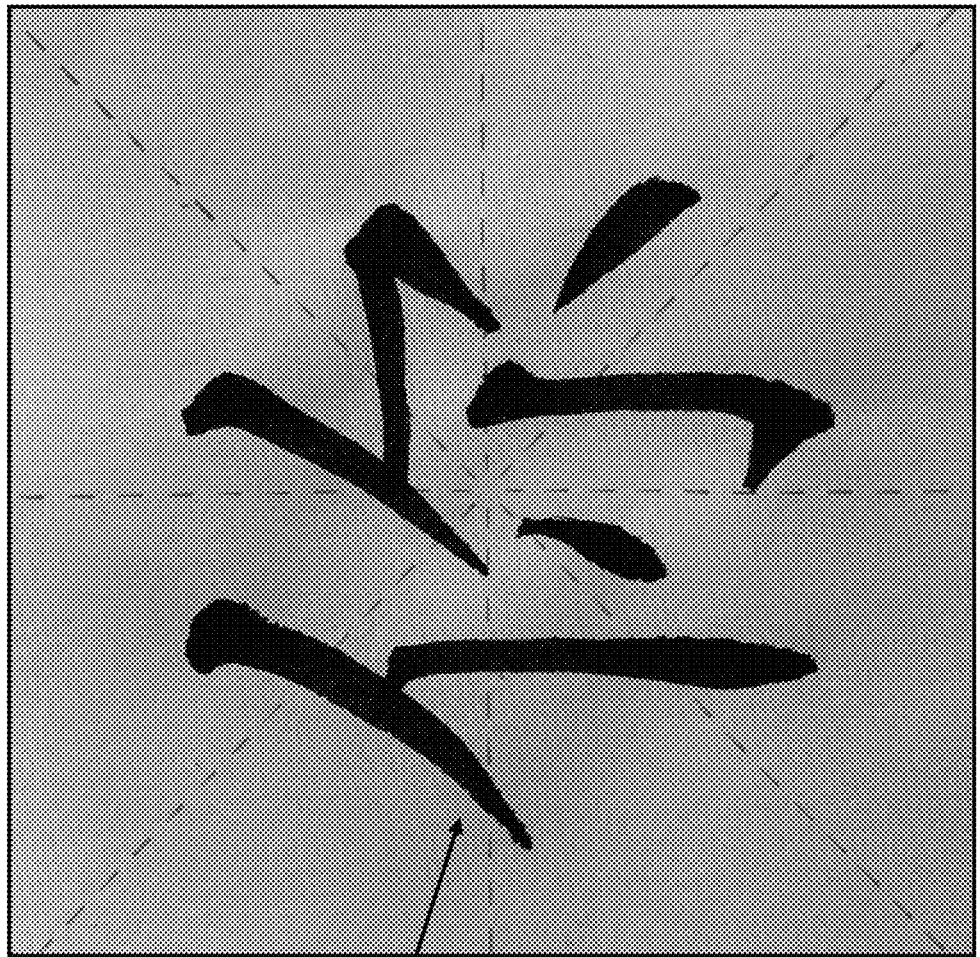
FIG. 1 depicts a prior art practice sheet for practicing written characters.

The embodiments described herein provide an educational experience for the user that was been wholly lacking in the prior art. In the examples provided herein, the software environment teaches the Mandarin (Chinese) language to the user. However, it is to be understood that the software environment can be used for other languages that are character-intensive, such as Cantonese, Japanese or other languages.

The software environment is designed to accomplish the following goals:

1. To help a user to identify strokes and their composition, which is an improvement of the user's analytical and visual skill.
2. To help a user to identify the rules of stroke order, which is improvement of the user's analytical and visual skill
3. To help a user to recognize and memorize the source of the names of the strokes used in Mandarin, which is an improvement of the user's auditory skill.
4. To help a user to visually analyze a Chinese character that is new to the user, and to formulate conceptually how to apply the rules of stroke order in writing the character, which is an improvement of the user's visual and analytical skills.
5. To help a user practice writing simplified Mandarin characters using correct strokes in the correct stroke order, which is an improvement of the user's kinetic skill;
6. To teach the user the standard Mandarin pronunciation of those characters, which is an improvement of the user's auditory skill;
7. To provide translations of those characteristics for a user who is a non-native speaker of Mandarin;
8. To establish a visual connection between writing simplified Mandarin characters and traditional Chinese art, including the outline and no-outline styles;
9. To improve the user's hand-eye coordination; and
10. To encourage the user to write and learn to paint in real life, outside of the software environment, using paper, brushes, ink and paint in the outline and no-outline styles.

To achieve these goals, the game utilizes an educational approach called "Holistic Language Acquisition," which optimizes the use of various aspects of human memory, such as visual, auditory, analytical, associative, and kinetic aspects, in conjunction with cultural context, in order to improve memorization of Mandarin characters and their meanings. Holistic Language Acquisition approach with respect to memory is useful in educational game design because it creates a conceptual framework in which the various aspects of memory become classification categories. The existence of these categories helps establish parameters for dosing the different types of cognitive input presented to the user. A combination of inputs presented in particular doses helps achieve the desired learning effect. As the user advances in the learning process, the game needs to make adjustments to maintain the user's attention. In this way, educational game design can be thought of as dynamic optimization problem. The error rate in the user's responses and the speed with which the user responds to problems can act as indicators of the user's rate of learning progress in and help modulate the dynamic adjustment process.

For example, in the software environment, the various aspects of a user's memory are utilized and exercised in the following ways:

Visual: The users are presented with the images of Mandarin characters and expected to copy them using the correct strokes in the correct order. If they make a mistake in either the type of stroke or the stroke order, their mistake is highlighted. The incorrect stroke disappears, and the program demonstrates the correct stroke or stroke order. The user's mistake is highlighted in a color other than red, such as the color green, for the following reason: teachers often use the color red to correct student papers in school, so a student may associate that color with feeling guilty for making the mistake. The software environment is designed to avoid making users feel that way, to maintain a goal-oriented focus and a positive attitude. Negative self-assessment can be distractive and interfere with the memorization process. Initially, for all but the final character in a set, the user receives an indication of whether the character strokes are correct and performed in a correct order by observing the change of color in the outline-style painting that is displayed on the same screen as the writing exercise. For the final character at the end of each set, the user receives step-by-step instruction in painting a flower or other object in the non-outline style.

Auditory: In the preferable setting, the user hears only the target words and the writing rules in Mandarin. The translation of the words and other information is provided in only in writing. This focuses the user's auditory attention on the target information and prevents audio linguistic distractions. The exception is made for children who have not yet become proficient in reading.

Analytical: The users are presented the characters in groupings according to the radicals they contain. The outline and no-outline paintings are presented as a combination of brush strokes that are assembled one by one to produce the painting.

Associative: The users are taught to associate the sound of the word with each character and the sound of a rule with an action or a sequence of actions that fulfills the rule's requirements.

Kinetic: The user needs to "write" particular strokes on the screen. The action of writing the strokes and a particular sequence of strokes settles in the user's memory, similar to the way in which dance steps settle in the memory of a dancer.

Cultural Context: In Chinese culture, traditional painting is typically associated with poetry written in calligraphic style. In fact, a traditional painting is considered incomplete without such a poem. Normally, programs for writing simplified characters use cartoon illustrations. Our innovation is using simplified characters that are written side by side with traditional style painting. The writing and the painting progress side by side, thereby creating a visual and temporal association between both art forms. Traditional art images highlight the aesthetic qualities of simplified Chinese characters making them more attractive and more memorable to the users. The short animation sequences will be accompanied by melody excerpts derived from traditional Chinese songs. This will enhance the cultural immersion effect for the users.

Computing Devices

The embodiments described herein are implemented on computing devices. In one embodiment, a client device interacts with a server over a network. In another embodiment, the client device is a stand-alone computing device and does not interact with a server.

Figure 2:
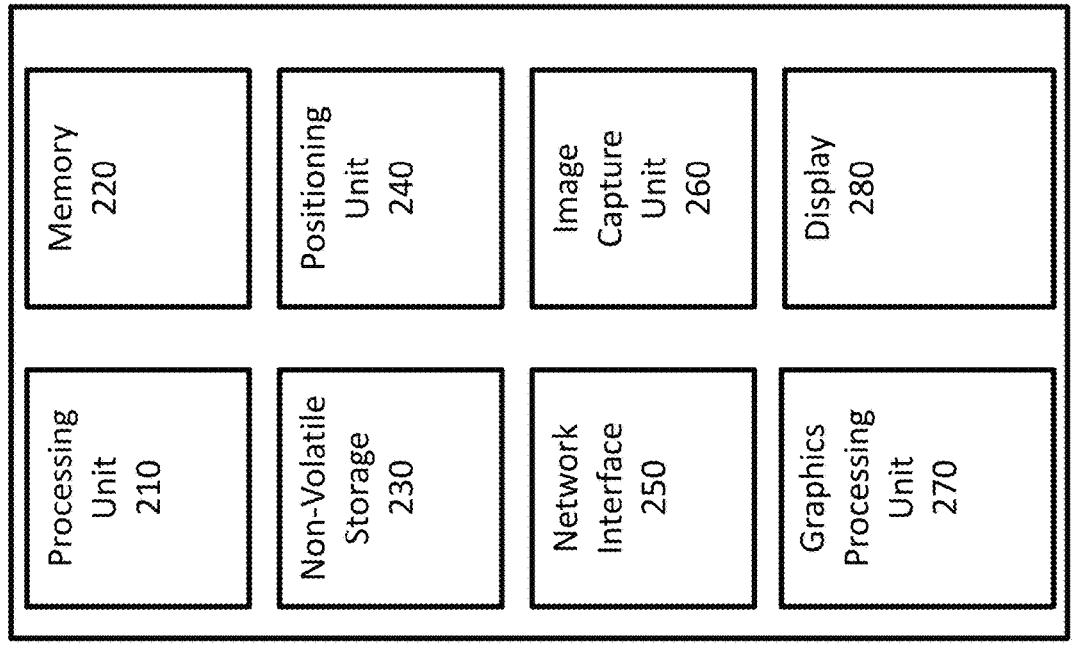
FIG. 2 depicts hardware components of a prior art client device.

FIG. 2 depicts hardware components of client device 200, which is a computing device such as a tablet, smartphone, notebook computer, desktop computer, gaming unit, wearable computing device such as a watch or glasses, or any other computing device. These hardware components are known in the prior art. Client device 200 is a computing device that comprises processing unit 210, memory 220, non-volatile storage 230, positioning unit 240, network interface 250, image capture unit 260, graphics processing unit 270, and display 280.

Processing unit 210 optionally comprises a microprocessor with one or more processing cores. Memory 220 optionally comprises DRAM or SRAM volatile memory. Non-volatile storage 230 optionally comprises a hard disk drive or flash memory array. Positioning unit 240 optionally comprises a GPS unit or GNSS unit that communicates with GPS or GNSS satellites to determine latitude and longitude coordinates for client device 200, usually output as latitude data and longitude data. Network interface 250 optionally comprises a wired interface (e.g., Ethernet interface) or wireless interface (e.g., 3G, 4G, 5G, GSM, 802.11, protocol known by the trademark BLUETOOTH, etc.). Image capture unit 260 optionally comprises one or more standard cameras (as is currently found on most smartphones and notebook computers). Graphics processing unit 270 optionally comprises a controller or processor for generating graphics for display. Display 280 displays the graphics generated by graphics processing unit 270, and in the preferred embodiment, comprises a touchscreen.

Figure 3:
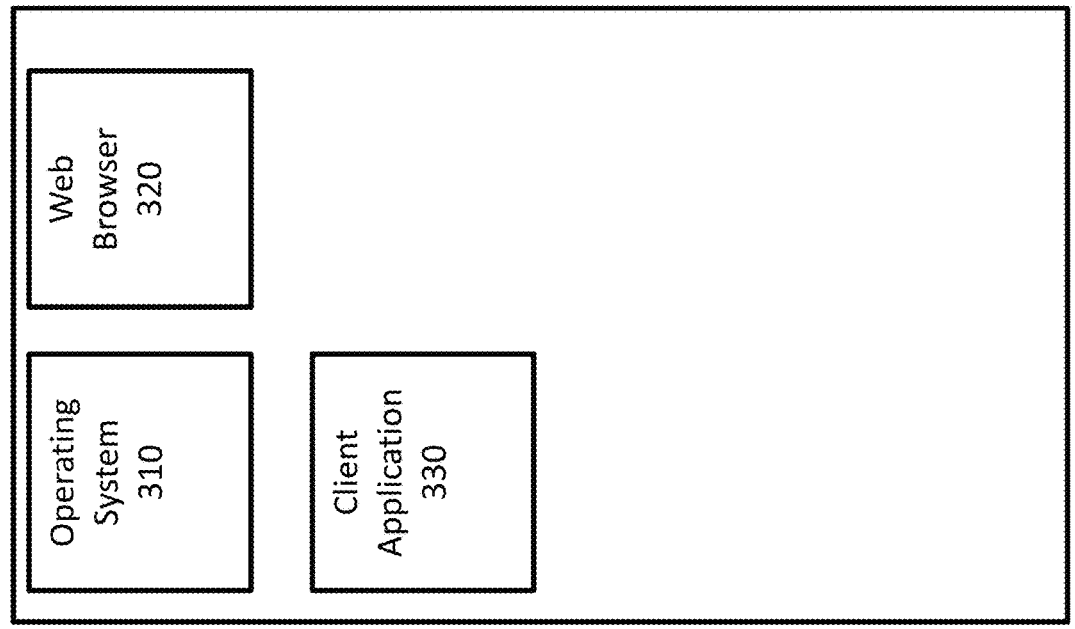
FIG. 3 depicts software components of a client device.

FIG. 3 depicts software components of client device 200. Client device 200 comprises operating system 310 (such as the operating systems known by the trademarks WINDOWS, LINUX, ANDROID, IOS, or other operating system), web browser 320 (such as the web browser known by the trademarks CHROME, FIREFOX, SAFARI, EDGE, or other web browser), and client application 330. Client application 330 comprises lines of software code executed by processing unit 210 and/or graphics processing unit 270 to perform the functions described below. For example, client device 200 can be a tablet sold with the trademark "IPAD" by Apple, and client application 330 can be a downloadable app installed on the tablet. Client device 200 also can be a notebook computer, desktop computer, game system, or other computing device, and client application 330 can be a software application running on client device 200. Client application 330 forms an important component of the inventive aspect of the embodiments described herein, and client application 330 is not known in the prior art.

In an alternative embodiment, all of the functionality described herein for client application 330 is instead performed by web browser 320, as might be desirable if software environment is provided through a web site.

Figure 4:
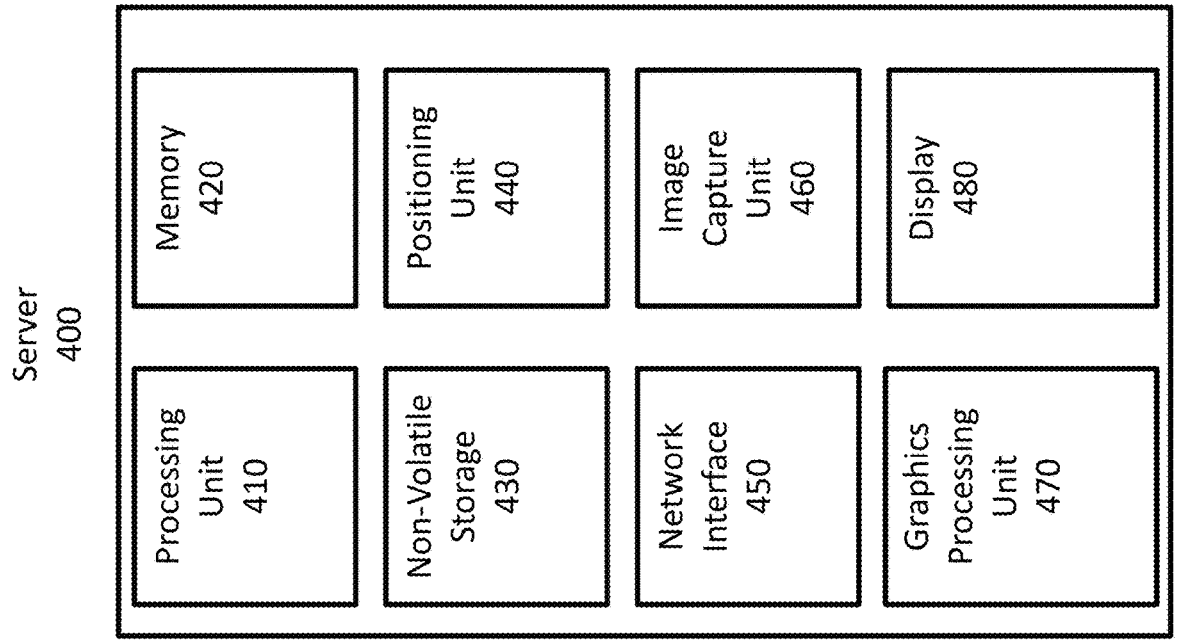
FIG. 4 depicts hardware components of a prior art server.

FIG. 4 depicts hardware components of server 400. These hardware components are known in the prior art. Server 400 is a computing device that comprises processing unit 410, memory 420, non-volatile storage 430, positioning unit 440, network interface 450, image capture unit 460, graphics processing unit 470, and display 480.

Processing unit 410 optionally comprises a microprocessor with one or more processing cores. Memory 420 optionally comprises DRAM or SRAM volatile memory. Non-volatile storage 430 optionally comprises a hard disk drive or flash memory array. Positioning unit 440 optionally comprises a GPS unit or GNSS unit that communicates with GPS or GNSS satellites to determine latitude and longitude coordinates for server 400, usually output as latitude data and longitude data. Network interface 450 optionally comprises a wired interface (e.g., Ethernet interface) or wireless interface (e.g., 3G, 4G, 5G, GSM, 802.11, protocol known by the trademark "BLUETOOTH," etc.). Image capture unit 460 optionally comprises one or more standard cameras (as is currently found on most smartphones and notebook computers). Graphics processing unit 470 optionally comprises a controller or processor for generating graphics for display. Display 480 displays the graphics generated by graphics processing unit 470, and optionally comprises a monitor, touchscreen, or other type of display.

Figure 5:
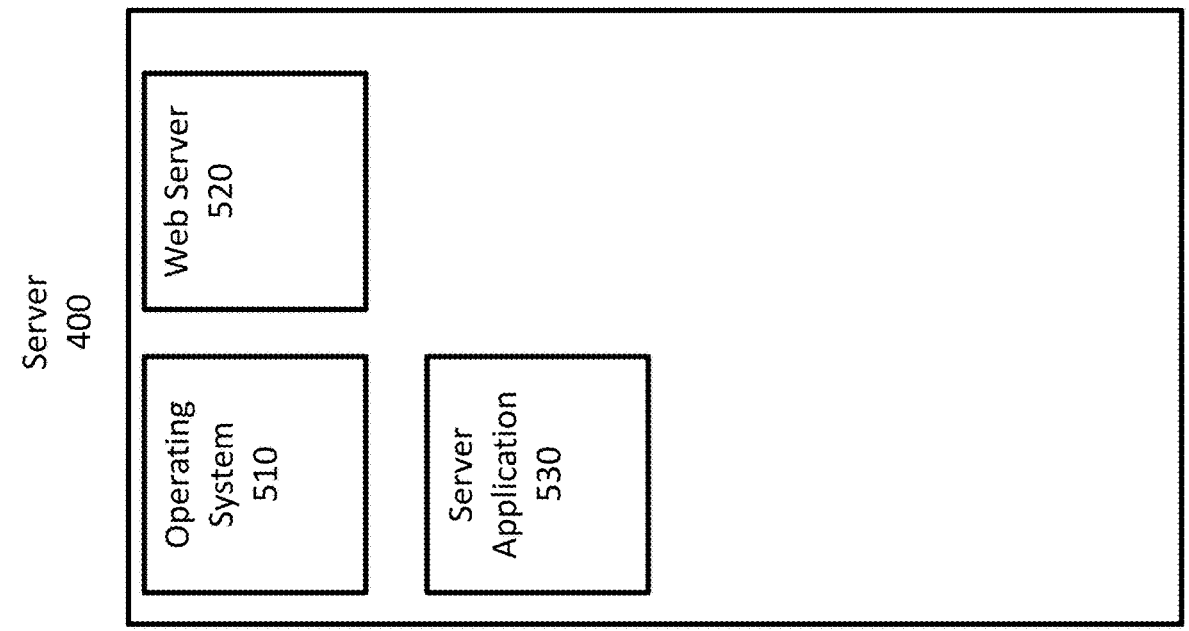
FIG. 5 depicts software components of a server.

FIG. 5 depicts software components of server 400. Server 400 comprises operating system 510 (such as the server operating systems known by the trademarks "WINDOWS SERVER," "MAC OS X SERVER," "LINUX," or others), web server 520 (such as the web server known by the trademark "APACHE), and server application 530. Server application 530 comprises lines of software code executed by processing unit 410 and/or graphics processing unit 470, and server application 530 is designed specifically to interact with client application 330. Server application 530 is not known in the prior art.

In an alternative embodiment, all of the functionality described herein for server application 530 is instead performed by web server 520 in communication with web browser 320, as might be desirable if software environment is provided through a web site.

Figure 6:
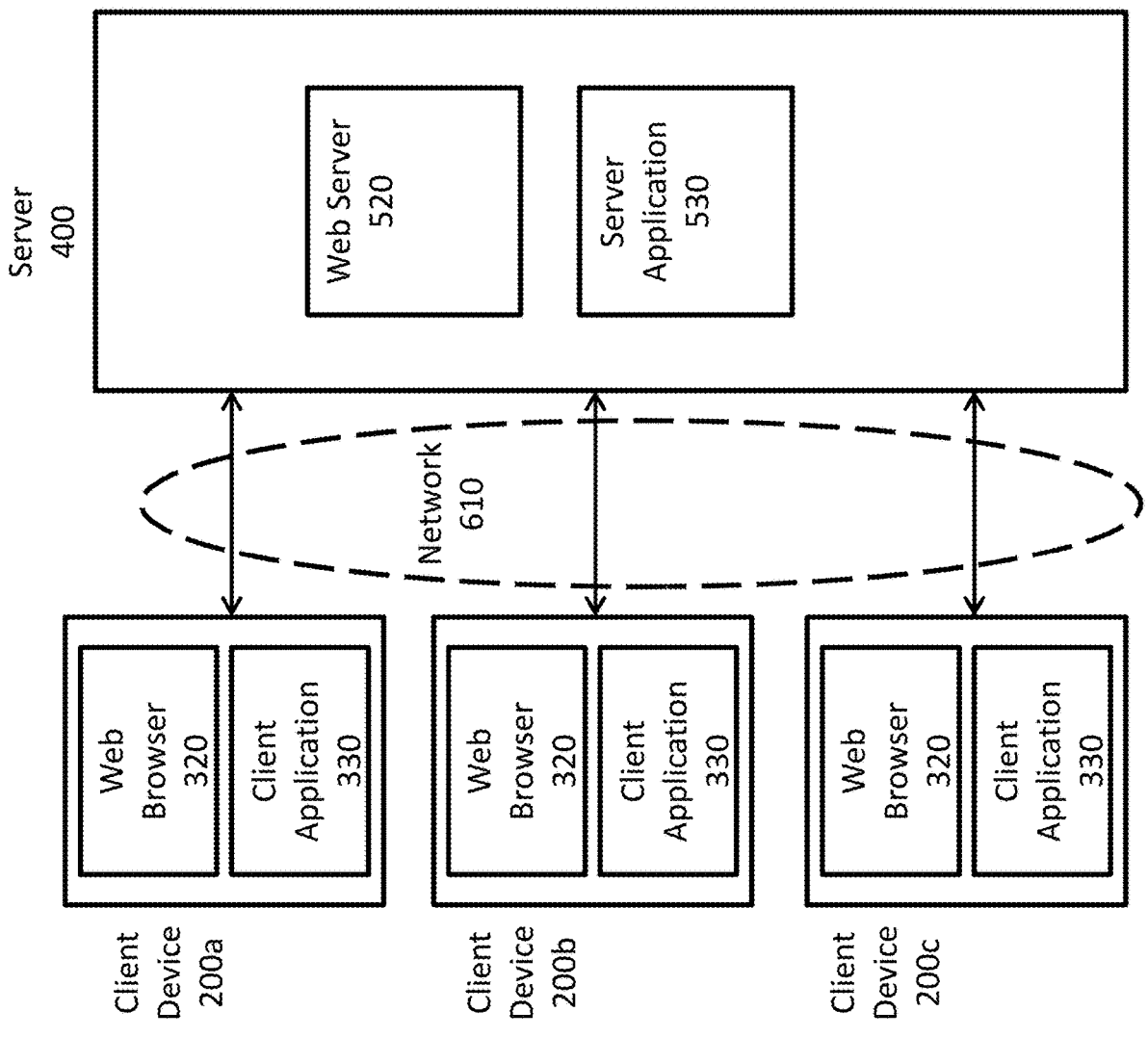
FIG. 6 depicts a plurality of client devices communicating with a server.

With reference to FIG. 6, three instantiations of client device 200 are shown, client devices 200a, 200b, and 200c. These are exemplary devices, and it is to be understood that any number of different instantiations of client device 200 can be used. Client devices 200a, 200b, and 200c each communicate with server 400 using network interface 250 over network 610. In this example, each client device 200 operates its own instantiation of web browser 320 and client application 330.

Figure 7:
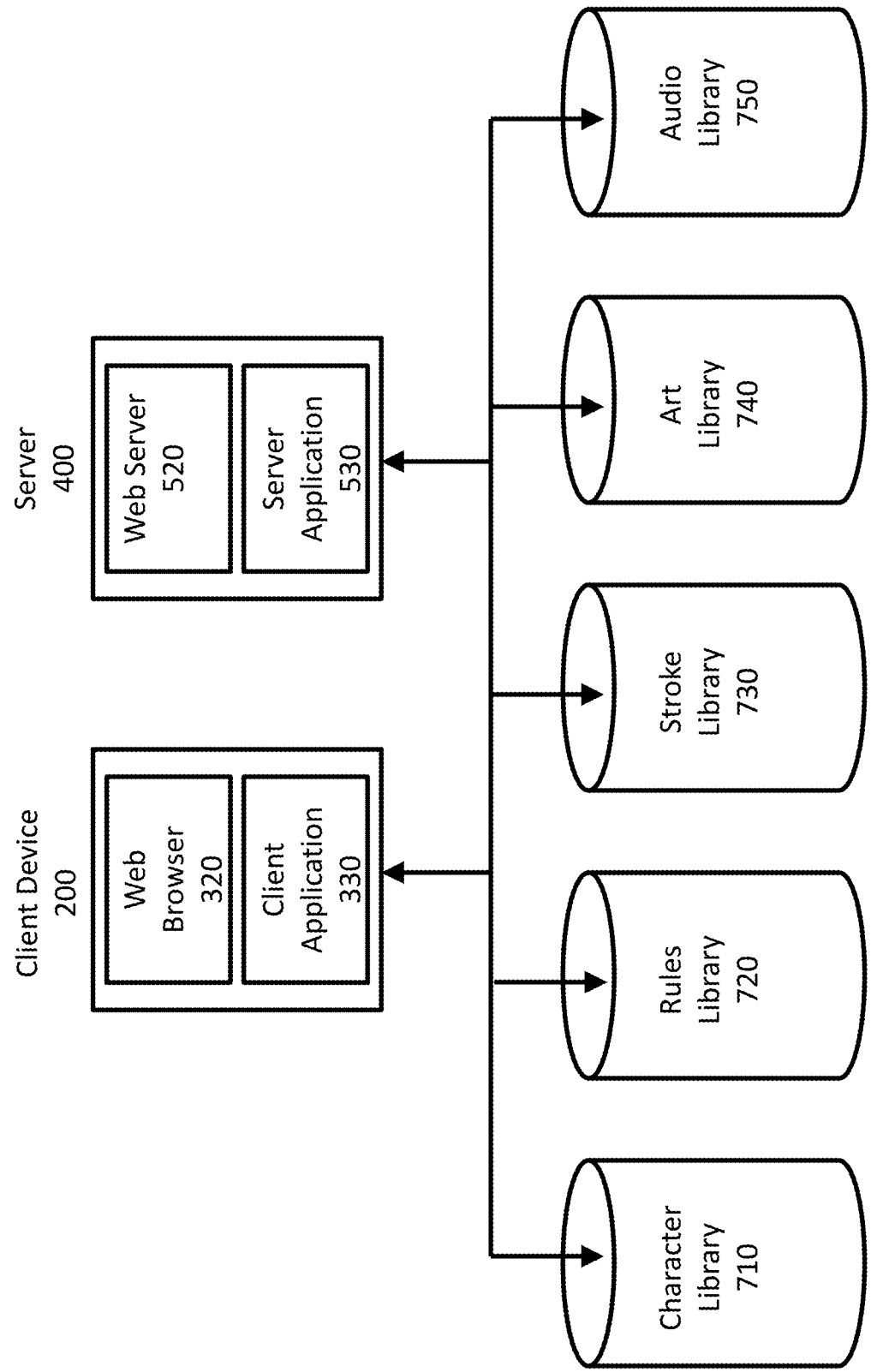
FIG. 7 depicts a character library, an art library, and a music library.

FIG. 7 depicts character library 710, rules library 720, stroke library 730, art library 740, and audio library 750, each of which comprises a data set stored in a database within non-volatile storage. Character library 710, rules library 720, stroke library 730, art library 740, and audio library 750 are accessible by client 200 and server 400.

Figure 8:
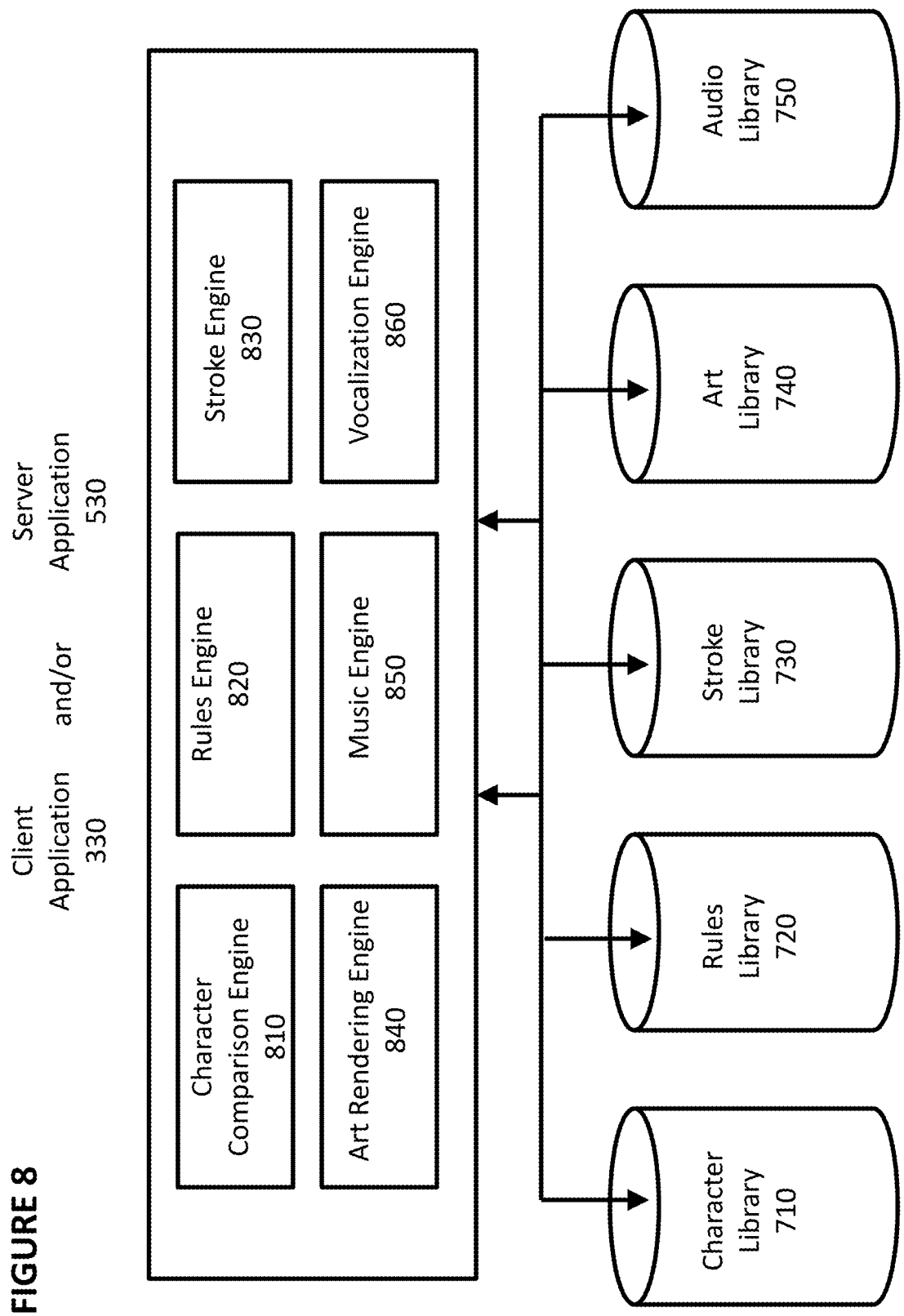
FIG. 8 depicts a character comparison engine executed by a client application and/or a server application.

FIG. 8 depicts various engines operated by client application 330 and/or server application 530, including character comparison engine 810, rules engine 820, stroke engine 830, art rendering engine 840, music engine 850, and vocalization engine 860, each of which comprises lines of software code executed by processing units 210 and/or 410 and/or graphics processing units 270 and/or 470.

Software Environment

Additional detail will now be provided regarding character comparison engine 810, rule engine 820, stroke engine 830, art rendering engine 840, music engine 850, vocalization engine 860, character library 710, rules library 720, stroke library 730, art library 740, and audio library 750 and the functionality that they collectively enable in client device 200 and server 400.

Figure 9:
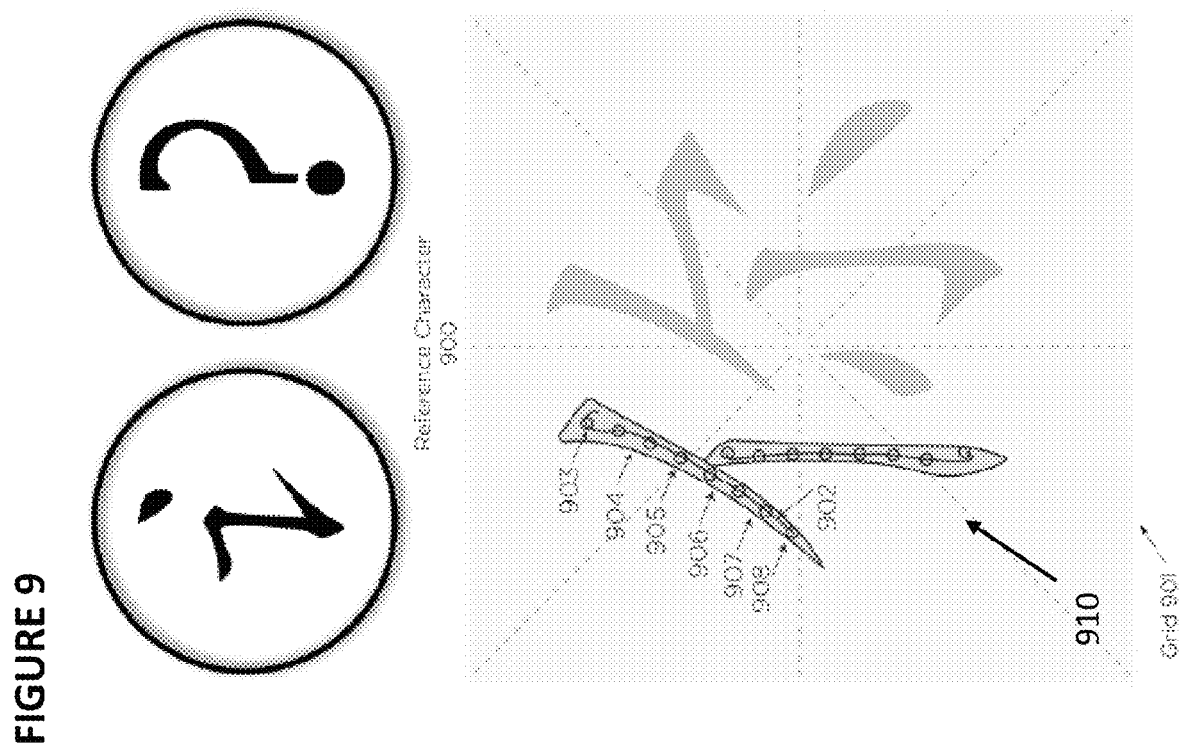
FIG. 9 depicts a reference character.

FIG. 9 depicts reference character 900 superimposed over grid 901. These are graphical depictions on display 280 of client device 200 and associated pixel data and data structures in memory 220 or graphic processing unit 270. Character library 710 stores data for reference character 900 and many other characters. Rules library 720 stores data regarding rules to be followed in writing all characters, including but not limited to the following rules for stroke order promulgated by the China National Language and Character Working Committee:

1. From top to bottom
2. From left to right
3. Horizontal before vertical
4. Diagonals right-to-left before diagonals left-to-right
5. Outside before inside—refers to cases where the enclosing strokes surround the internal structure from upper left, upper right or from above
6. Inside before outside—refers to cases where the enclosing strokes surround the internal structure from below or from the lower left.
7. Inside before bottom enclosing
8. Center verticals before outside "wings"
9. Cutting strokes last
10. Left vertical before enclosing
11. Top or upper-left dots first
12. Inside or upper-right dots last Stroke library 730 stores data regarding the ideal form of each possible type of stroke that may be used in any possible character.

Reference character 900 comprises stroke 902, stroke 910, and other strokes. For stroke 902, data regarding sample points 903, 904, 905, 906, 907, and 908 are captured and stored. Sample point 903 is the starting point for stroke 902. The stroke begins at the tip of the "hook" at the top, travels through sample point 903 and ends at sample point 908. Similar sample points are captured for all other strokes in reference character 900. The type of data stored in character library 610 for each character and stroke, such as reference character 900 and stroke 902, is shown below in Table 1.

TABLE 1

DATASET FOR REFERENCE CHARACTERS

| Character/ Stroke/Point | Grid Coordinates | Slope | Order of Creation | Type of Stroke |
|---|---|---|---|---|
| Character 900 | | | | |
| Stroke 902 | | | $1^{st}$ Stroke | pie |
| Point 903 | x1, y1 | s1 | 1 | |
| Point 904 | x2, y2 | s2 | 2 | |
| Point 905 | x3, y3 | s3 | 3 | |
| Point 906 | x4, y4 | s4 | 4 | |
| Point 907 | x5, y5 | s5 | 5 | |
| Point 908 | x6, y6 | s6 | 6 | |
| Stroke 910 | | | $2^{nd}$ Stroke | shu |
| . . . | . . . | . . . | . . . | . . . |

In Table 1, the grid coordinates x,y indicate the relative location within grid 901 of the particular point. For example, the lower left corner of grid 901 might have the coordinates 0,0, and each increment would represent movement by one pixel either up or to the right. The slope s in Table 1 represents the slope of stroke 902 at that particular point, which provides information about the curvature of stroke 902. The type of stroke in Table 1 indicates the type of stroke for stroke 902 (according to stroke library 730). The order of creation in Table 1 indicates the order in which each stroke should be made (according to rules library 720) and the order in which the points within each stroke, such as stroke 902, is properly formed. That is, point 903, which is the starting point, is formed first and point 908, which is the ending point is formed last.

Figure 10A:
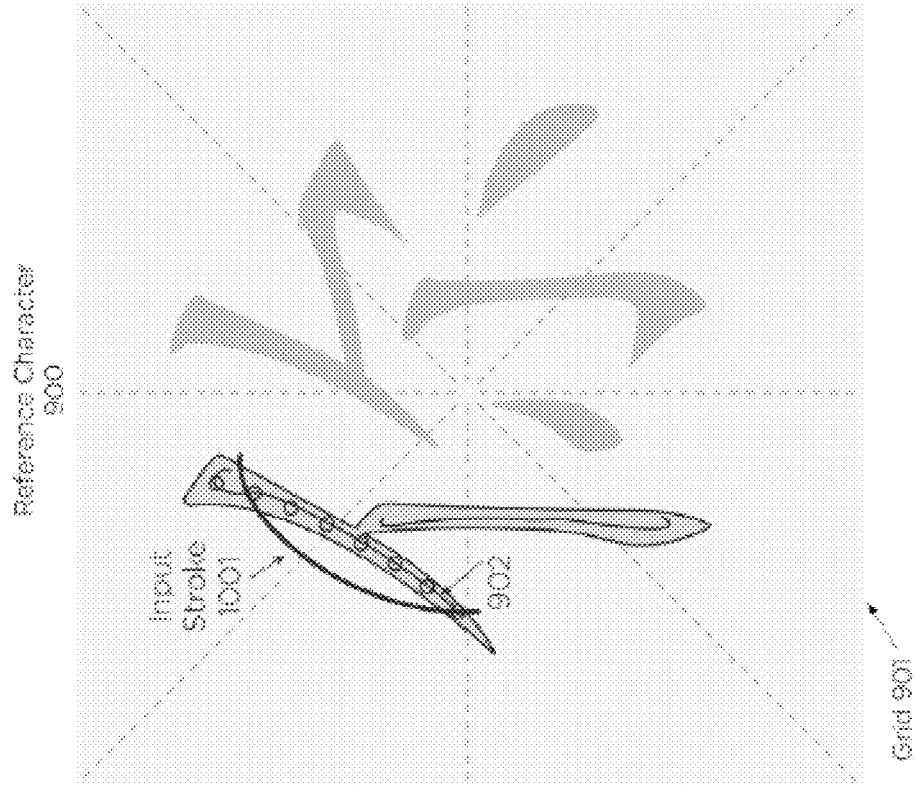
FIG. 10A depicts a grid generated in a user interface that allows a user to draw an input stroke.
Figure 10B:
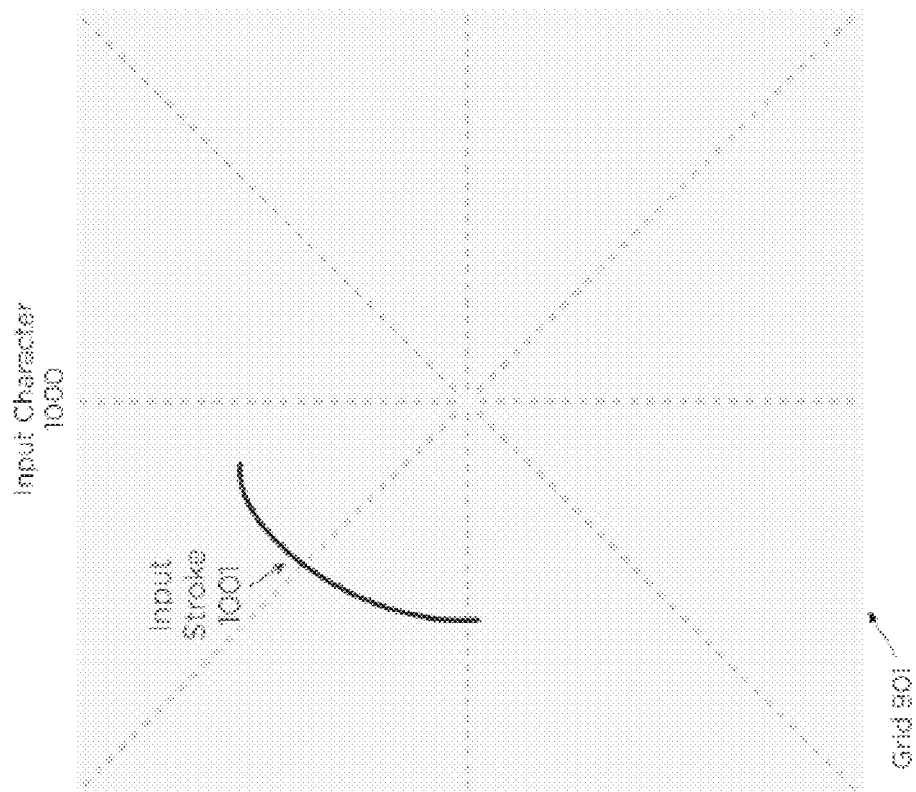
FIG. 10B depicts the comparison of the input stroke of FIG. 10A with the reference character of FIG. 10B to generate an accuracy score for the input stroke.

FIGS. 10A and 10B provide additional detail regarding character comparison engine 810, rules engine 820, and stroke engine 830.

FIG. 10A depicts input stroke 1001 that is input by a user, for example, by drawing in display 280 when it is a touchscreen or by using a mouse. Here, grid 901 is also drawn on display 280, and the user draws input stroke 1001 within grid 901. Input stroke 1001 is the first stroke in input character 1000. FIG. 10B depicts reference character 900 that the user is attempting to emulate, along with input stroke 1001.

Figure 11:
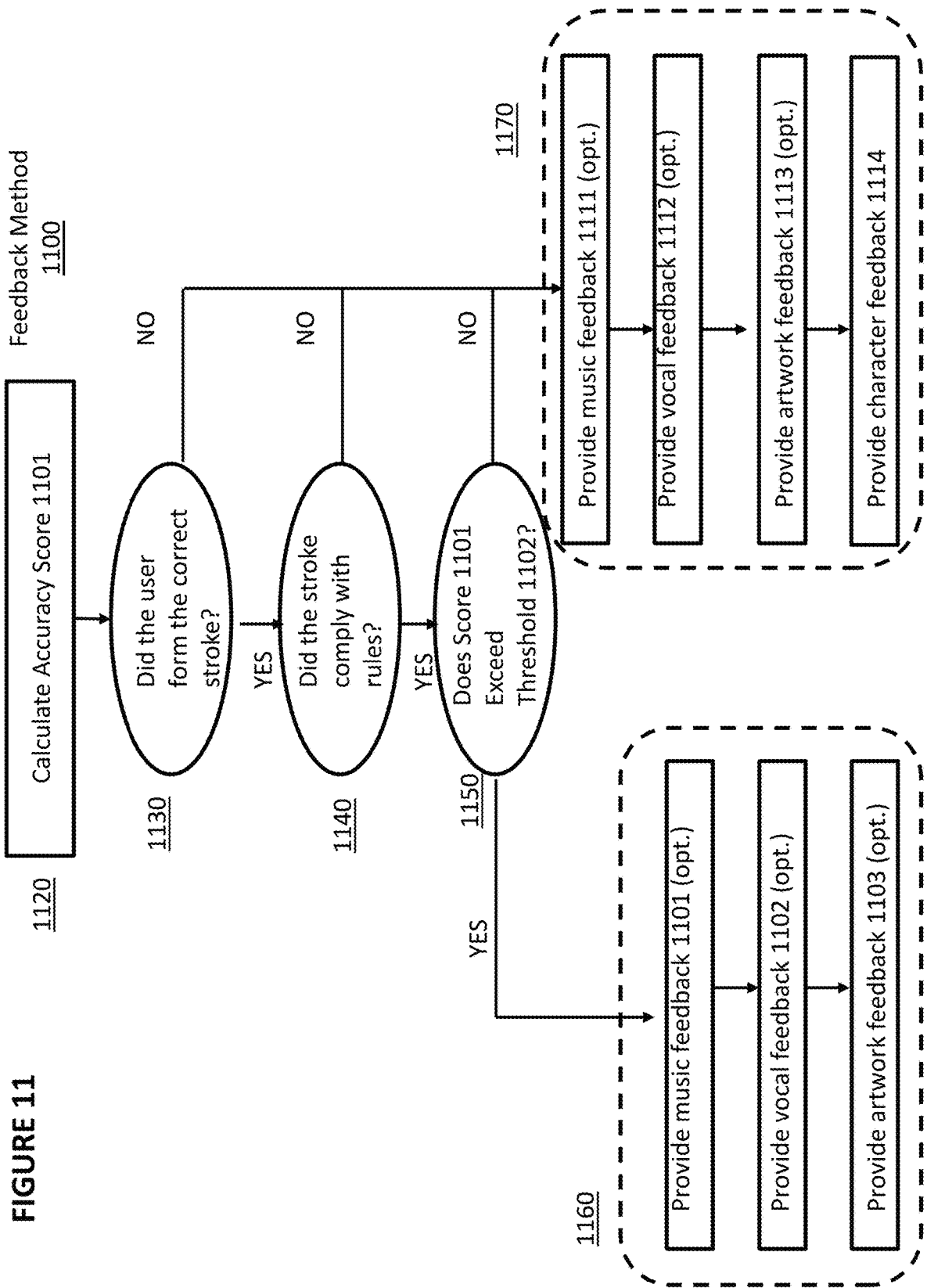
FIG. 11 depicts a feedback method.

With reference to FIG. 11, feedback method 1100 is then performed on input stroke 1001 from FIG. 10A to provide the user with feedback regarding input stroke 1001.

In step 1120, character comparison engine 810 calculates accuracy score 1101 for input stroke 1001 using a formula based on the criteria contained in Table 1. An example of a simple formula is:

Accuracy Score 1101=w1*(Distance Between Starting Points)+w2*(Distance Between Ending Points)+w3*(Average Distance Between Points)+w4*(Average Difference in Slope of Points)

where w1, w2, w3, and w4 are weights selected to emphasize the relative importance of each criterion.

In step 1130, stroke engine 830 then determines if input stroke 1001 is the correct stroke. If yes, then the system proceeds to step 1140. If not, then the system proceeds to step 1170. For example, a "pie" stroke such as stroke 902 should be drawn starting at the top and falling leftward. Stroke engine 1130 analyzes input stroke 1001 to determine if it is a "pie stroke" by analyzing that criterion and other criteria of the "pie" stroke.

In step 1140, rules engine 820 then determines if input stroke 1001 followed all applicable rules. If yes, then the system proceeds to step 1150. If no, then the system proceeds to step 1170. For example, one rule is that left-falling strokes should be drawn before right-falling strokes (see APPENDIX A). Here, the "pie" stroke is a left-falling stroke so rule engine 820 would determine if the user had mistakenly drawn any right-falling strokes before drawing the "pie" stroke. In the example of FIG. 10A, no such mistake had occurred.

In step 1150, character comparison engine 810 then determines if accuracy score 1101 exceeds pre-determined threshold 1102. If yes, then the system proceeds to step 1160. If no, then the system proceeds to step 1170. In the example of FIGS. 10A and 10B, it can be seen that the curvature of input stroke 1001 is different than the curvature of input stroke 1020. Whether this is an acceptable level of deviation will be determined by the configuration of pre-determined threshold 1102. That is, pre-determined threshold 1102 could be set at a lenient level, at a strict level, or anything in between. This aspect of configuration is discussed further below with reference to FIG. 18.

In step 1160, positive feedback is provided to the user because it has been determined that input stroke 1001 is the correct stroke, follows the applicable rules, and is accurate. Positive feedback can comprise one or more of the following options:

Music engine 850 provides music feedback 1101 to the user. For example, music engine 850 can play a portion of a Chinese folk song, with an additional segment being provided each time the accuracy score for a new stroke exceeds the threshold. The music content is stored in audio library 750. Once the entire character has been drawn in a satisfactory manner, music engine 850 can play the entire song. In the alternative, rather than playing a portion of the song each time, music engine 850 can play the entire song each time but add in different tracks (e.g., each track has a different instrument) with each correct stroke.

Vocalization engine 860 provides vocal feedback 1102 to the user. For example, vocalization engine 860 can provide positive encouragement using pre-recorded voice segments stored in audio library 750 or by synthesizing speech using a speech generation module. The easiest type of voice for a user to understand is the one closest to the voice of that person in pitch. For the first set, the game will use the voice of a 10-year-old child for the following reason: Young children like to follow the example set by older children. Since many of the users will be young children, using a voice of an older child will attract them to the game. Voicing of translation of the target words will be in high to medium-high pitched voices. Here, the goal is to ensure easy comprehension. Since we know that most of the users of this feature will be young children, we will utilize higher pitched voices to accommodate their needs. The same voice will remain with the word set, including pronouncing the target words and stating the rules. Since most people find that listening to the same voice over and over again irritating, after a few sets, there will be a new person voicing the game. In the beginning voice actors will be chosen with medium pitch voices, children 10-12-year-old children, mezzo soprano for women, tenor for men, gradually progressing to pitch variation: 6-year-old children, high soprano for women and low base for men. This is important ear training; in Mandarin there are 4 tones that have phonemic significance. The listeners needs to learn to distinguish the 4 tones, and gradually learn to recognize them even when listening to the voices of speakers with pitches very different from their own. An added complication for extra challenge: voices of elderly people, who's voices may be a bit unsteady and voices of young adolescents.

Art rendering engine 840 provides artwork feedback 1103 to the user using artwork stored in art library 740. For example, with each stroke that has an accuracy above the threshold, art rendering engine 840 can depict an additional stroke in a classical Chinese painting. An example of this is shown below with reference to FIGS. 12A to 12J.

In step 1170, constructive feedback is provided to the user because it has been determined that input stroke 1001 is the incorrect stroke (step 1130), does not follow all applicable rules (step 1140), and/or is inaccurate (step 1150). Constructive feedback then will be provided to the user, which can comprise one or more of the following options:

Music engine 850 provides music feedback 1111 to the user. Music engine 850 can stop playing the Chinese folk song or can remove a track (instrument) from the song that is being played.

Vocalization engine 860 provides vocal feedback 1112 to the user. For example, vocalization engine 860 can provide constructive comments to the user with pre-recorded voice segments stored in audio library 750 or by synthesizing speech using a speech generation module.

Art rendering engine 840 provides artwork feedback 1113 to the user. For example, art rendering engine 840 might delete a brush stroke in the artwork that previously had been added or might remove color from the artwork as a feedback indicating that stroke 1001 was not drawn with sufficient accuracy.

Character comparison engine 810, rules engine 820, and/or stroke engine 830 provides character feedback 1114 to the user. For example, character comparison engine 810 or stroke engine 830 can superimpose the correct and accurate stroke over stroke 1001 so that the user can see why stroke 1001 was incorrect or not fully accurate. Rules engine 820 can indicate the manner in which the rule was broken, for example, by displaying the stroke that the use should have written before writing input stroke 1001.

Dynamic Difficulty

Client application 330 and/or server application 530 can vary the difficulty of the exercises for the user. For example, the exercises can be made easier for non-native speakers than for native speakers or for younger users than for older users.

During an initial configuration process, the user will be asked to:

Specify his or her native language, which will activate the dictionary that will be used to translate the Chinese words into the user's native language;

Select an age range, such as (1) age 7 or younger, (2) 8-10, (3) 11-14, and (4) 15 and older. Grouping the users by age will help establish error tolerance for each group. While younger children are very good at learning to speak, their fine motor skills are just developing and need a wider margin of error tolerance as they learn to write Chinese characters.

These factors can be considered in selecting the characters (such as reference character 900) to use during an exercise and in setting threshold 1102 for each exercise.

In order to maintain the user's interest in the game, it is important to progress in the level of difficulty. The difficulty level will gradually increase in the following ways:

1. Complexity of characters—As the user progresses in the game, he or she will be presented with characters that are composed of larger number of strokes and more complex types of strokes, eventually progression to words that are composed of two or more characters.
2. Accuracy—Threshold 1102 can increase over time, so the user's accuracy will need to improve as he or she progresses in the game. The quality of the strokes is essential to writing well in Chinese, so the game encourages the users to pay careful attention to their writing and improves hand-eye coordination.
3. Comprehension resilience (a training process).
4. Complexity of the artistic images. The artistic images that are presented will also grow more challenging the number of strokes, spatial composition and painting techniques. As the user progresses in the game, both the outline and the non-outline style of painting style will be presented using step-by step instructions.

Example of Artwork Feedback 1103 and 1113

The following scene-by-scene descriptions demonstrate the feature of artwork feedback 1103, which can comprise instruction in the outline and no-outline techniques of traditional Chinese painting.

With reference to FIG. 12, the game begins with a first set 1200 of five Mandarin characters, which are shown in FIG. 12. The game begins with a first set 1200 of five Mandarin characters, which are shown in FIG. 12 along pronunciation of each character in pin yin (a Latin-script based phonetic transcription) and the definition of each character in English. Each of the five Mandarin characters starts with the same radical—Ren—which means a standing person, and this radical comprises the left side of each of the five Mandarin characters shown.

In learning the first four characters in the first set 1200, the user also will see a depiction of a lotus in the outline style. The exercise begins with a black and white image of a flower. As the user writes correct strokes, the image visibly gains color, step-by step. If the user makes a mistake, the image loses some color and regains it when the mistake is corrected. When the user completes the character correctly, the image is presented in full color. In this way, the gaining and temporary loss of color is part of the positive and negative feedback to the users as they proceed at this stage of the game. This way, the user can focus on learning the rules of writing with minimal distractions.

In learning the last character in the first set 1200, the user will learn how to paint a lotus flower in the no-outline style.

The sequence of painting of any outline or no-outline image that the user has already seen can be replayed at any time, helping the user to recall the method for painting the image in real life. Periodically, the program provides the users with visual instructions in the form of short animations on various topics. For example: what is the best hand position and hold on the brush for writing as opposed to employing a particular type of stroke in painting (there are several variations); how to avoid making common mistakes when writing with a brush; how to mix various colors together to achieve a desired effect.

FIG. 13 depicts lesson screen 1300 that is used as a template during the exercises. Grid 901 is the area where the user will write a character. Artwork panel 902 is the area where an outline or non-outline painting will be depicted. Artwork controls 1303 allow the user to navigate through the creation of the artwork on a stroke-by-stroke basis. If the user selects audio request 1301, vocal engine will pronounce character 900 using audio library 730. That is, the user will be able to hear the character pronounced in Mandarin. If the user selects translation request 1301, the English translation of reference character 900 will be displayed using character library 710.

Two sequences will now be described using the easiest character in first character set 1200—shén—in FIG. 14, and the hardest character in first character set 1200—nǐ—in FIG. 16.

Figure 14A:
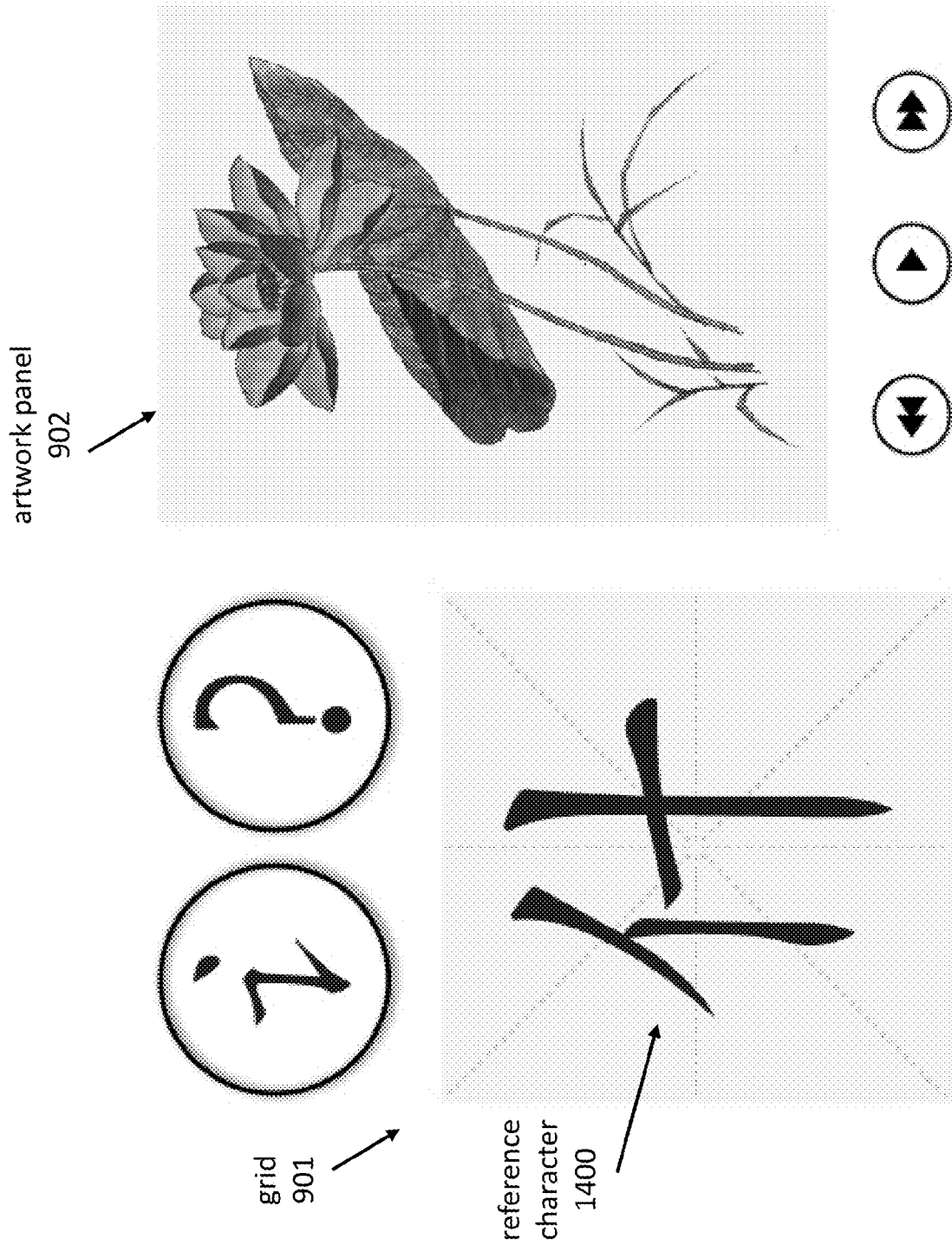

In FIG. 14A, the user is shown reference character 1400 (here, the shén character) that he or she will be asked to draw within grid 901. The user hears the word pronounced in Mandarin, using Vocalization Engine 830.

Figure 14B:
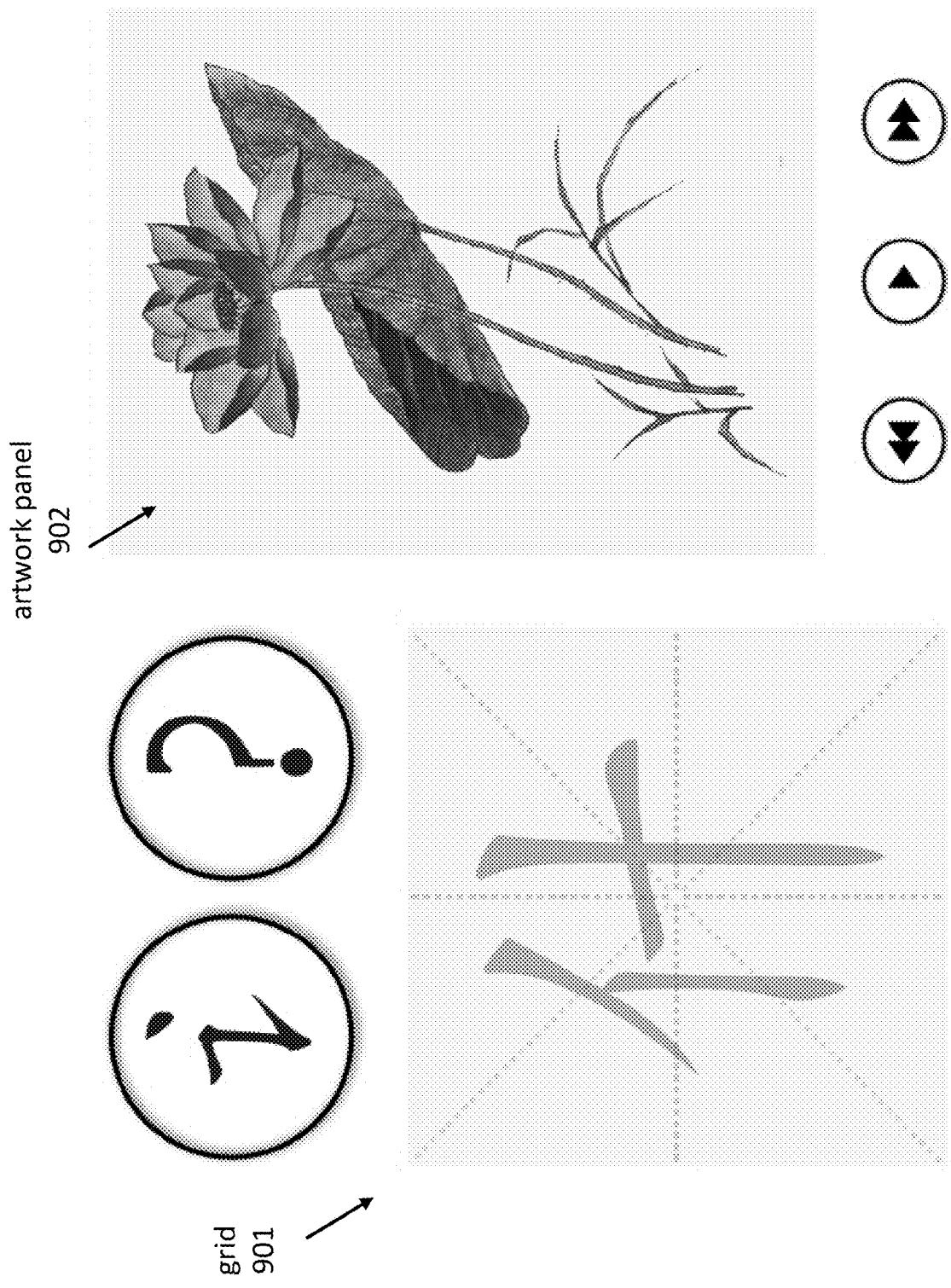

In FIG. 14B, reference character 1400 becomes faded but does not disappear completely. This feature is referred to as the "shadowing" feature and is optional. Artwork panel 902 displays the outline of a flower, in the style of a traditional outline painting.

Figure 14C:
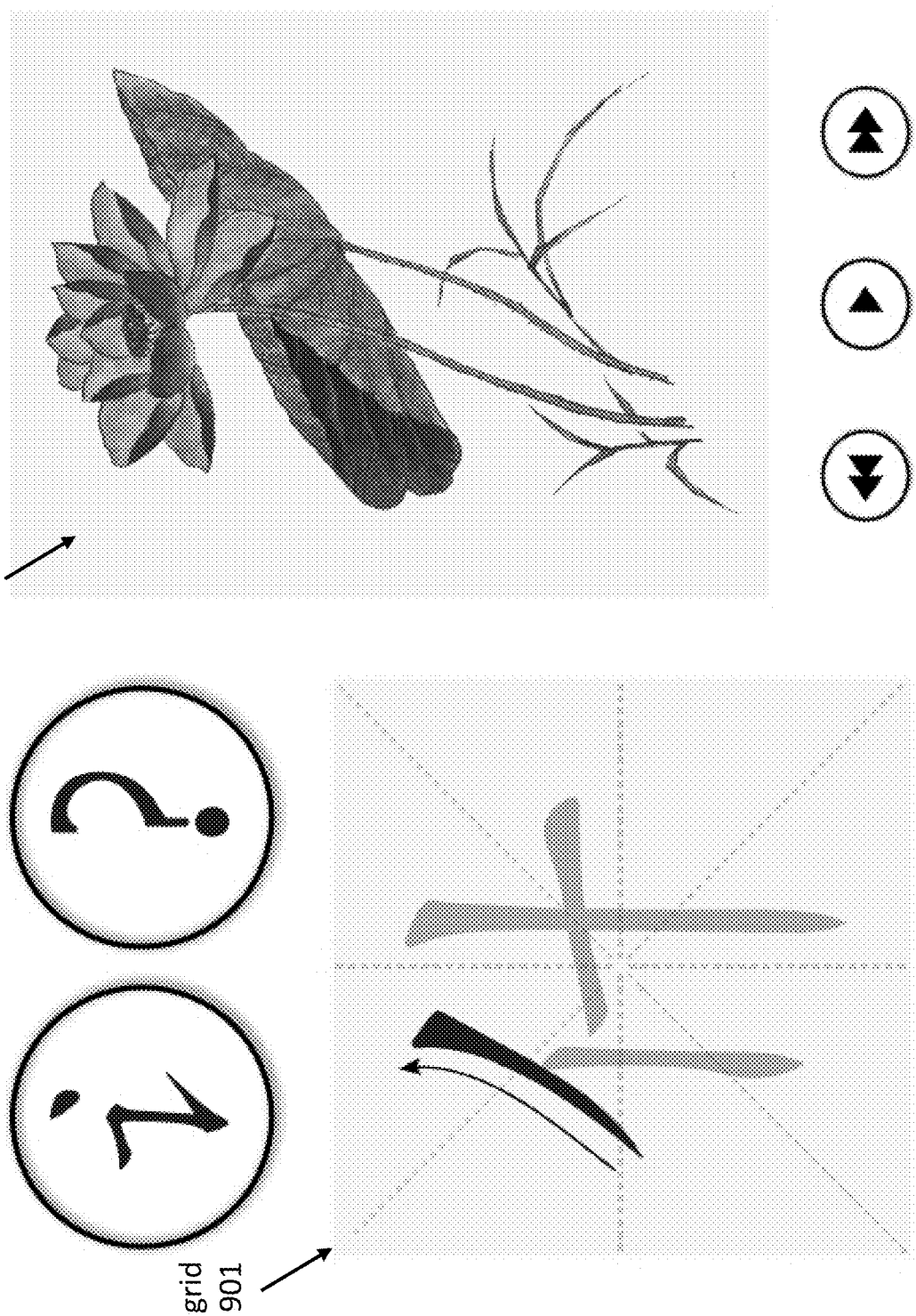

In FIG. 14C, the user draws a first stroke in display 280 within grid 901. Feedback method 1100 is performed, and in step 1130, stroke engine 830 determines that the user wrote the wrong stroke as indicated by the arrow. Specifically, the user wrote a "ti" stroke (drawn upward and toward the right) instead of a "pie" stroke (drawn downward and to the left). Stroke engine 830 also instructs vocalization engine 860 to announce the name of the correct stroke, "pie" in Mandarin, using audio library 750. If the user is an English speaker, he or she has the option of pressing "?" (translation request 1302) to see a written description of the stroke in English at any time that FIGS. 14C through 14G are displayed. After the user writes the next stroke, in FIG. 14H, the English description of the previous stroke is no longer available to the user, so that the user is not confused by reading information that is no longer relevant, as he progresses in the game.

Figure 14D:
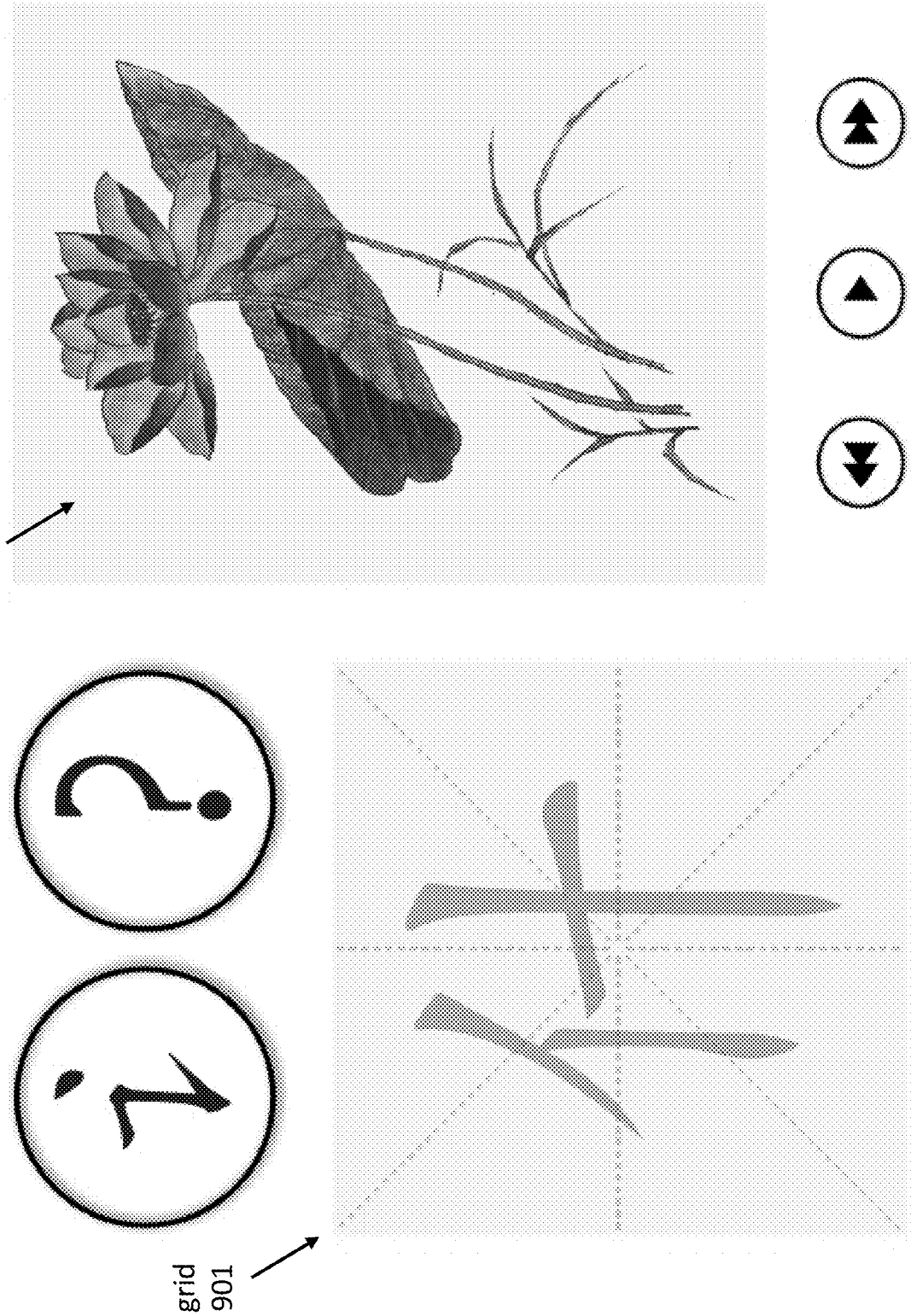

In FIG. 14D, the erroneous first stroke is erased from display 280.

In FIG. 14E, the correct way to draw the first stroke is demonstrated to the user on display 280 using computer-generated stroke 1401 (with or without an arrow), preferably using a different color (e.g., green instead of black). The user hears in Mandarin the name of the stroke that is to be written, using Vocalization Engine 830.

Figure 14F:
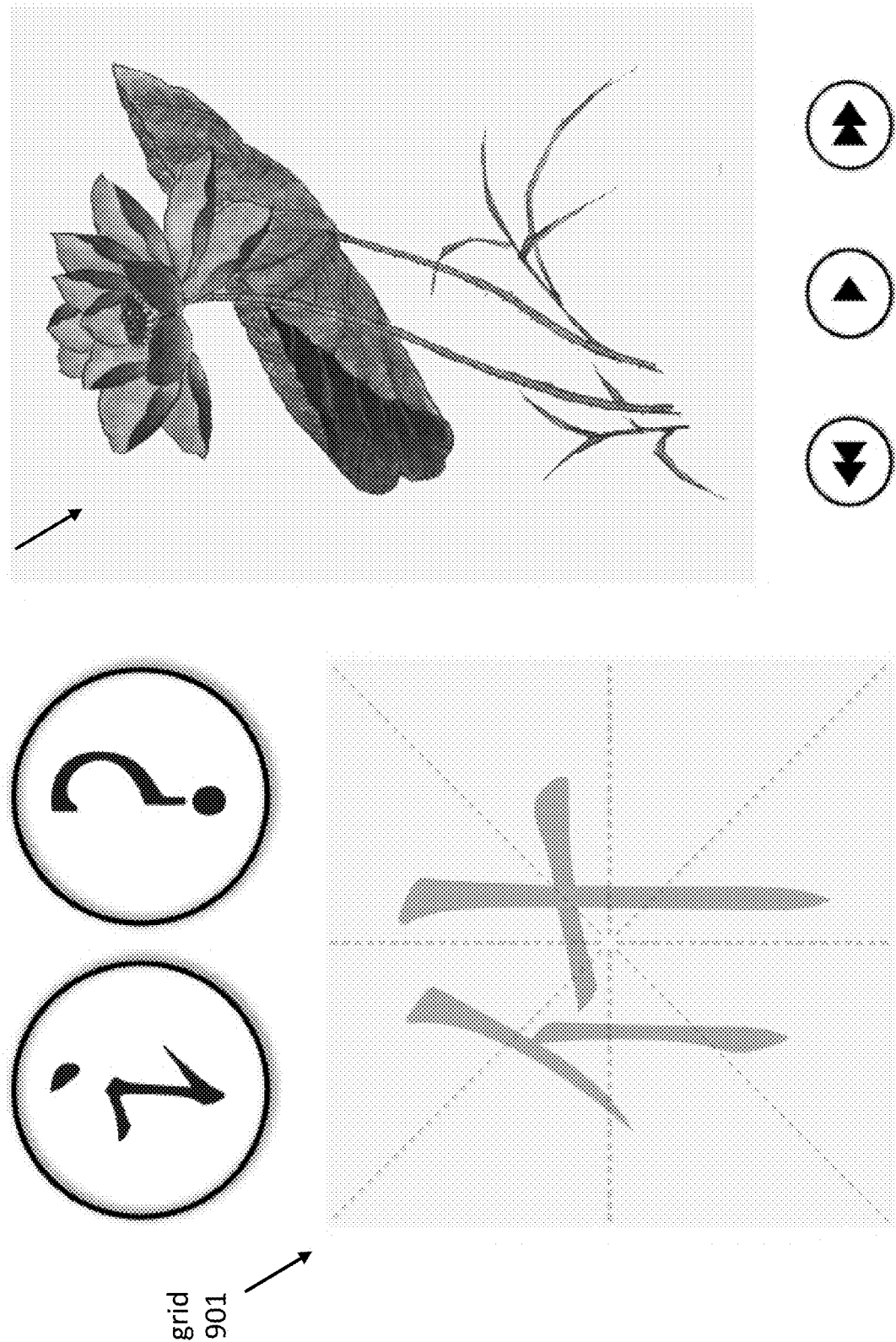
Figure 14G:
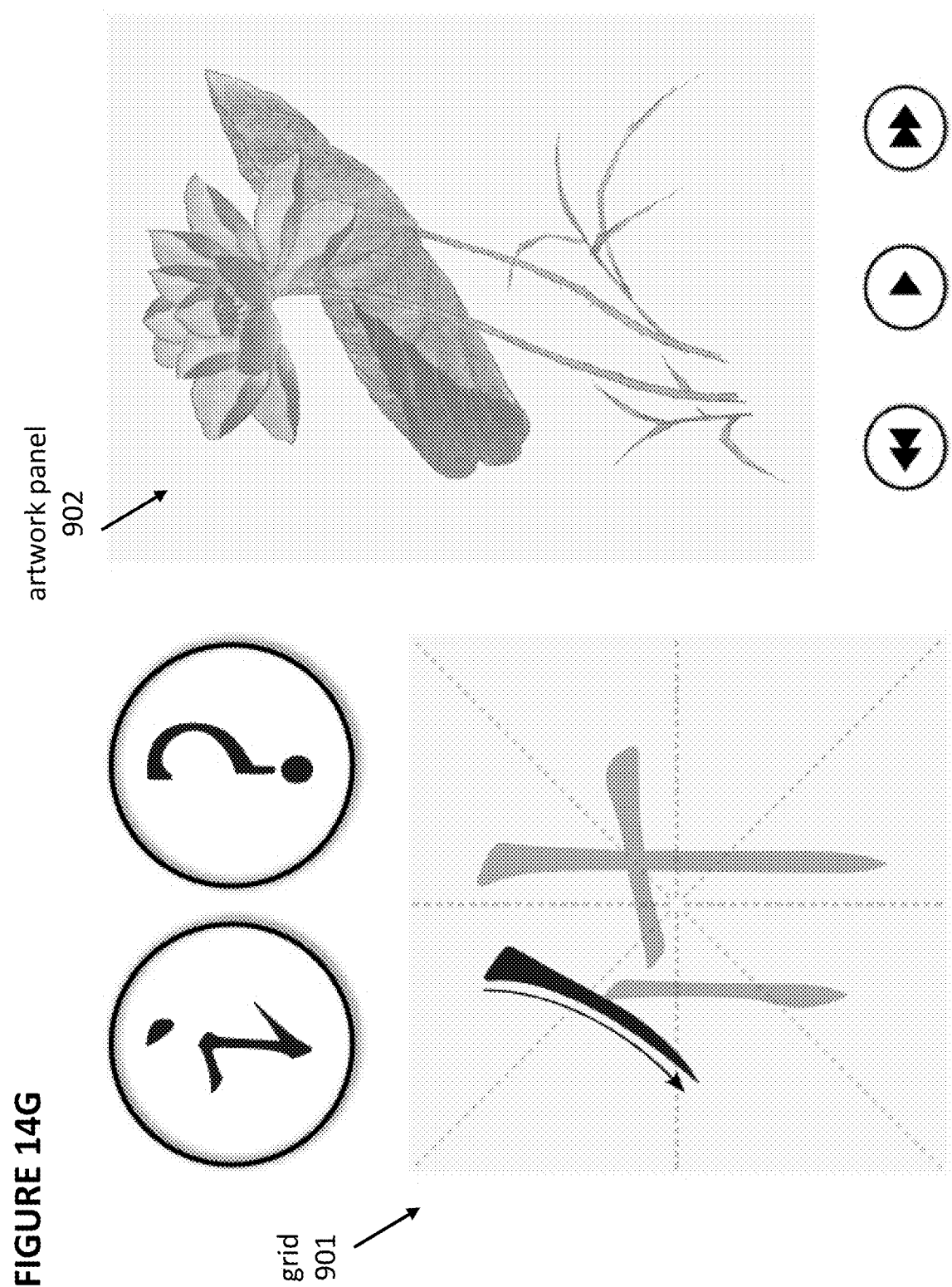

In FIG. 14F, computer-drawn stroke 1401 is erased.

In FIG. 14G, the user again draws a first stroke in display 280 within grid 901. In this instance, the user drew the first stroke in the correct direction, as indicated by the arrow. Feedback method 1100 is performed, and stroke engine 830 determines that the user formed the correct stroke (step 1130), rules engine 820 determines that the stroke complied with the rules (step 1140), and character comparison engine determines that accuracy score 1101 exceeds threshold 1102 (step 1150). As a result, art rendering engine 840 fills in part of the outline of the artwork achieves the first level of color saturation (using data in art library 720) in artwork panel 902 (step 1160).

Figure 14H:
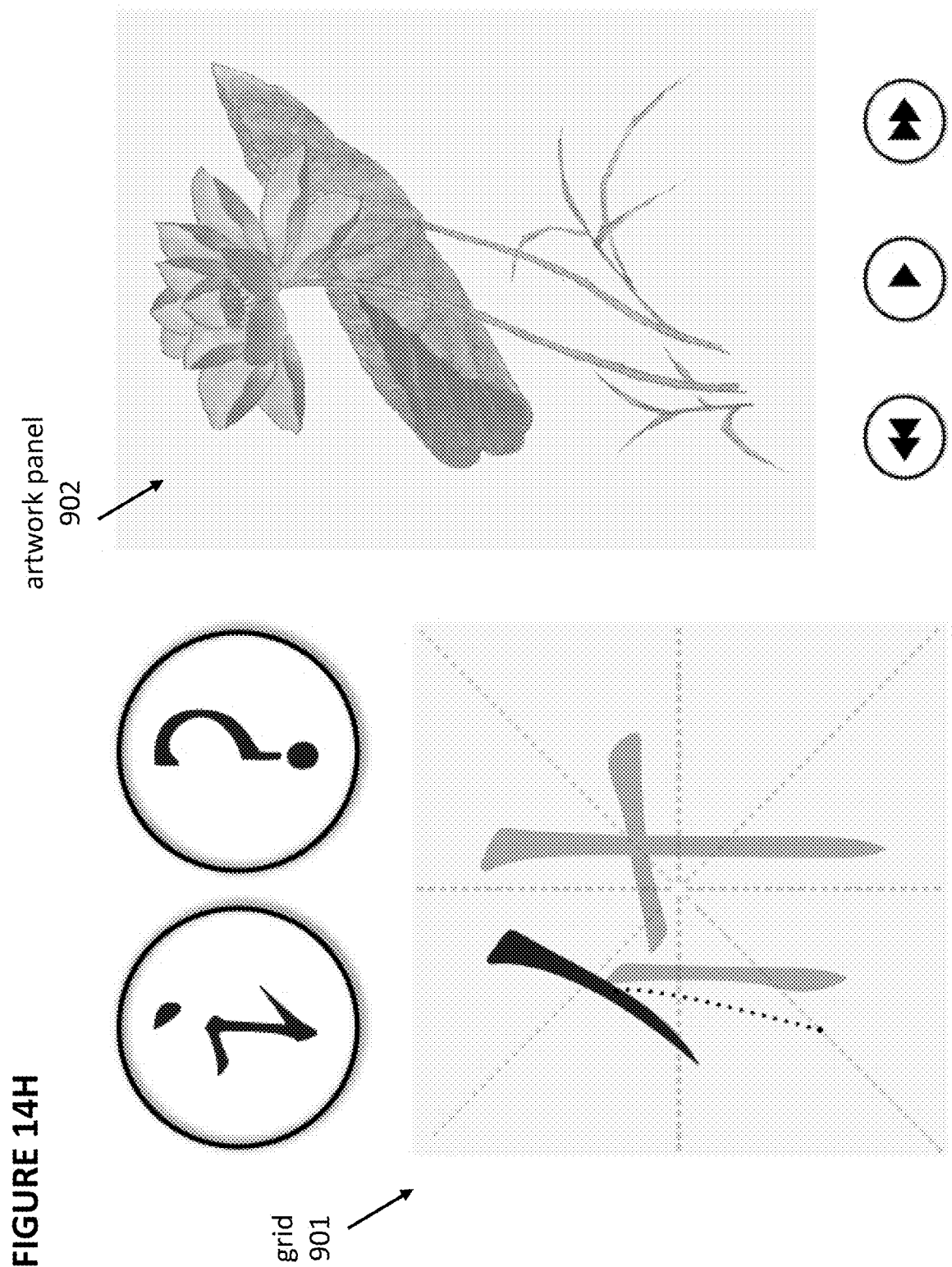

In FIG. 14H, the user draws a second stroke—represented by the dotted line—in display 280 within grid 901. Here, the user wrote the correct stroke ("shu") but did so in a very imprecise way. Feedback method 1100 is performed, and in step 1150, character comparison engine 810 determines that accuracy score 1101 for the second stroke does not exceed threshold 1102.

Figure 14I:
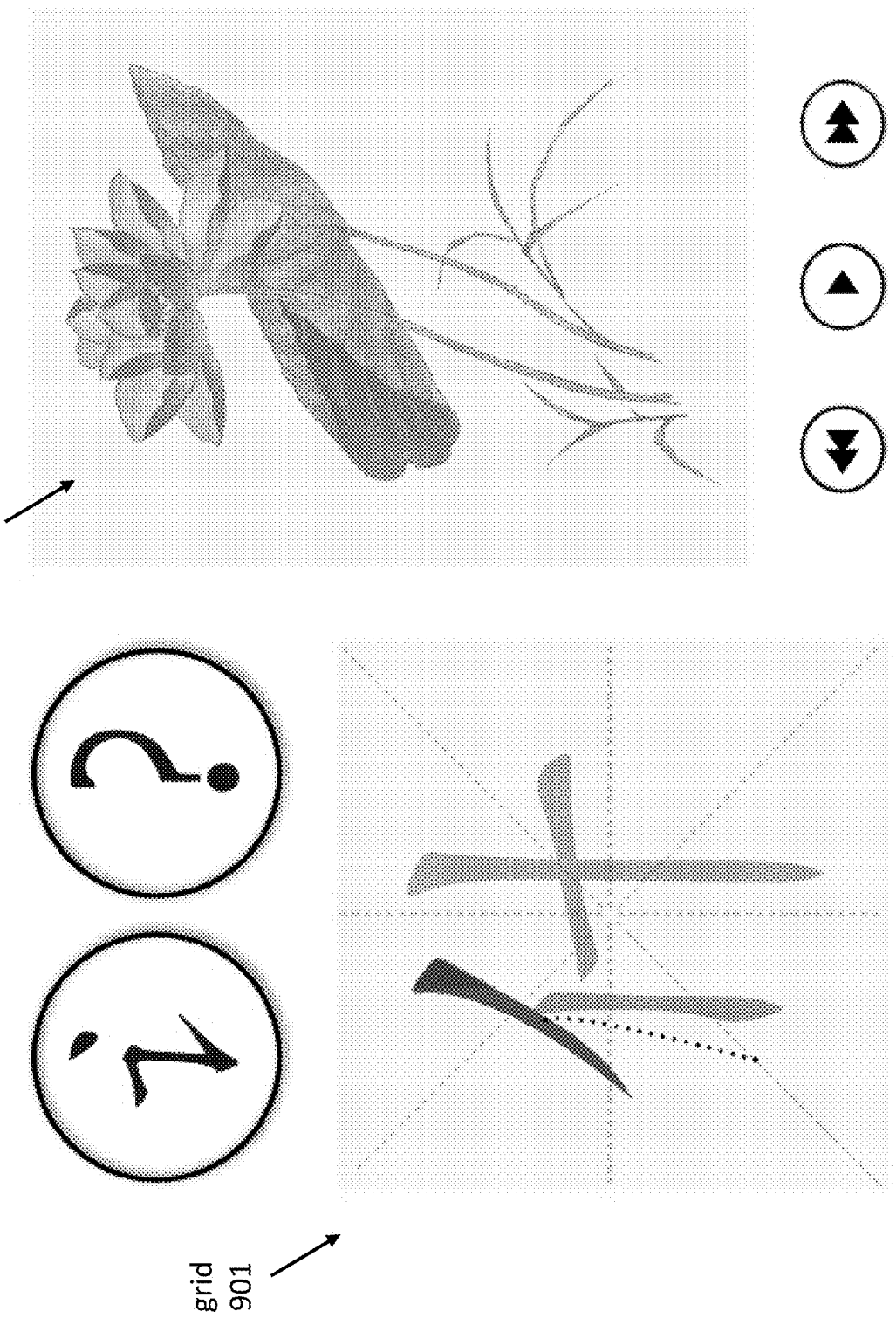

In FIG. 14I, a correctly drawn reference stroke is shown in color, such as green (step 1170).

Figure 14J:
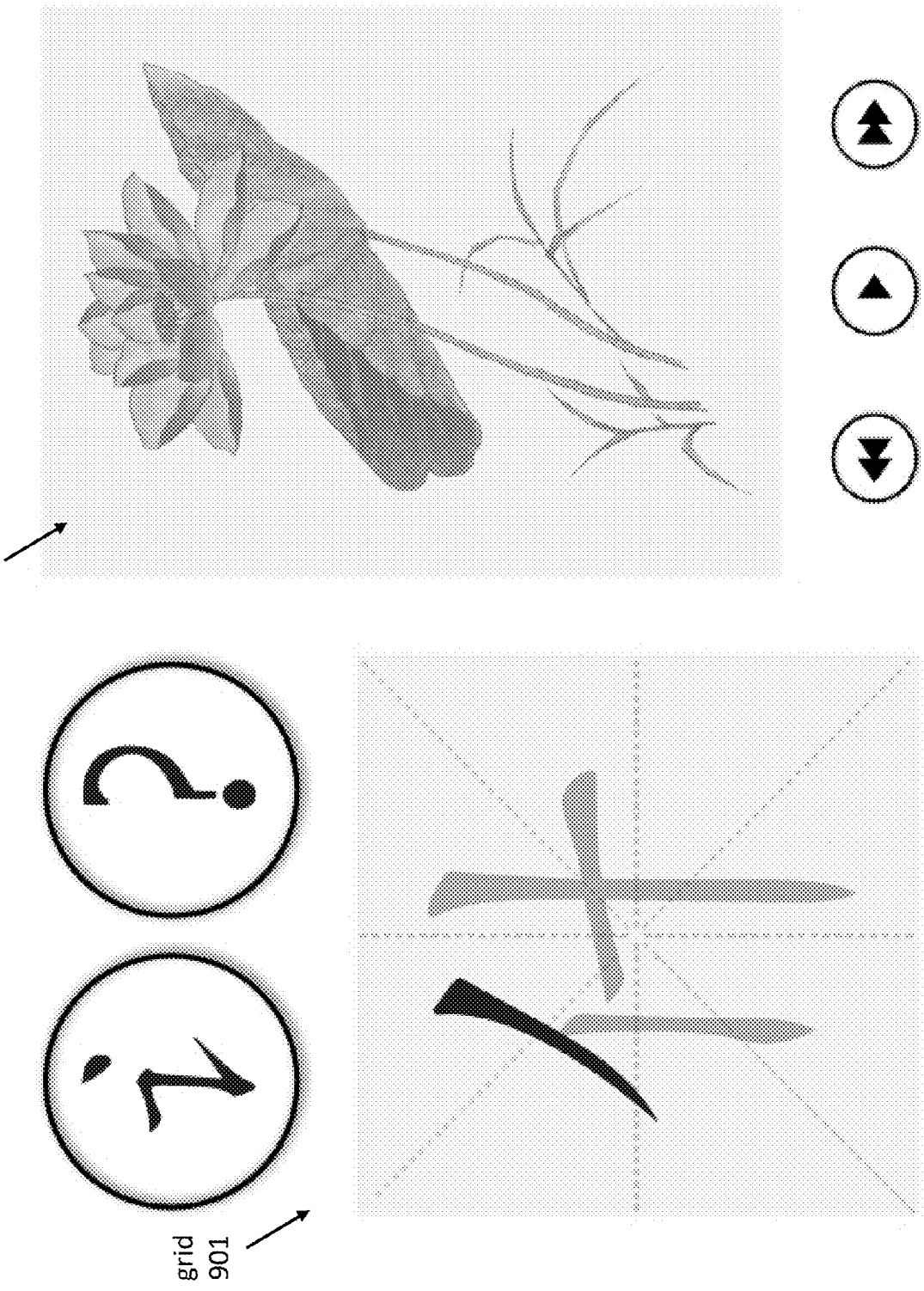

In FIG. 14J, the user's stroke and the reference stroke are erased.

Figure 14K:
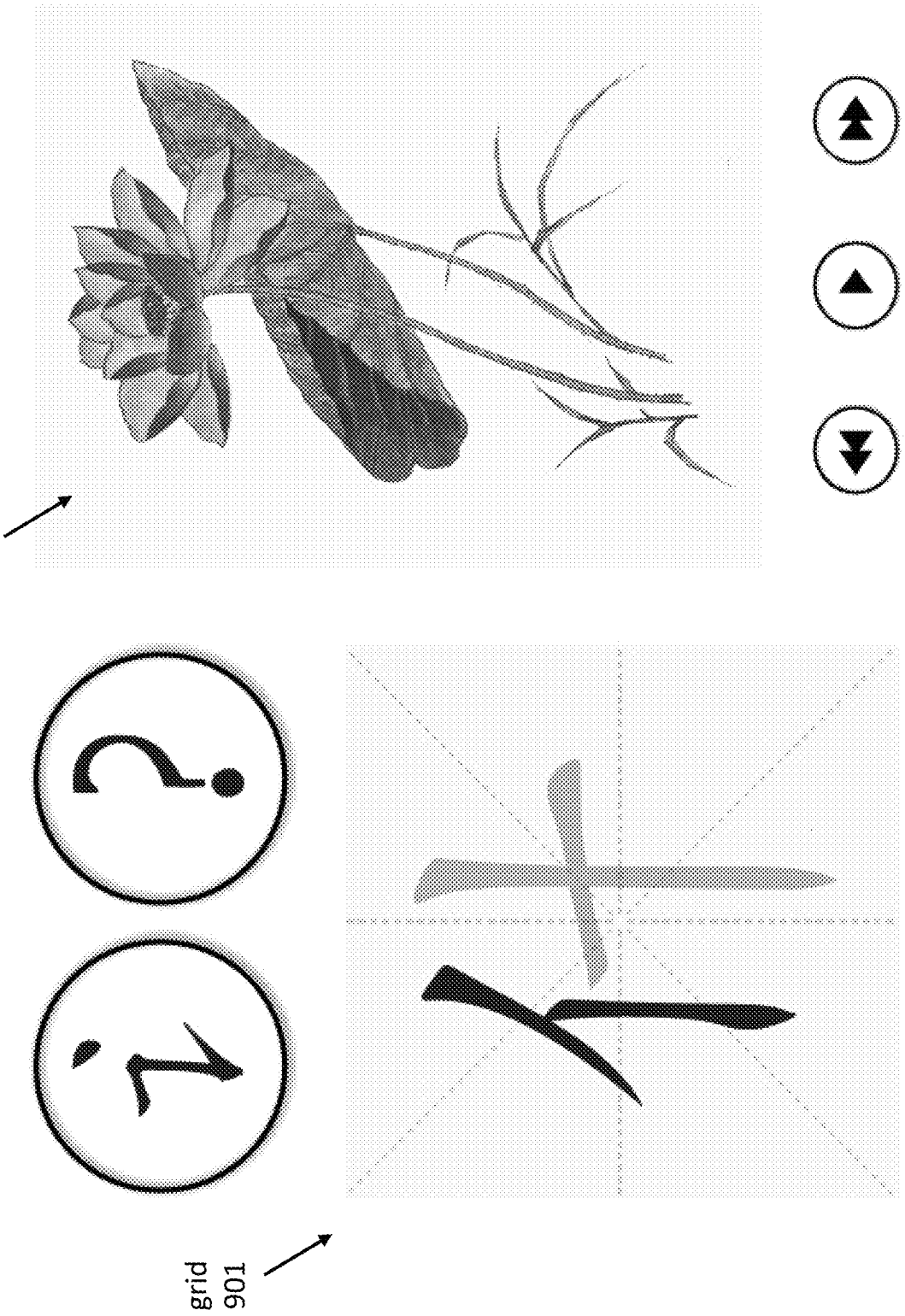

In FIG. 14K, the user tries to write the stroke again and this time does it accurately. Feedback method 1100 is performed, and stroke engine 830 determines that the user formed the correct stroke (step 1130), rules engine 820 determines that the stroke complied with the rules (step 1140), and character comparison engine determines that accuracy score 1101 exceeds threshold 1102 (step 1150). The stroke is drawn in and is not displayed merely as a dotted line as was the case with the incorrect stroke in FIG. 14H.

Art rendering engine 840 increased the level of color saturation of the artwork to level 2 (using data in art library 720) in artwork panel 902 (step 1160).

Figure 14L:
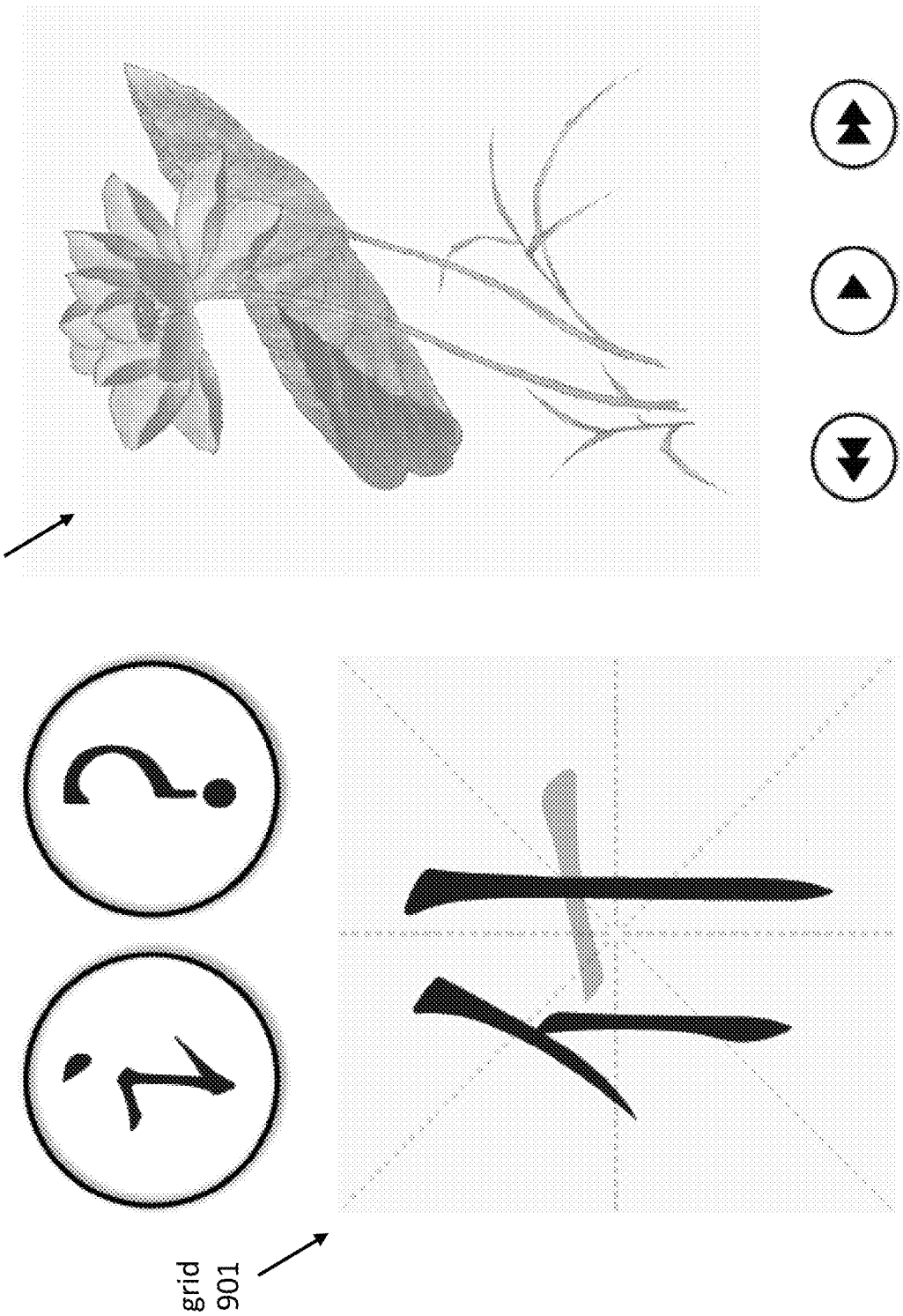

In FIG. 14L, the user draws a third stroke in display 280 within grid 901. Feedback method 1100 is performed, and in step 1140, rules engine 820 determines that the third stroke did not comply with all of the rules in rules library 720, because the user drew the stroke in the wrong order. Rules engine 820 identifies the rule in rules library 720 that was violated, which in this example is: first horizontal stroke "heng", then vertical stroke "shu". Rules engine 820 then instructs vocalization engine 860 to announces the name of the rule in Mandarin, using the audio library 750 (step 1170). Art rendering engine 840 reduces the color saturation back to level 1 (step 1170). Again, the user has the option to see the English translation of the rule by pressing "?" (translation request 1302) until the user makes the next stroke in FIG. 14N.

Figure 14M:
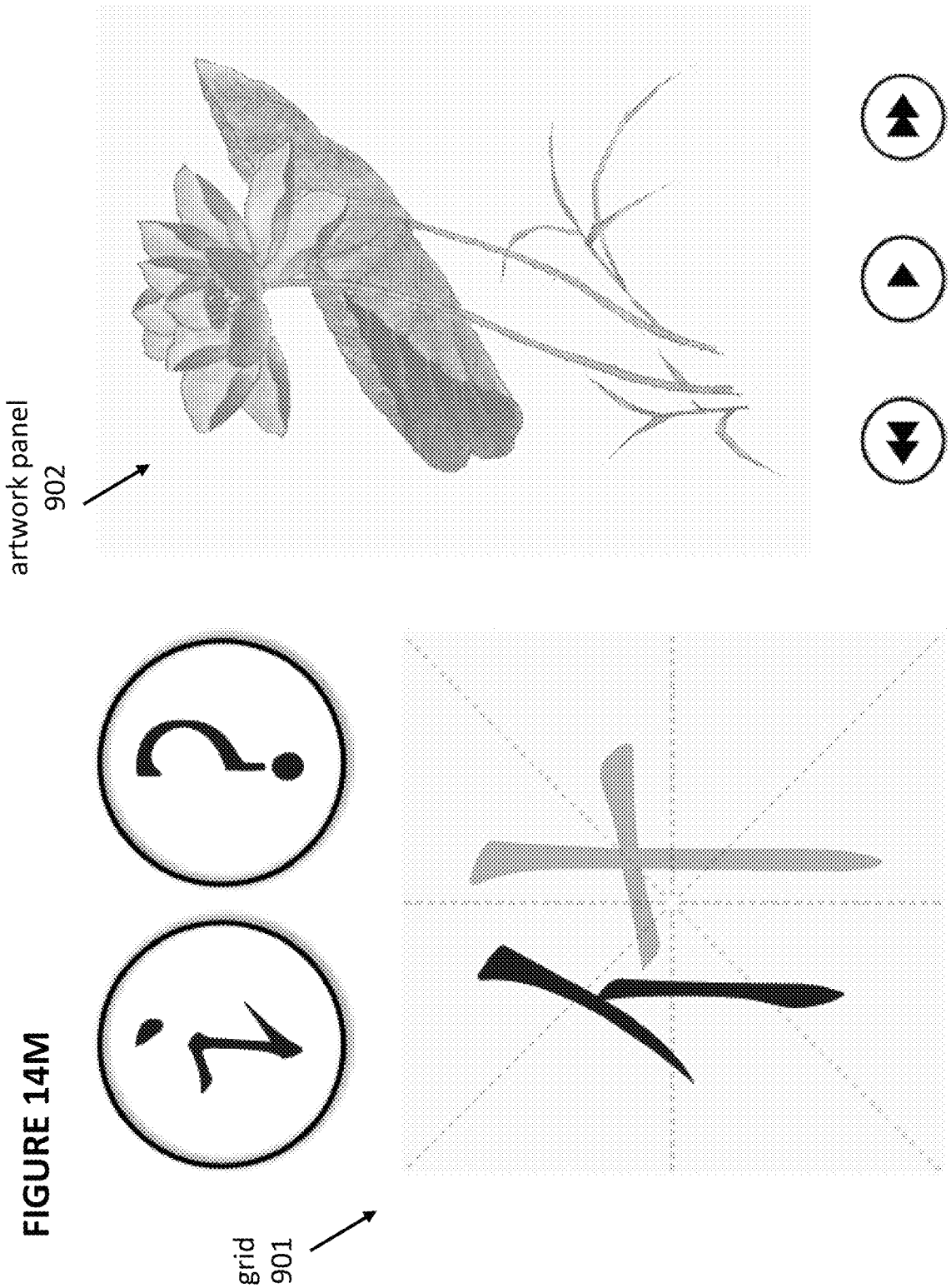

In FIG. 14M, the erroneous third stroke is erased from display 280.

Figure 14N:
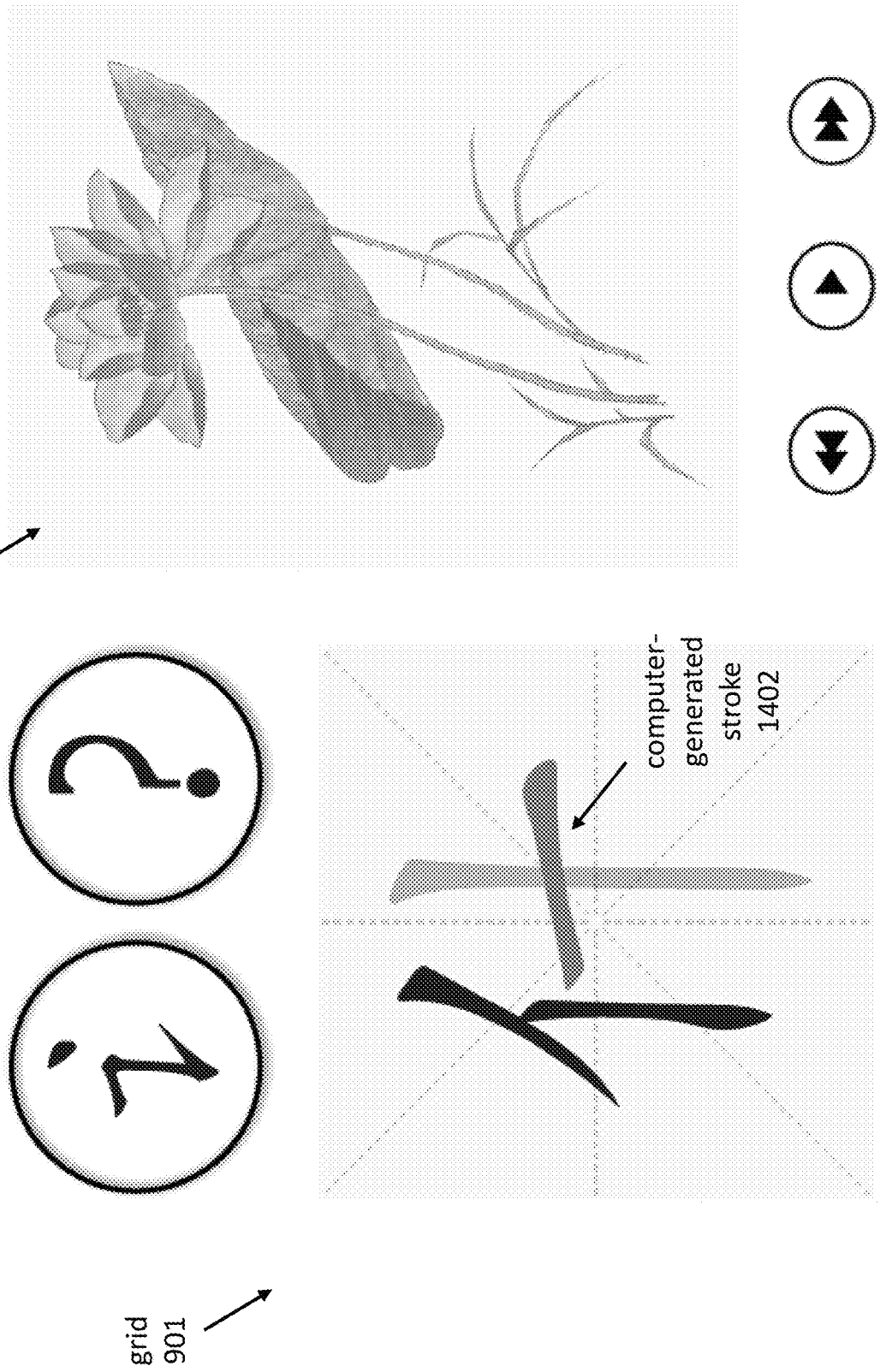

In FIG. 14N, the correct way to draw the third stroke is demonstrated to the user on display 280 through computer-generated stroke 1402 (with or without an arrow), preferably using a different color (e.g., green instead of black). The user hears in Mandarin the stroke-order rule, which is to be followed in this case, using Vocalization Engine 830 (step 1170).

In FIG. 14O, computer-generated stroke 1402 is erased.

In FIG. 14P, the user again draws a third stroke in display 280 within grid 901. In this instance, the user drew the correct third stoke. Feedback method 1100 is performed, and stroke engine 830 determines that the user formed the correct stroke (step 1130), rules engine 820 determines that the stroke complied with the rules (step 1140), and character comparison engine determines that accuracy score 1101 exceeds threshold 1102 (step 1150). As a result, art rendering engine 840 increases the saturation of color in the painting to level 3 (step 1160).

Figure 14Q:
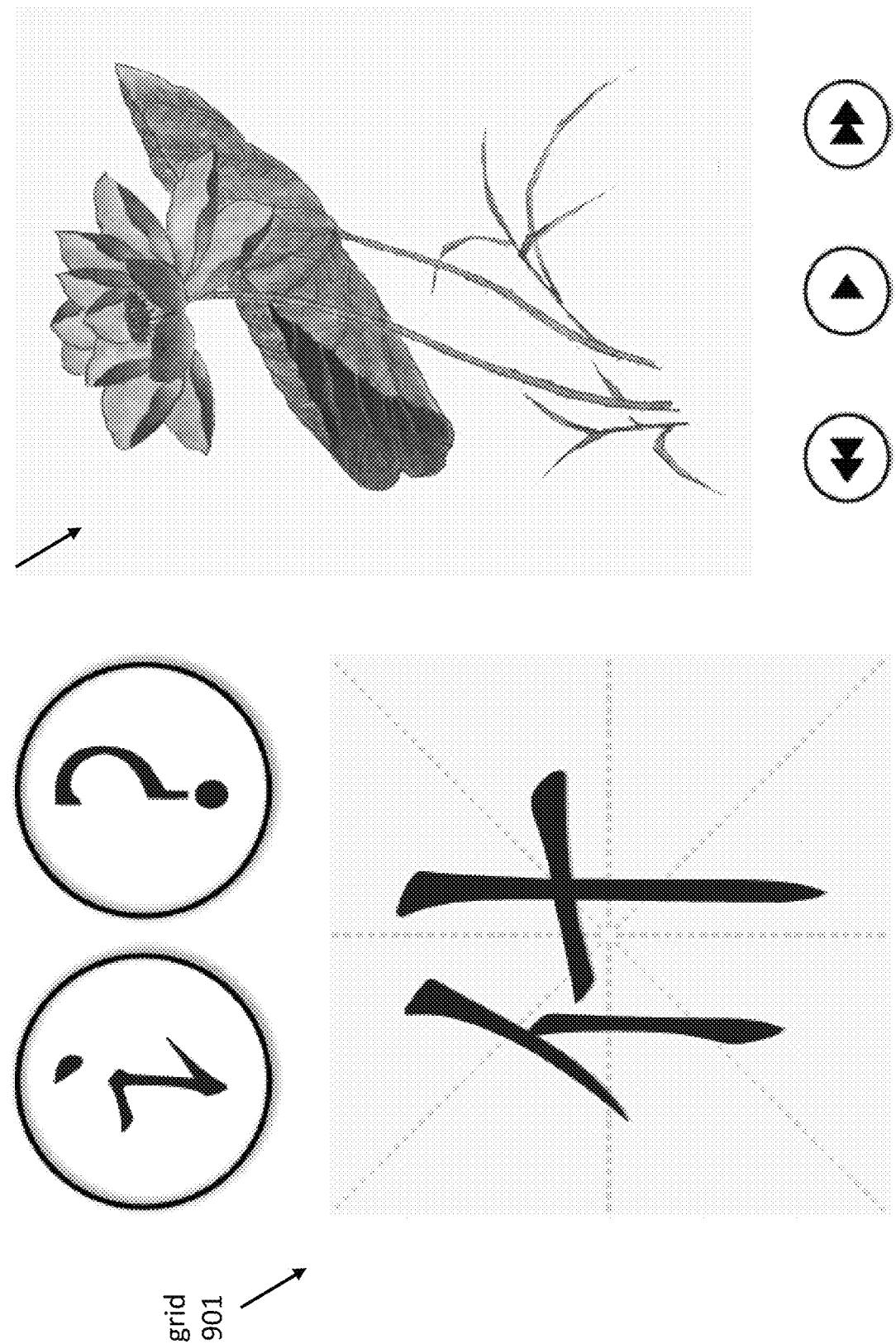

In FIG. 14Q, the user draws a fourth stroke in display 280 within grid 901. Feedback method 1100 is performed, and stroke engine 830 determines that the user formed the correct stroke (step 1130), rules engine 820 determines that the stroke complied with the rules (step 1140), and character comparison engine determines that accuracy score 1101 exceeds threshold 1102 (step 1150). As a result, art rendering engine 840 adds additional colors within the outline of the artwork (using data in art library (720) in artwork panel 902 (step 1160). This is the last stroke of the character, and consequently, the outline painting is also completed. As a result, art rendering engine 840 increases the saturation of color in the painting to level 4 (step 1160).

As indicated above, FIG. 14 provides a "shadowing" feature for the user, where a shadow of the reference character is present at all times. After doing a few repetitions of writing any given character in a set such as the one depicted in FIG. 14, the user is then given an opportunity to test his or her memory recall and writing skill accuracy using the "no-shadowing" feature depicted in FIG. 15. In this case, the user is completing a more complex task, so the practical goals override the aesthetic considerations and the user's marks are more prominent.

Figure 15A:
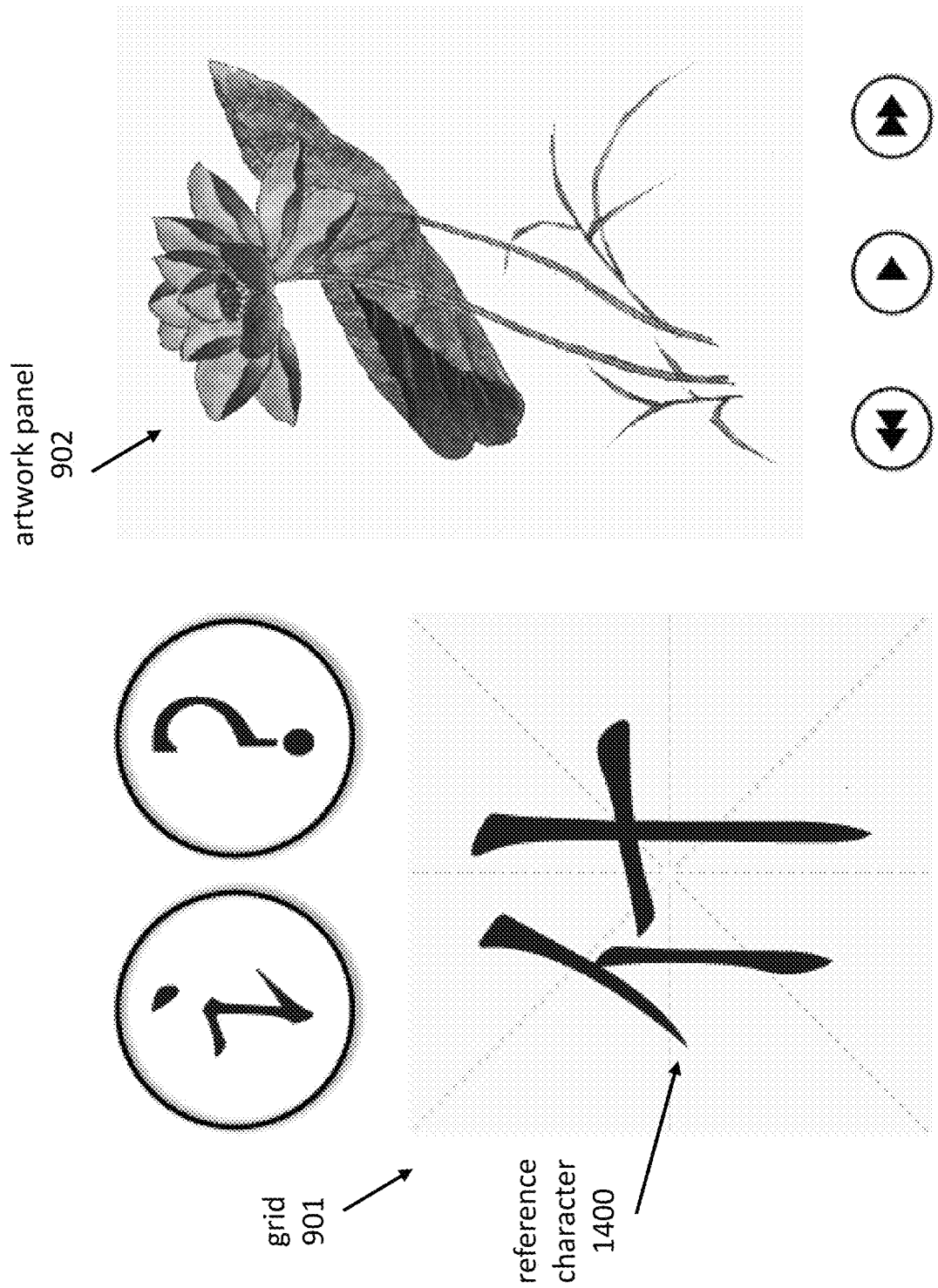

In FIG. 15A, reference character 1400 appears, as in FIG. 14A.

Figure 15B:
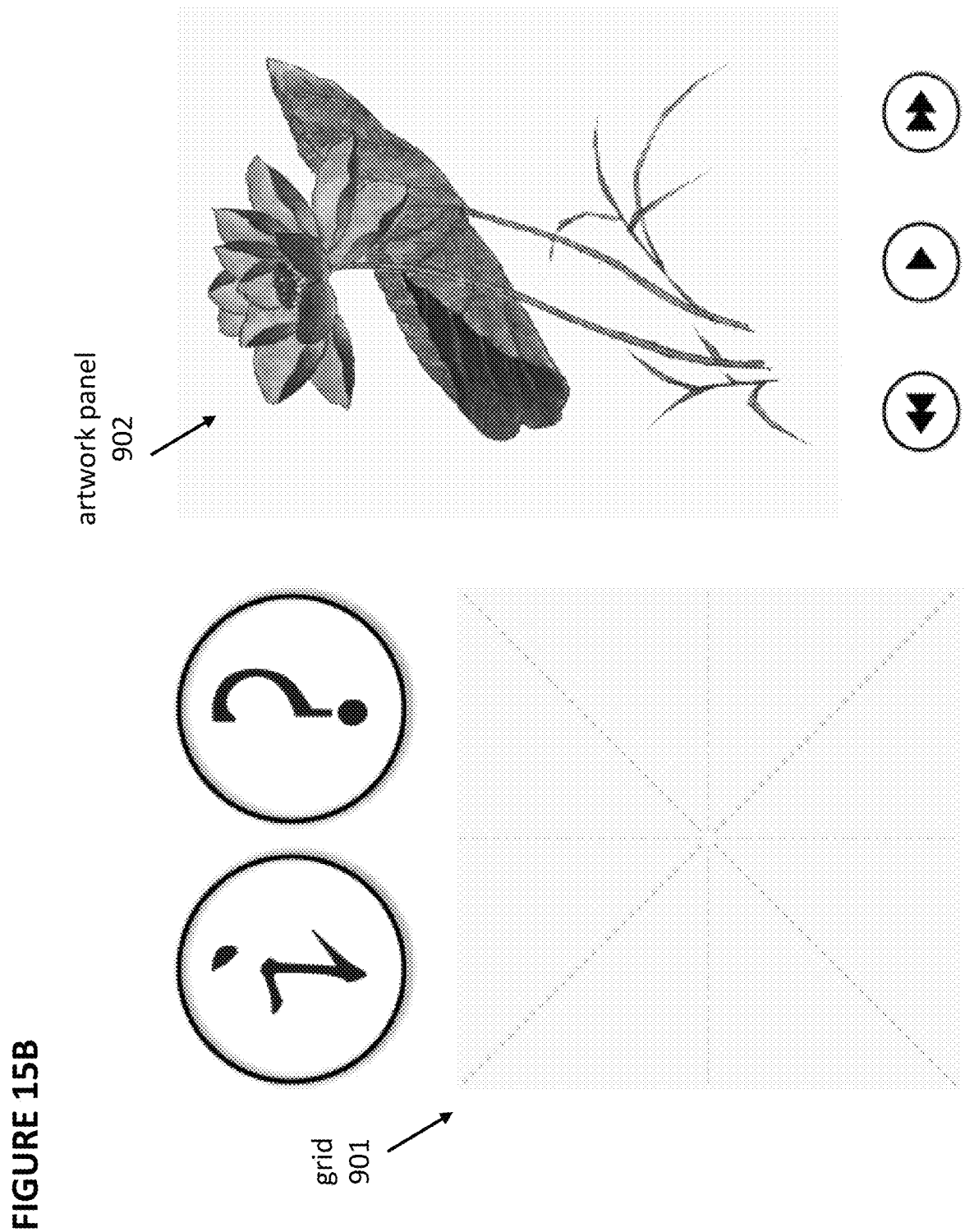

In FIG. 15B, the reference character disappears, leaving only grid 901 without a shadow of the reference character.

Figure 15C:
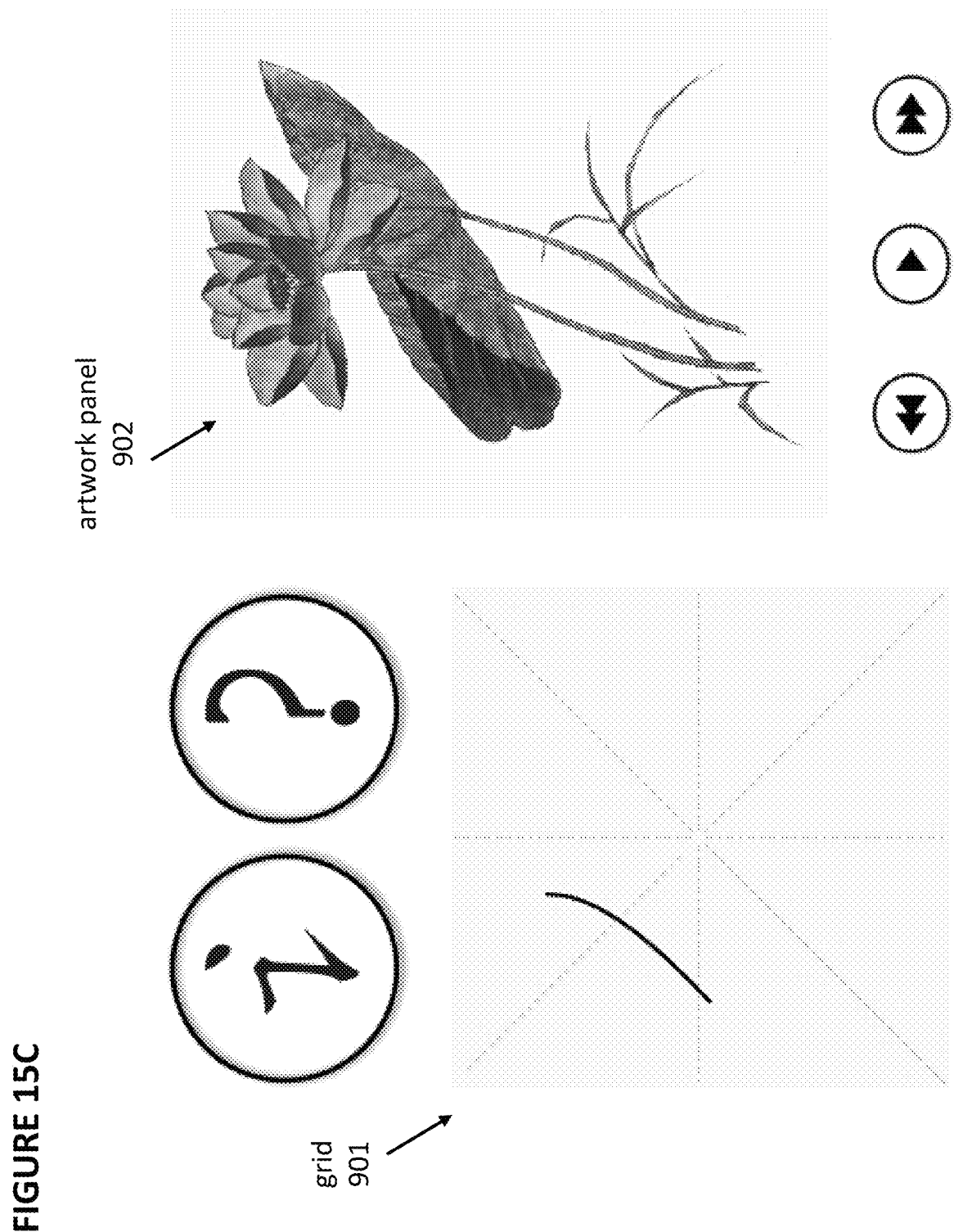

In FIG. 15C, the user writes the first stroke. The stroke is visible in the form of a thin black line, as if drawn using a black pen. Feedback method 1100 is performed, and stroke engine 830 determines that the user formed the correct stroke (step 1130), rules engine 820 determines that the stroke complied with the rules (step 1140), and character comparison engine determines that accuracy score 1101 exceeds threshold 1102 (step 1150). As a result, in FIG. 15D, the user's stroke is replaced by the appropriate thick, calligraphic stroke. This gives the user the satisfaction of knowing that he did the job right, even though his original stroke was not perfect.

In FIG. 15E, the user writes the second stroke. Feedback method 1100 is performed, and stroke engine 830 determines that the user formed the correct stroke (step 1130) and rules engine 820 determines that the stroke complied with the rules (step 1140). However, character comparison engine determines that accuracy score 1101 does not exceed threshold 1102 (step 1150) because the user's stroke was written at an incorrect angle with the wrong starting position and ending position.

Figure 15F:
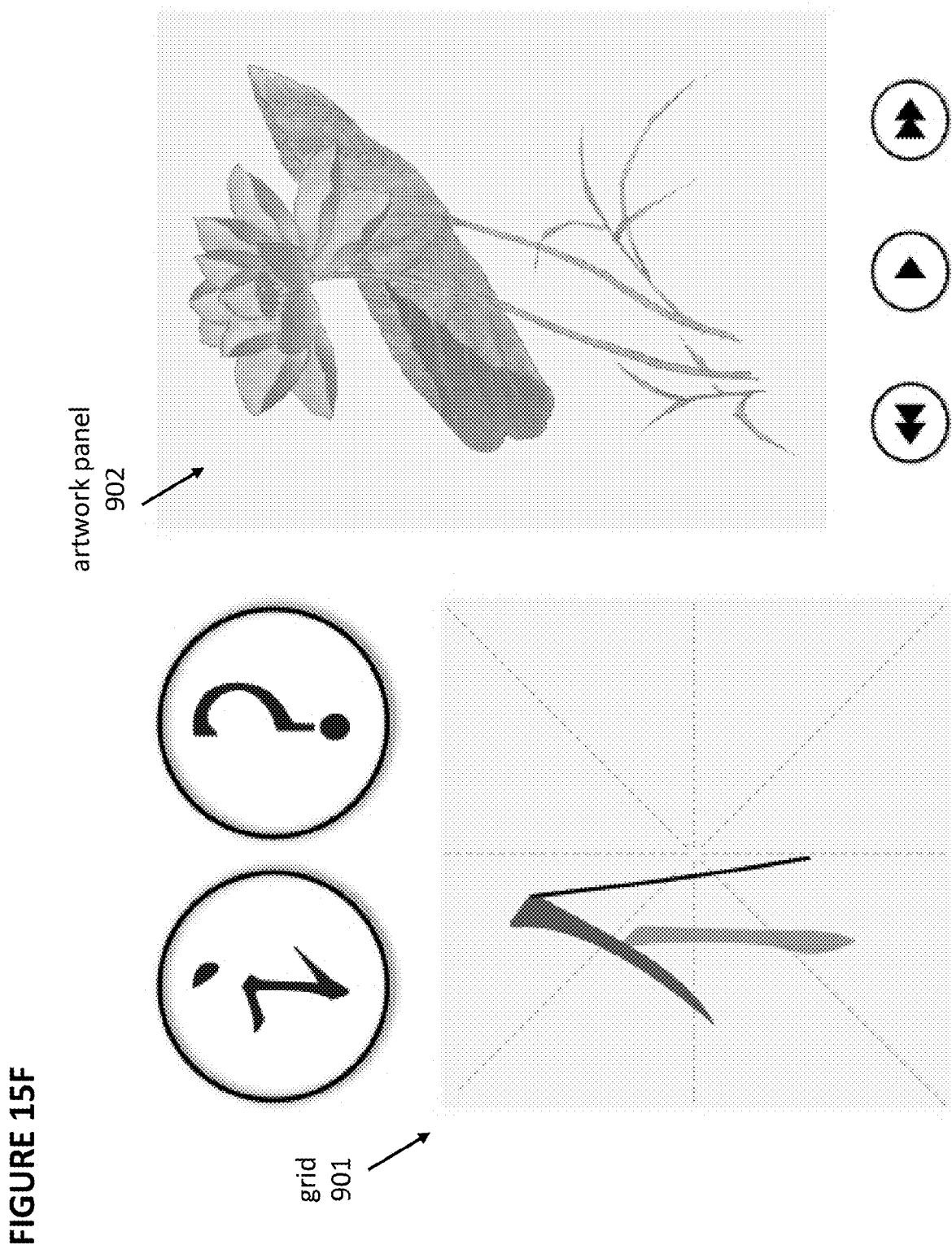

In FIG. 15F, the correctly drawn stroke is shown in green.

Figure 15G:
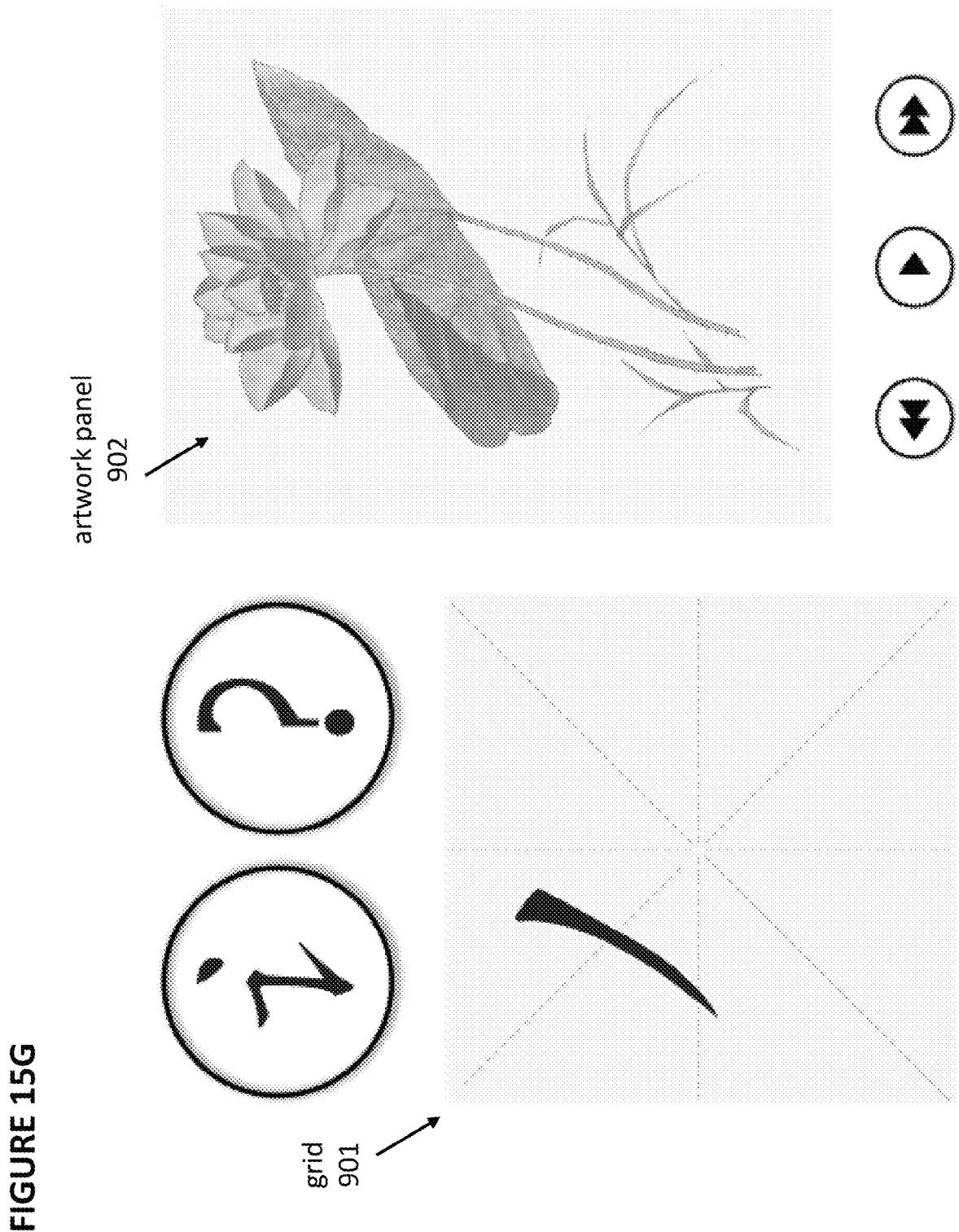

In FIG. 15G, the correct stroke and the user's stroke are deleted.

Figure 15H:
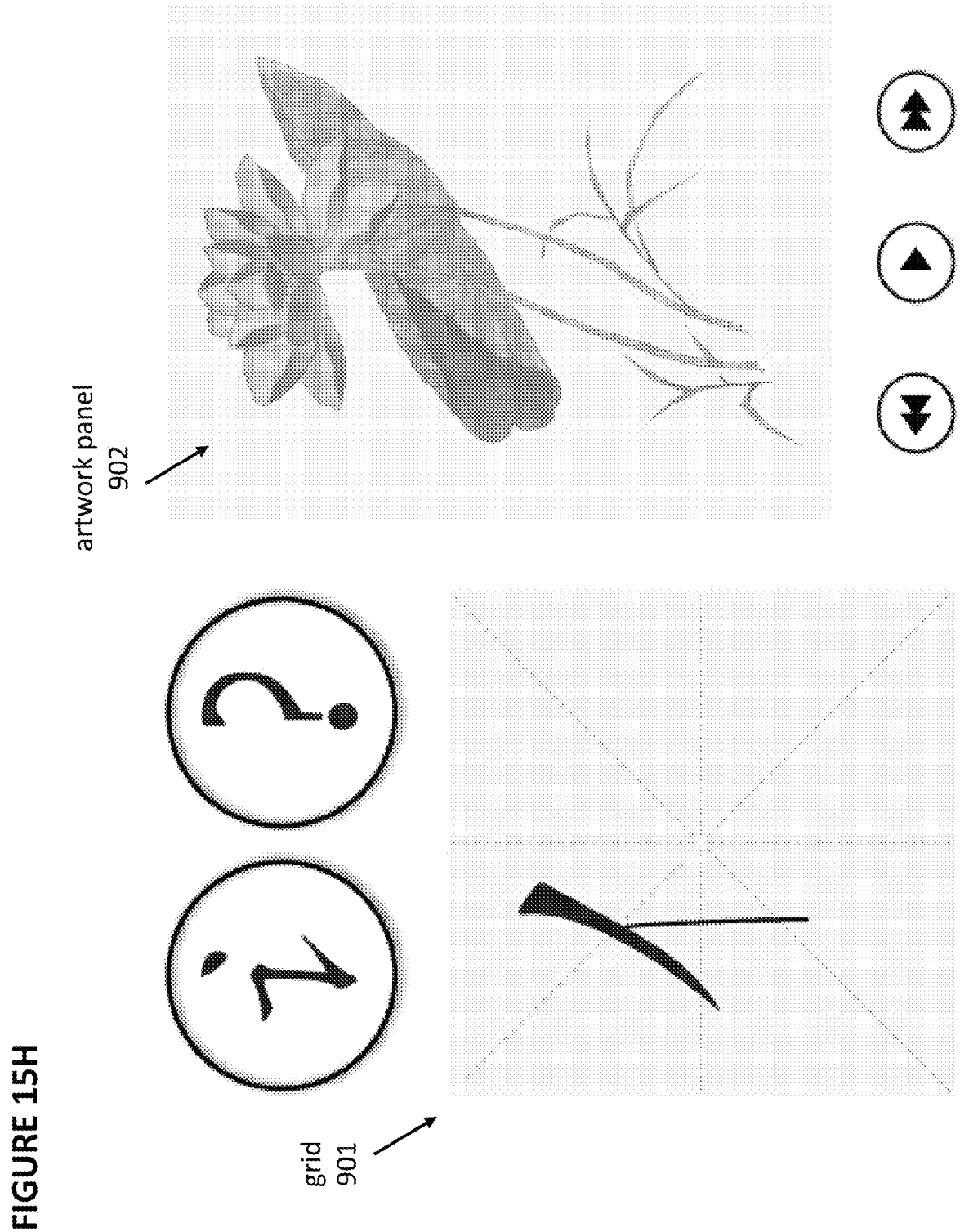
Figure 15I:
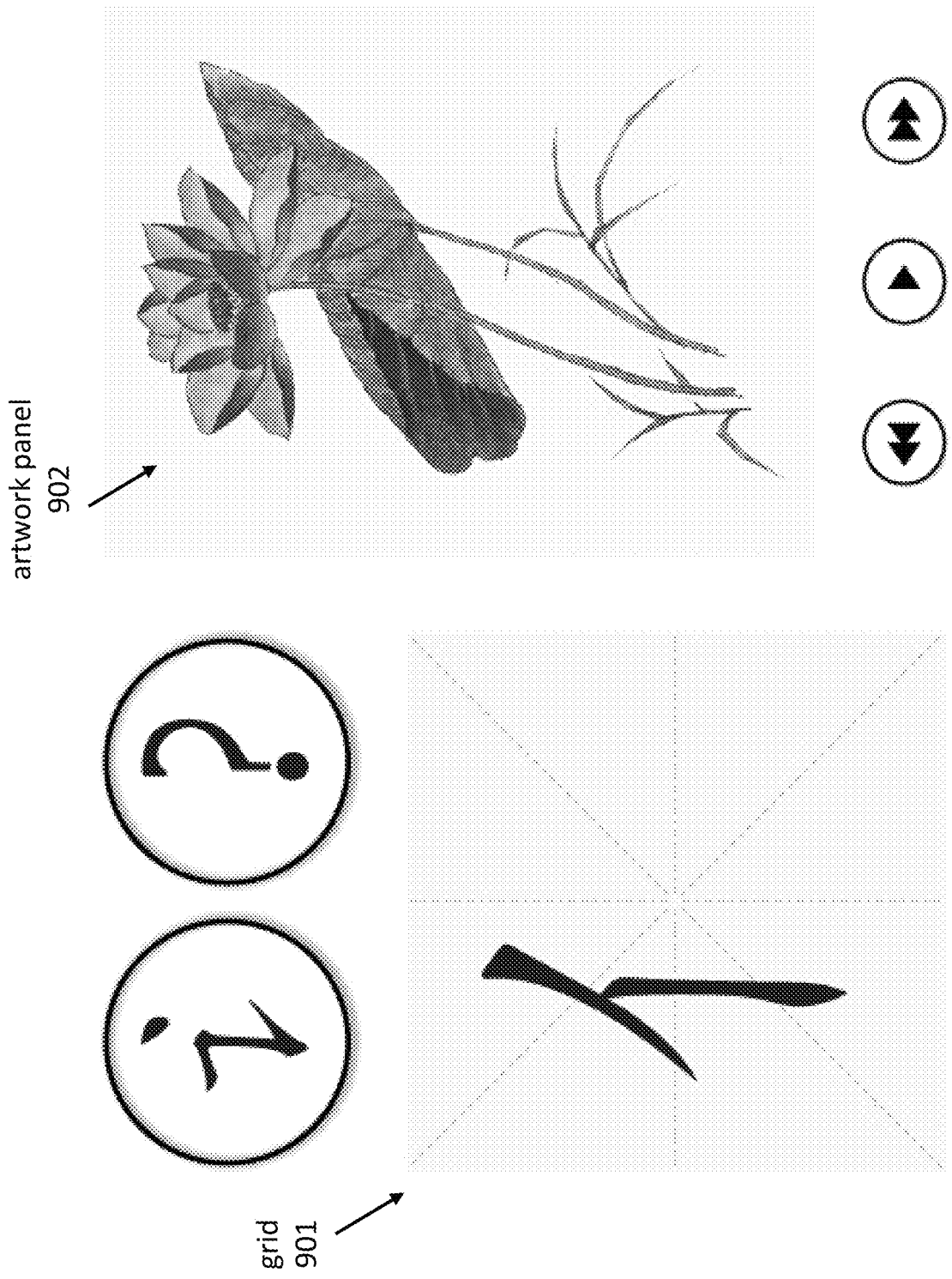

In FIG. 15H, the user attempts the second stroke again. Feedback method 1100 is performed, and stroke engine 830 determines that the user formed the correct stroke (step 1130), rules engine 820 determines that the stroke complied with the rules (step 1140), and character comparison engine determines that accuracy score 1101 exceeds threshold 1102 (step 1150). As a result, in FIG. 15I, the user's stroke is replaced by the appropriate thick, calligraphic stroke.

The user can then progress through the remaining strokes of the character. After each stroke, feedback method 1100 is performed, and character comparison engine 810, rules engine 820, and stroke engine 830 perform the same analysis described above with reference to FIG. 14. In the interests of efficiency, the remainder of the character exercise for FIG. 15 with the no shadowing option is not shown.

An example of a lesson as to the hardest character in first character set 1200—nǐ—is now depicted with reference to FIGS. 16 and 17.

FIG. 16 depicts lesson screen 1600 that is used as a template during the exercises. Lesson screen 1600 is the same as lesson screen 1300 in FIG. 13 except that a finished non-outline painting is depicted in artwork panel 902.

In FIG. 17A, the user is shown reference character 1700 that he or she will be asked to draw within grid 901. As in FIG. 14, FIG. 16 follows the "shadowing" option where a faded version of reference character 1700 is shown throughout the exercise.

Figure 17B:
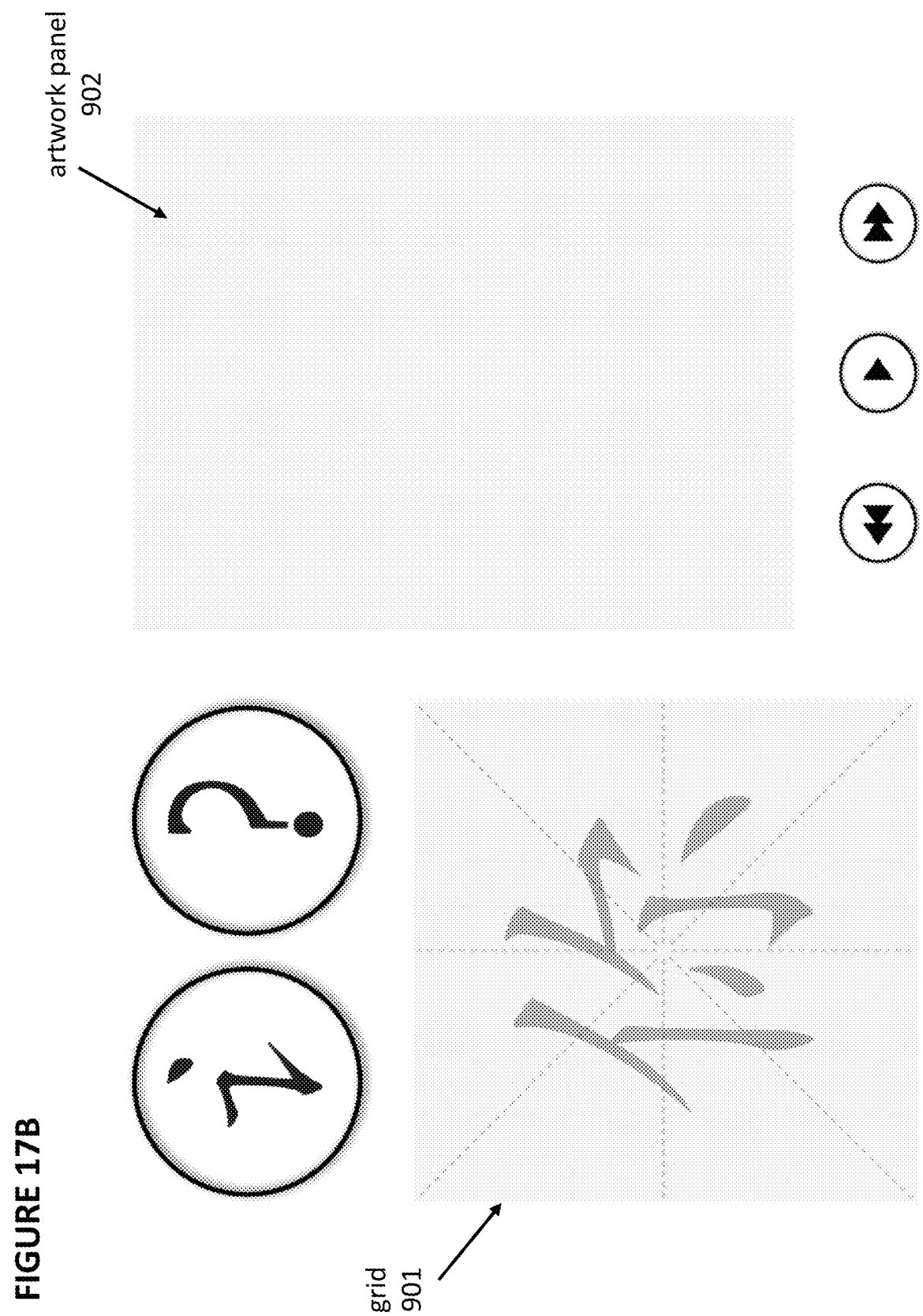

In FIG. 17B, reference character 1700 disappears or is faded.

In FIG. 17C, the user draws a first stroke in display 280 within grid 901. Feedback method 1100 is performed, and it is determined that accuracy score 1101 exceeds threshold 1102. As a result, art rendering engine 840 draws a first stroke (using data in art library 720) in artwork panel 902. Notably, the artwork displayed in artwork panel 902 in FIG. 17C uses the non-outline technique of traditional Chinese painting.

In FIG. 17D, the user draws a second stroke in display 280 within grid 901. Feedback method 1100 is performed, and it is determined that accuracy score 1101 exceeds threshold 1102. As a result, art rendering engine 840 draws a second stroke (using data in art library 720) in artwork panel 902.

In FIG. 17E, the user draws a third stroke in display 280 within grid 901. Feedback method 1100 is performed, and it is determined that accuracy score 1101 exceeds threshold 1102. As a result, art rendering engine 840 draws a third stroke (using data in art library 720) in artwork panel 902.

Figure 17F:

In FIG. 17F, the user draws a fourth stroke in display 280 within grid 901. Feedback method 1100 is performed, and it is determined that accuracy score 1101 does not exceed threshold 1102. Here, this is due to the user not drawing a hook at the end of the fourth stroke. As a result, art rendering engine 840 does not draw a new stroke in artwork panel 902. Alternatively, art rendering engine 840 could remove the third stroke from artwork panel 902.

Figure 17G:
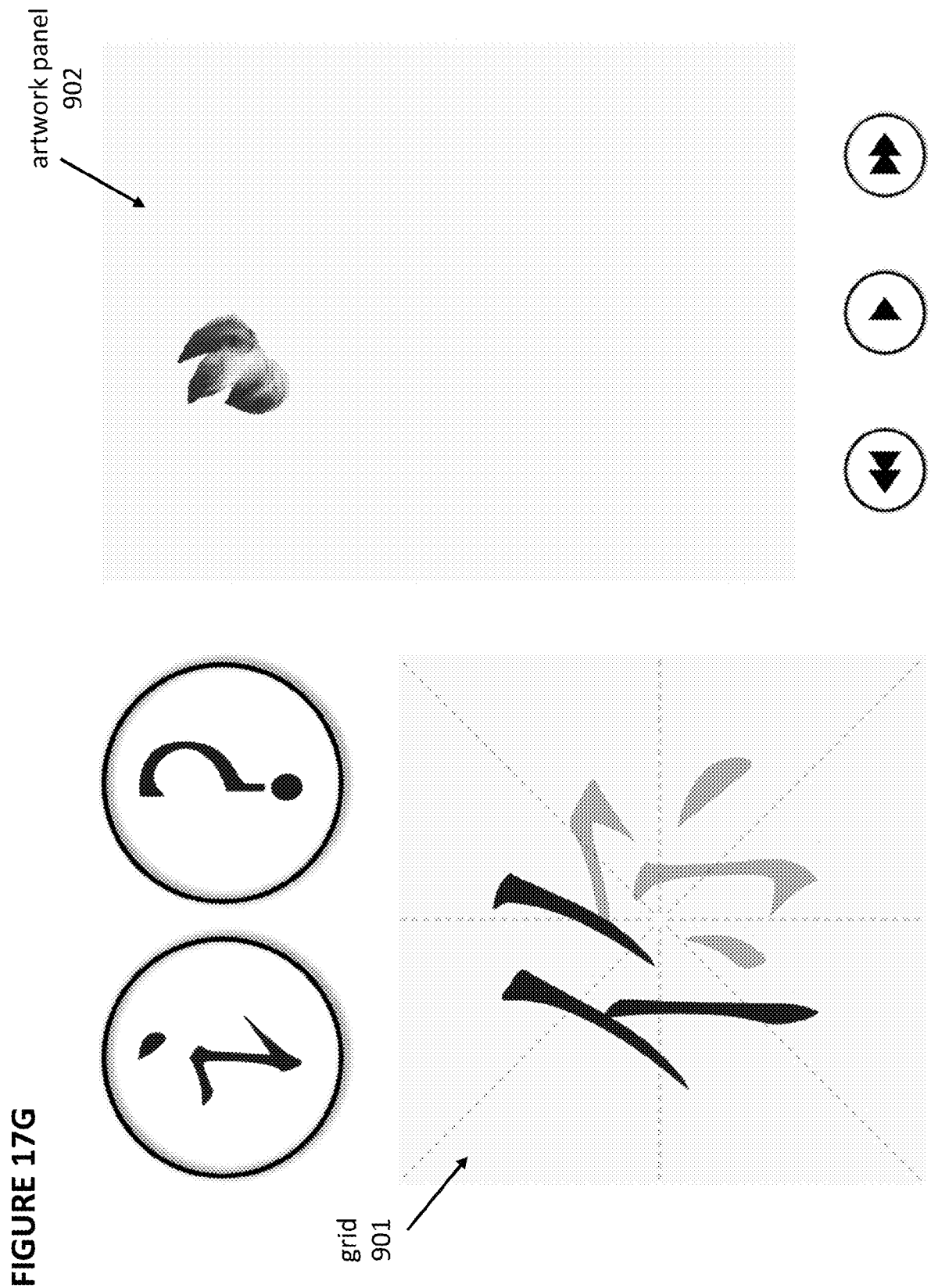

In FIG. 17G, the erroneous fourth stroke is erased from display 280.

In FIG. 17H, the correct way to draw the fourth stroke is demonstrated to the user on display 280 through computer-generated stroke 1701 (with or without an arrow), preferably using a different color (e.g., green instead of black). The vocalization engine 860 pronounces the name of the correct stroke in Mandarin.

In FIG. 17I, computer-generated stroke 1701 is erased.

In FIG. 17J, the user draws a fourth stroke again in display 280 within grid 901. Feedback method 1100 is performed, and it is determined that this time accuracy score 1101 exceeds threshold 1102. As a result, art rendering engine 840 draws additional strokes (using data in art library 720) in artwork panel 902.

Figure 17K:
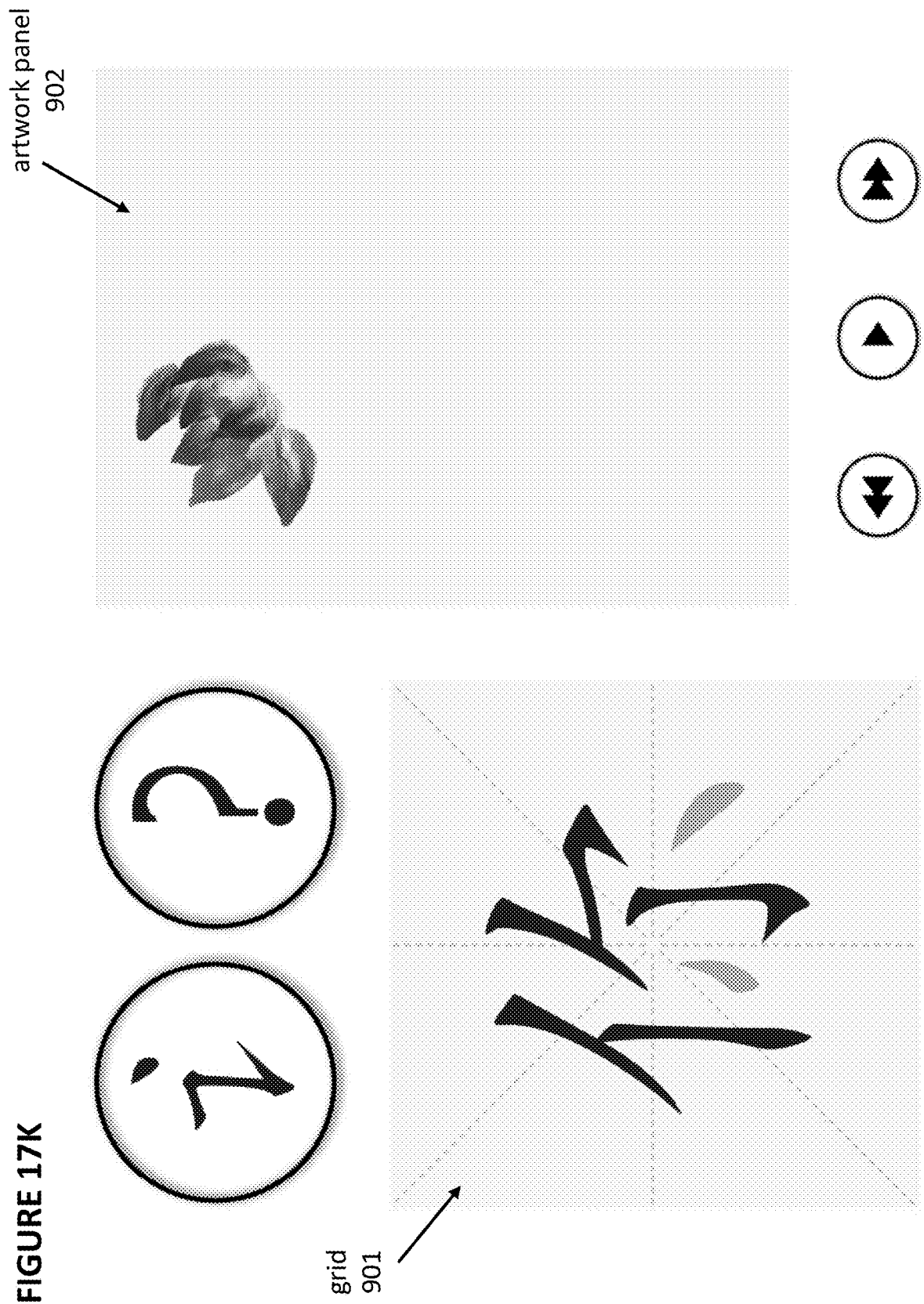

In FIG. 17K, the user draws a fifth stroke in display 280 within grid 901. Feedback method 1100 is performed, and it is determined that accuracy score 1101 exceeds threshold 1102. As a result, art rendering engine 840 draws additional strokes (using data in art library 720) in artwork panel 902.

In FIG. 17L, the user draws a sixth stroke in display 280 within grid 901. Feedback method 1100 is performed, and it is determined that accuracy score 1101 does not exceed threshold 1102. Here, this is due to the user placing the sixth stroke in the wrong location. The user violated the rule "first left, then right." As a result, art rendering engine 840 does not draw a new stroke in artwork panel 902. Alternatively, art rendering engine 840 could remove one or more strokes from artwork panel 902.

In FIG. 17M, the erroneous sixth stroke is erased from display 280.

In FIG. 17N, the correct way to draw the fourth stroke is demonstrated to the user on display 280 through computer-generated stroke 1702 (with or without an arrow), preferably using a different color (e.g., green instead of black).

Figure 17O:
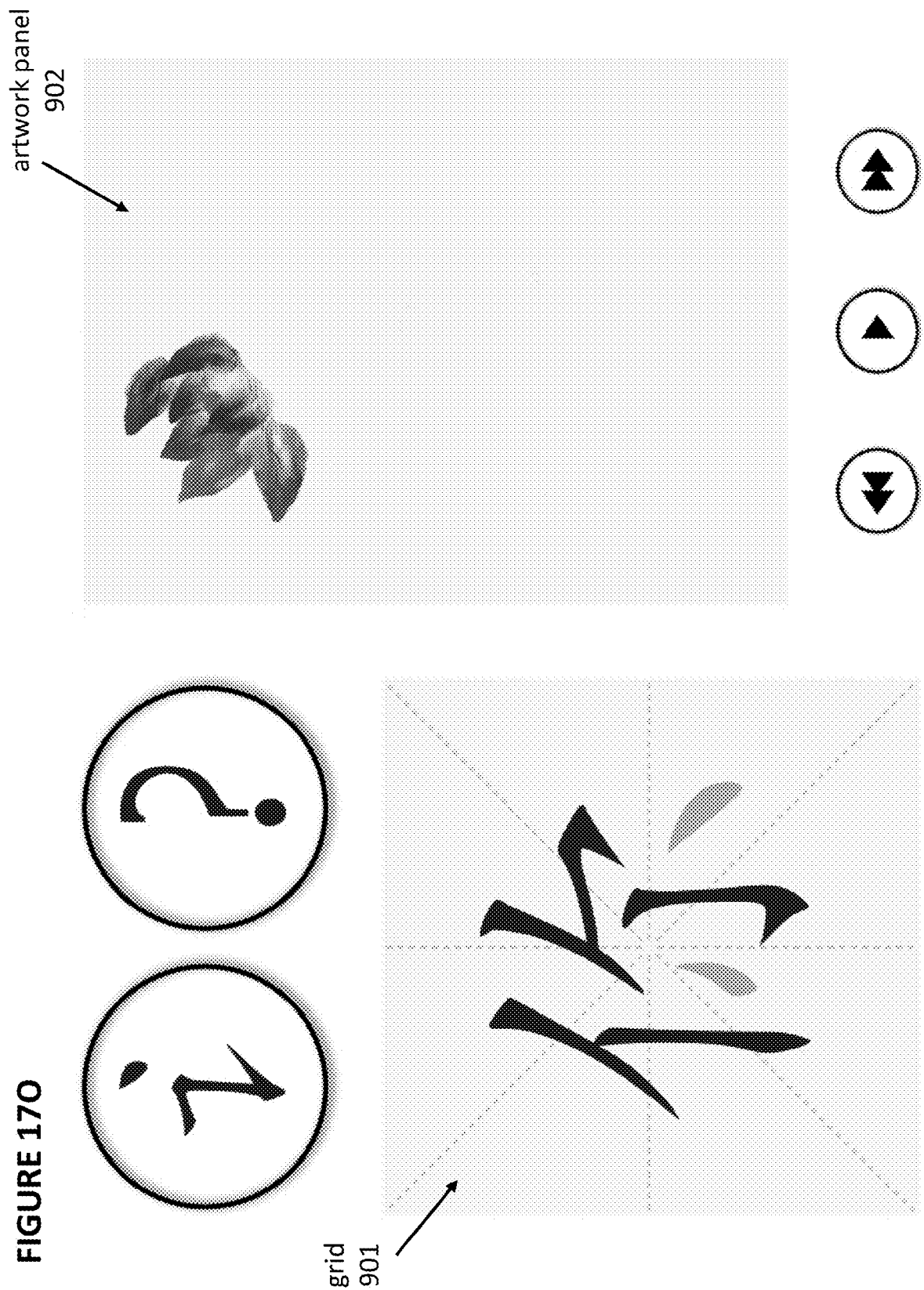

In FIG. 17O, computer-generated stroke 1701 is erased.

In FIG. 17P, the user draws the sixth stroke again in display 280 within grid 901. Feedback method 1100 is performed, and it is determined that this time accuracy score 1101 exceeds threshold 1102. As a result, art rendering engine 840 draws additional strokes (using data in art library 720) in artwork panel 902.

In FIG. 17Q, the user draws a seventh stroke in display 280 within grid 901. Feedback method 1100 is performed, and it is determined that accuracy score 1101 exceeds threshold 1102. As a result, art rendering engine 840 draws additional strokes (using data in art library 720) in artwork panel 902.

At this point, the user has successfully drawn the entirety of reference character 1700 with sufficient accuracy.

The system can now provide the user with an exercise for the same character using the no-shadowing option described previously with respect to FIG. 15.

The description of the lessons discussed with reference to FIGS. 13-17 are mere examples to illustrate the general process of the lessons with just two of the Mandarin characters and two of the works of art that can be used in the educational software environment. A person of ordinary skill in the art will understand that these examples can be extended to an unlimited number of additional Mandarin characters.

FIGS. 18A to 18F depict calibration process 1800. Calibration process 1800 is used to set or refine threshold 1102 so that the user or an instructor can modify the system to be as lenient or as stringent as desired. Calibration process 1800 also is itself an instructive process for the user where he or she can practice the finer aspects of stroke generation and can receive helpful feedback on each stroke.

FIG. 18A depicts a portion of reference character 1700, specifically, the first two strokes of reference character 1700.

Figure 18B:
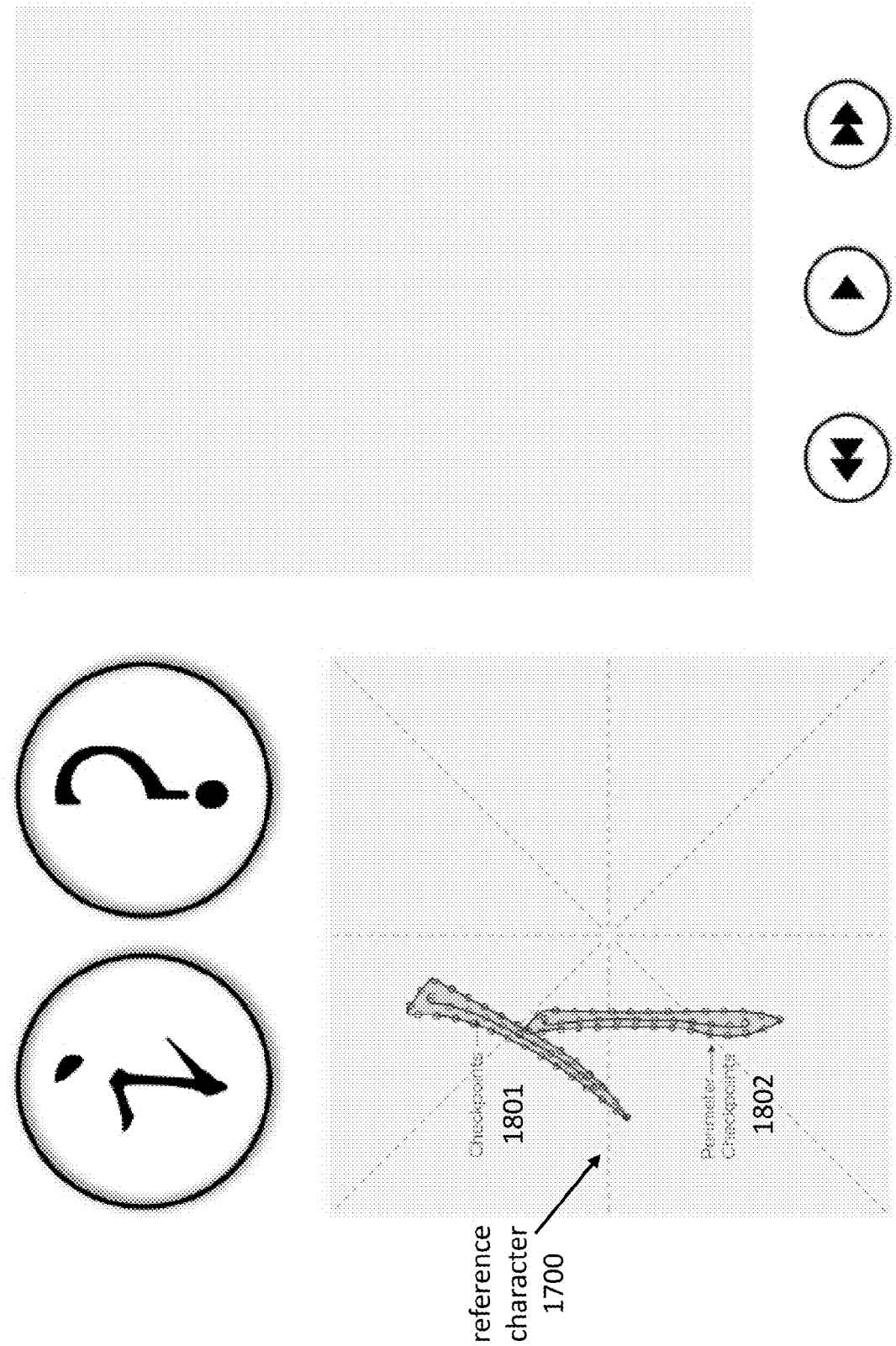

FIG. 18B depicts checkpoints 1801 and perimeter checkpoints 1802 of reference character 1700. Checkpoints 1801 and perimeter checkpoints 1802 can be used by character comparison engine 810 to determine an accuracy score 1101.

FIG. 18C depicts a first example of the user drawing the first two strokes of reference character 1700. In this instance, the user's strokes are relatively accurate, as gauged by the deviation from the user's strokes and checkpoints 1801 and perimeter checkpoints 1802. User input box 1803 is displayed on the screen to solicit calibration feedback from the user or instructor. Character comparison engine 810 determines an accuracy score 1101 and depicts accuracy score 1101 as a number (here, "95") with the simple label "Score." The user or instructor is asked if accuracy score 1101 is acceptable. In this example, threshold 1102 is initially set to 100. If the user or instructor selects "yes," then threshold 1102 is set to the current value of accuracy score 1101 (here, 95).

Figure 18D:
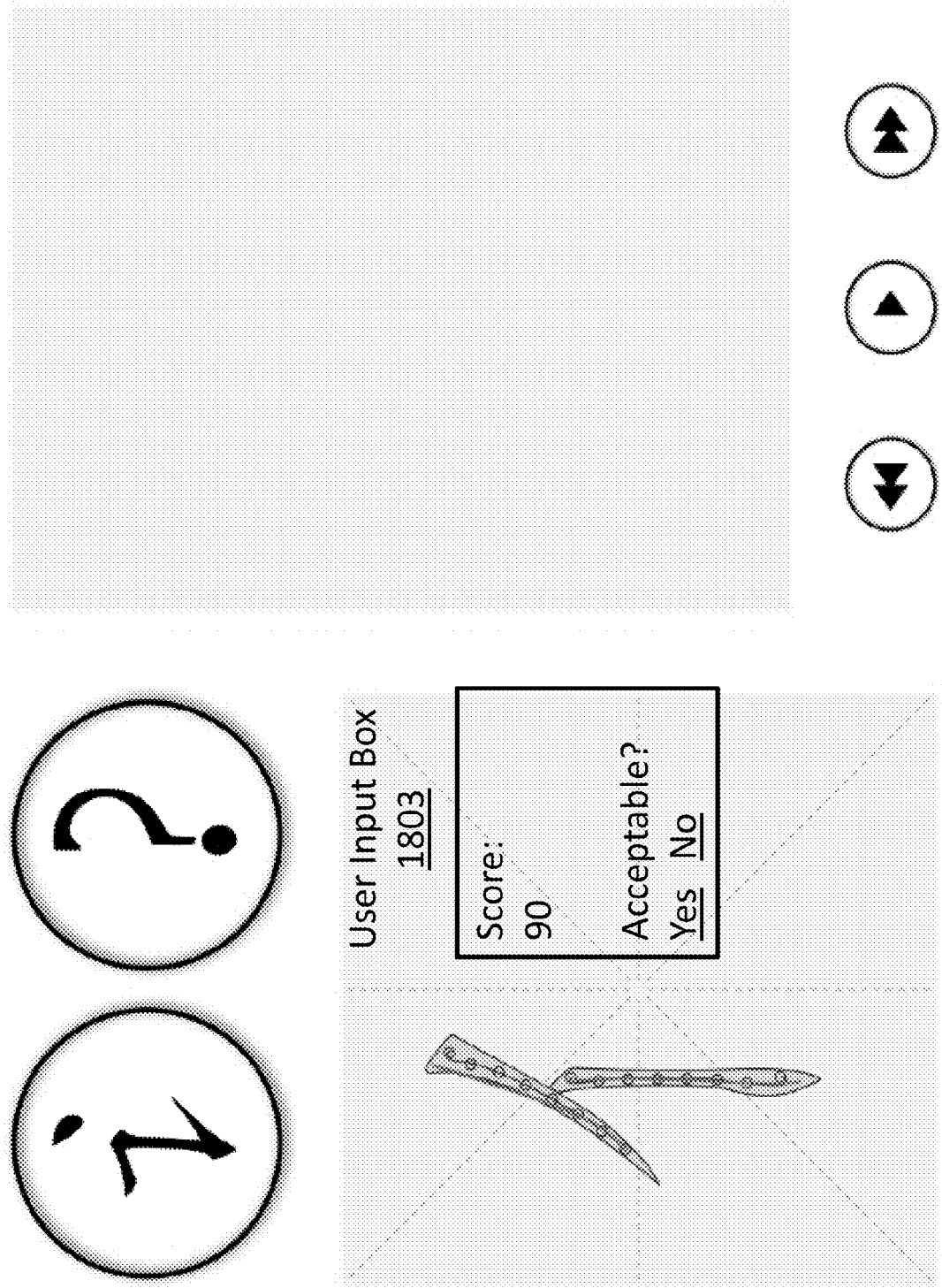

FIG. 18D depicts a second example of the user drawing the first two strokes of reference character 1700. In this instance, the user's strokes are not as accurate as in FIG. 18C, as gauged by the deviation from the user's strokes and checkpoints 1801 and perimeter checkpoints 1802. Again, character comparison engine 810 determines an accuracy score 1101 and depicts accuracy score 1101 as a number (here, "90") with the simple label "Score." The user or instructor is asked if accuracy score 1101 is acceptable. If the user or instructor selects "yes," then threshold 1102 is set to the current value of accuracy score 1101 (here, "90"). If the user or instructor selects "no," then threshold 1102 does not change.

Figure 18E:
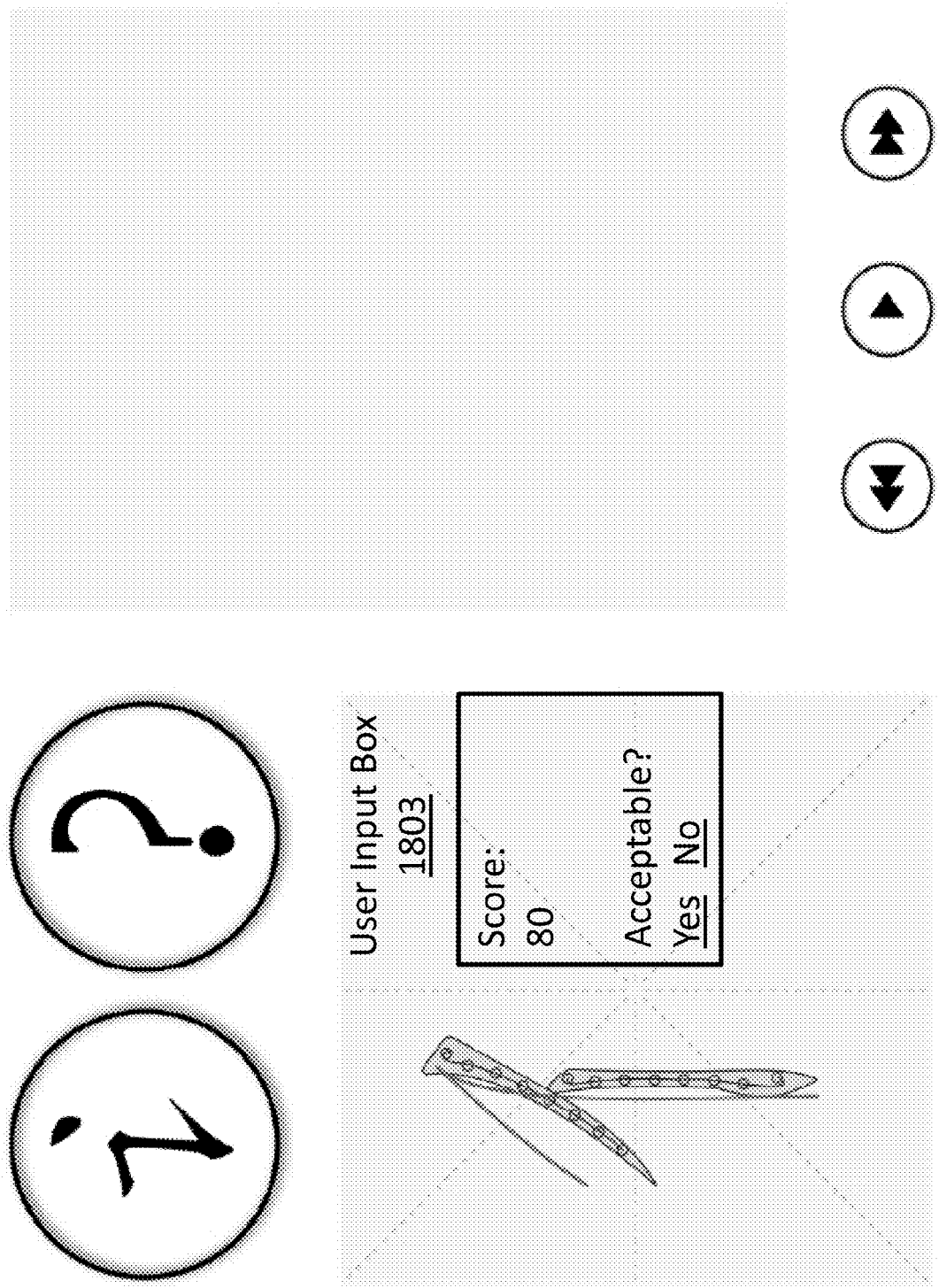

FIG. 18E depicts a third example of the user drawing the first two strokes of reference character 1700. In this instance, the user's strokes are not as accurate as in FIG. 18C or 18D, as gauged by the deviation from the user's strokes and checkpoints 1801 and perimeter checkpoints 1802. Again, character comparison engine 810 determines an accuracy score 1101 and depicts accuracy score 1101 as a number (here, "80") with the simple label "Score." The user or instructor is asked if accuracy score 1101 is acceptable. If the user or instructor selects "yes," then threshold 1102 is set to the current value of accuracy score 1101 (here, "80"). If the user or instructor selects "no," then threshold 1102 does not change.

Figure 18F:
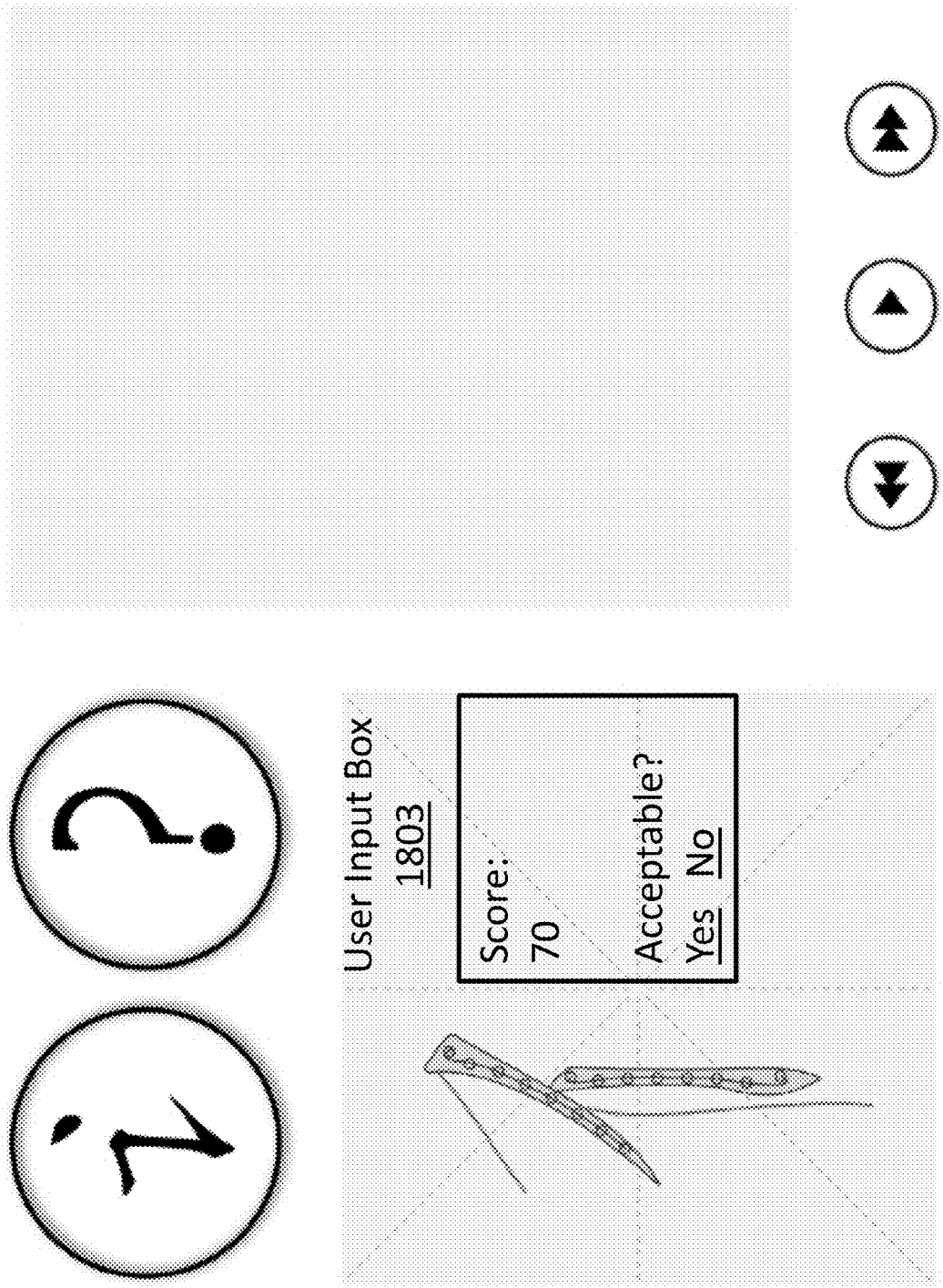

FIG. 18F depicts a third example of the user drawing the first two strokes of reference character 1700. In this instance, the user's strokes are not as accurate as in FIG. 18C, 18D, or 18E, as gauged by the deviation from the user's strokes and checkpoints 1801 and perimeter checkpoints 1802. Again, character comparison engine 810 determines an accuracy score 1101 and depicts accuracy score 1101 as a number (here, "70") with the simple label "Score." The user or instructor is asked if accuracy score 1101 is acceptable. If the user or instructor selects "yes," then threshold 1102 is set to the current value of accuracy score 1101 (here, "70"). If the user or instructor selects "no," then threshold 1102 does not change.

Using calibration process 1800, the user can increase the stringency of the stroke evaluation process as he or she becomes more skilled. On the other hand, calibration process 1800 also allows the threshold 1102 to be set at a lenient level if the user is a young child or is a beginner.

The systems and methods described herein provide an computerized environment for a user to learn how to accurately write characters from a language such as Mandarin while receiving music feedback, vocal feedback, artwork feedback, and character feedback, and while also learning how to create classical Chinese paintings in the outline style and the non-outline style.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between). Likewise, the term "adjacent" includes "directly adjacent" (no intermediate materials, elements or space disposed there between) and "indirectly adjacent" (intermediate materials, elements or space disposed there between). For example, forming an element "over a substrate" can include forming the element directly on the substrate with no intermediate materials/elements there between, as well as forming the element indirectly on the substrate with one or more intermediate materials/elements there between.

What is claimed is:

1. A method of providing visual feedback to a user in response to a written character input by the user, comprising:

generating a grid and an artwork panel on a display of a computing device;

generating a reference character in a first color on the display;

fading the reference character to a second color on the display;

generating a stroke in the grid on the display entered by the user;

determining an accuracy score for the stroke based on data for the reference character and data for all characters, wherein the data for the reference character comprises stroke placement and stroke direction and the data for all characters comprises a plurality of rules for stroke order;

comparing the accuracy score to a predetermined threshold; and when the accuracy score exceeds the predetermined threshold, generating a portion of artwork comprising a first set of strokes in the artwork panel on the display as visual feedback to the user, wherein the artwork is different than the reference character and the first set of strokes are different than the stroke entered by the user.

2. The method of claim 1, further comprising:

generating a second stroke in the grid on the display entered by the user;

determining an accuracy score for the second stroke based on data for the reference character;

comparing the accuracy score to a predetermined threshold; and when the accuracy score is less than the predetermined threshold, removing one or more strokes from a portion of artwork in the artwork panel on the display as visual feedback to the user.

3. The method of claim 2, further comprising:

generating a correct version of the second stroke on the display as visual feedback to the user.

4. The method of claim 2, further comprising:

in response to a user input, generating an audio vocalization of the reference character.

5. The method of claim 2, further comprising:

in response to a user input, generating a textual spelling of the reference character in a language different than the reference character.

6. The method of claim 1, further comprising:

prior to the step of generating a reference character on the display, selecting the reference character based on information entered by the user.

7. The method of claim 1, wherein the artwork comprises an outline.

8. The method of claim 1, wherein the artwork comprises no outline.

9. A computer system for providing visual feedback to a user in response to a written character input by the user, comprising:

a display;

a user input device;

a processor;

a computer medium storing instructions that, when executed by the processor, cause the following steps to be performed:

generating a grid and an artwork panel on a display of a computing device;

generating a reference character in a first color on the display;

fading the reference character to a second color on the display;

generating a stroke in the grid on the display entered by the user;

determining an accuracy score for the stroke based on data for the reference character and data for all characters, wherein the data for the reference character comprises stroke placement and stroke direction and the data for all characters comprises a plurality of rules for stroke order;

comparing the accuracy score to a predetermined threshold; and when the accuracy score exceeds the predetermined threshold, generating a portion of artwork comprising a first set of strokes in the artwork panel on the display as visual feedback to the user, wherein the artwork is different than the reference character and the first set of strokes are different than the stroke entered by the user.

10. The apparatus of claim 9, wherein the computer medium further stores instructions that, when executed by the processor, cause the following steps to be performed:

generating a second stroke in the grid on the display entered by the user;

determining an accuracy score for the second stroke based on data for the reference character;

comparing the accuracy score to a predetermined threshold; and when the accuracy score is less than the predetermined threshold, removing one or more strokes from a portion of artwork in the artwork panel on the display as visual feedback to the user.

11. The apparatus of claim 10, wherein the computer medium further stores instructions that, when executed by the processor, cause the following steps to be performed:

generating a correct version of the second stroke on the display as visual feedback to the user.

12. The apparatus of claim 10, wherein the computer medium further stores instructions that, when executed by the processor, cause the following steps to be performed:

in response to a user input, generating an audio vocalization of the reference character.

13. The apparatus of claim 10, wherein the computer medium further stores instructions that, when executed by the processor, cause the following steps to be performed:

in response to a user input, generating a textual spelling of the reference character in a language different than the reference character.

14. The apparatus of claim 9, wherein the computer medium further stores instructions that, when executed by the processor, cause the following steps to be performed:

prior to the step of generating a reference character on the display, selecting the reference character based on information entered by the user.

15. The apparatus of claim 9, wherein the artwork comprises an outline.

16. The apparatus of claim 9, wherein the artwork comprises no outline.

* * * * *